(12) United States Patent
Roy et al.

(10) Patent No.: US 11,281,282 B2
(45) Date of Patent: Mar. 22, 2022

(54) INTERMEDIARY DEVICE FOR EXTRACTING POWER SUPPLIED OVER A DATA CONNECTION

(71) Applicant: GENETEC INC., Montreal (CA)

(72) Inventors: Danny Roy, Saint-Laurent (CA); Louis-Philippe Brais, Saint-Laurent (CA); Benoit Lemieux, Saint-Laurent (CA)

(73) Assignee: GENETEC INC., Saint-Laurent (CA)

( * ) Notice: Subject to any disclaimer, the term of this patent is extended or adjusted under 35 U.S.C. 154(b) by 16 days.

(21) Appl. No.: 16/688,563

(22) Filed: Nov. 19, 2019

(65) Prior Publication Data

US 2020/0159307 A1 May 21, 2020

Related U.S. Application Data

(60) Provisional application No. 62/769,233, filed on Nov. 19, 2018, provisional application No. 62/928,543, filed on Oct. 31, 2019.

(51) Int. Cl.
| | | |
|---|---|---|
| *G06F 1/32* | (2019.01) | |
| *G06F 1/3209* | (2019.01) | |
| *H04L 12/10* | (2006.01) | |
| *G06F 1/28* | (2006.01) | |

(52) U.S. Cl.
CPC .............. *G06F 1/3209* (2013.01); *G06F 1/28* (2013.01); *H04L 12/10* (2013.01)

(58) Field of Classification Search
None
See application file for complete search history.

(56) References Cited

U.S. PATENT DOCUMENTS

| 7,941,677 B2 * | 5/2011 | Penning ............... H04B 10/808 713/300 |
| 8,341,440 B2 | 12/2012 | Diab |

(Continued)

FOREIGN PATENT DOCUMENTS

| WO | 2017117670 | 7/2017 |
| WO | 2020102894 | 5/2020 |

OTHER PUBLICATIONS

Bidirectional Power over Ethernet, published on Dec. 27, 2019 by All, Energy Harvesting, IoT, Power (Charles Byers), 4 pages.

(Continued)

*Primary Examiner* — Fahmida Rahman

(57) ABSTRACT

Technologies exist that allow for power to be supplied over a data connection, e.g., Power over Ethernet (PoE). Power sourcing equipment (PSE) supplies power to a powered device (PD) over the data connection. There may be applications in which it is desired or necessary to insert an intermediary device on a data connection between the PSE and the PD. An intermediary device is disclosed that can be inserted between a PSE and a PD. The intermediary device attempts to power itself using power supplied by the PSE over the data connection, rather than using an auxiliary power supply. In some embodiments, the intermediary device acts like a PD and requests from the PSE enough power for both itself and the actual PD. The intermediary device then also acts as a PSE to deliver unused power over the data connection to the actual PD.

26 Claims, 24 Drawing Sheets

(56) References Cited

U.S. PATENT DOCUMENTS

| | | | |
|---|---|---|---|
| 8,909,951 B2* | 12/2014 | Lin | G06F 1/266 |
| | | | 713/300 |
| 9,100,196 B2 | 8/2015 | Zimmerman | |
| 9,366,082 B2 | 6/2016 | Feldstein | |
| 9,531,551 B2 | 12/2016 | Balasubramanian et al. | |
| 9,712,337 B2 | 7/2017 | Greenwalt | |
| 10,620,678 B2 | 4/2020 | Thurmond et al. | |
| 2006/0082222 A1 | 4/2006 | Pincu | |
| 2006/0100799 A1 | 5/2006 | Karam | |
| 2006/0273661 A1* | 12/2006 | Toebes | G06F 1/266 |
| | | | 307/106 |
| 2007/0038769 A1 | 2/2007 | Ryan | |
| 2007/0136614 A1 | 6/2007 | Heath et al. | |
| 2010/0005320 A1 | 1/2010 | Squilliante | |
| 2010/0299544 A1 | 11/2010 | Hansalla | |
| 2012/0228936 A1 | 9/2012 | Kabbara et al. | |
| 2013/0123999 A1* | 5/2013 | Pereira | G05D 23/1924 |
| | | | 700/295 |
| 2013/0201316 A1 | 8/2013 | Binder et al. | |
| 2015/0127957 A1* | 5/2015 | Sethi | G06F 1/26 |
| | | | 713/300 |
| 2015/0180276 A1 | 6/2015 | Kanarellis et al. | |
| 2016/0219679 A1 | 7/2016 | Synder et al. | |
| 2017/0010645 A1 | 1/2017 | Jain et al. | |
| 2017/0019977 A1 | 1/2017 | Stewart | |
| 2017/0195179 A1 | 7/2017 | Chan et al. | |
| 2017/0310158 A1 | 10/2017 | Kanarellis | |
| 2019/0229934 A1* | 7/2019 | Zhuang | H04L 12/10 |

OTHER PUBLICATIONS

GS516TP Gigabit Smart Switches, published in Jun. 2013 by Netgear, 208 pages.

PoE pass through switches, published on Jan. 31, 2019 by Netgear, 3 pages.

Managing Power Distribution via Power over Ethernet (PoE) in Hardwired Networks, accessed on Dec. 4, 2020 by European Editors, 7 pages.

Igor customer presentation in Aug. 2017 on XL Automation Solutions web site, powerpoint presentation, 32 pages https://www.xlautomationsolutions.com/wp-content/uploads/Igor-Customer-Presentation_August-2017.pptx.

Impact of 2017 National Electric Code on Power over Ethernet Cabling, published in Nov. 2016, by Panduit Corp., 4 pages.

New National Electrical Code 2017 Requirements Affect POE Wiring, published on Mar. 7, 2017 by Steven deSteuben, 2 pages.

PoE-related amendments proposed to the 2017 NEC, published on Jun. 27, 2017 by Cabling Installation Maintenance, 4 pages.

Power Over Ethernet Lighting—Evolution or Revolution?, published in Nov. 2015 by UL 9 pages.

* cited by examiner

INTERMEDIARY DEVICE FOR EXTRACTING POWER SUPPLIED OVER A DATA CONNECTION

CROSS-REFERENCE TO RELATED APPLICATIONS

The present application relates to U.S. Provisional Patent Application Ser. No. 62/769,233, entitled "Intermediary Device for Extracting Power Supplied Over a Data Connection", which was filed on Nov. 19, 2018, and which is incorporated herein by reference. The present application also relates to 62/928,543, entitled "Intermediary Device for Extracting Power Supplied Over a Data Connection", which was filed on Oct. 31, 2019, and which is incorporated herein by reference.

FIELD

The following relates to an intermediary device configured to consume, for its own use, power that is supplied over a data connection, and deliver remaining power over the data connection to another device.

BACKGROUND

Technologies exist that allow for power to be supplied over a data connection. Supplying power over a data connection refers to supplying power over a medium that is also used for transmitting data. For example, the medium may be a cable. An example is Power over Ethernet (PoE). In PoE, power is supplied over an Ethernet cable along with the data.

A PoE system typically includes power sourcing equipment (PSE), a powered device (PD), and an Ethernet cable. The PSE supplies the Ethernet cable with the power, and the PD is able to operate using the power supplied over the Ethernet cable. Examples of PSEs include PoE-enabled network switches, routers, and modems. Examples of PDs include edge devices, such as Internet Protocol (IP) cameras and voice over internet protocol (VoIP) phones. Using PoE, these devices are able to operate off of the Ethernet cable without the need for an auxiliary power supply.

The PoE standard has evolved over time, and continues to evolve, to permit an increased maximum power transfer over the Ethernet cable and to allow for more sophisticated power management methods. Other standards such as Power over Data Lines (PoDL) also exist, e.g., for use in automotive device power management.

SUMMARY

In one embodiment, an intermediary device is disclosed that can be inserted between a PSE and a PD. The intermediary device attempts to power itself using power supplied by the PSE over the data connection. In some embodiments, the intermediary device acts like a PD and requests, from the PSE, power to be used by both itself and the actual PD. The intermediary device then also acts as a PSE to deliver unused power over the data connection to the actual PD.

In one broad aspect, the present disclosure relates to a method performed by an intermediary device (ID) connected to power sourcing equipment (PSE) over a data connection, the method comprising: determining an amount of power allocated to the ID by the PSE over the data connection; determining the amount of power requested by a powered device (PD) connected to the ID; comparing the amount of power requested by the PD to the amount of power allocated by the PSE, and determining that the amount of power requested by the PD is less than the amount of power allocated by the PSE; consuming a particular amount of power supplied by the PSE over the data connection, the particular amount of power comprising both the amount of power consumed by the ID to operate the ID and the amount of power consumed to power the PD.

In another embodiment, an intermediary device (ID) is configured to be connected between power sourcing equipment (PSE) and a powered device (PD), the ID comprising: a PSE interface to interface with the PSE over a first data connection; a PD interface to interface with the PD over a second data connection; a processor to: (i) determine an amount of power allocated to the ID by the PSE over the first data connection; (ii) determine the amount of power requested by the PD over the second data connection; (iii) compare the amount of power requested by the PD to the amount of power allocated by the PSE; and upon determining that the amount of power requested by the PD is less than the amount of power allocated by the PSE, cause the ID to consume a particular amount of power supplied by the PSE over the first data connection, wherein the particular amount of power comprises both the amount of power consumed by the ID to operate the ID and the amount of power consumed to power the PD.

In another broad aspect, the present disclosure relates to a method performed by an intermediary device (ID) connected to power sourcing equipment (PSE) over a data connection, the method comprising: determining an amount of power allocated to the ID by the PSE over the data connection; determining the amount of power requested by a powered device (PD) connected to the ID; comparing the amount of power requested by the PD to the amount of power allocated by the PSE, and determining that the amount of power requested by the PD is equal to or greater than the amount of power allocated by the PSE; consuming a particular amount of power supplied by the PSE over the data connection, the particular amount of power comprising both the amount of power consumed by the ID to operate the ID and the amount of power consumed to power the PD; monitoring the particular amount of power consumed to determine whether the particular amount of power consumed exceeds a threshold.

In another embodiment, the intermediary device (ID) is configured to be connected between power sourcing equipment (PSE) and a powered device (PD), the ID comprising: a PSE interface to interface with the PSE over a first data connection; a PD interface to interface with the PD over a second data connection; a processor to: (i) determine an amount of power allocated to the ID by the PSE over the first data connection; (ii) determine the amount of power requested by the PD over the second data connection; (iii) compare the amount of power requested by the PD to the amount of power allocated by the PSE; upon determining that the amount of power requested by the PD is equal to or greater than the amount of power allocated by the PSE, cause the ID to consume a particular amount of power supplied by the PSE over the first data connection, wherein the particular amount of power comprises both the amount of power consumed by the ID to operate the ID and the amount of power consumed to power the PD; (iv) monitor the particular amount of power consumed to determine whether the particular amount of power consumed exceeds a threshold.

In another broad aspect, the present disclosure relates to a method performed by an intermediary device (ID) connected to power sourcing equipment (PSE) over a data connection, the method comprising: consuming a particular amount of power supplied by the PSE over the data connection, the particular amount of power comprising both an amount of power consumed by the ID to operate the ID and the amount of power consumed to power a powered device (PD) connected to the ID; monitoring the particular amount of power consumed to determine whether the particular amount of power consumed exceeds a threshold, wherein the threshold is based on the amount of power allocated to the ID by the PSE.

In another embodiment, the intermediary device (ID) is configured to be connected between power sourcing equipment (PSE) and a powered device (PD), the ID comprising: a PSE interface to interface with the PSE over a first data connection; a PD interface to interface with the PD over a second data connection; a processor to: (i) cause the ID to consume a particular amount of power supplied by the PSE over the data connection, wherein the particular amount of power comprises both an amount of power consumed by the ID to operate the ID and the amount of power consumed to power the PD; (ii) monitor the particular amount of power consumed to determine whether the particular amount of power consumed exceeds a threshold, wherein the threshold is based on the amount of power allocated to the ID by the PSE.

In another broad aspect, the present disclosure relates to a method performed by an intermediary device (ID) connected between power sourcing equipment (PSE) and a powered device (PD) over a data connection, the method comprising: consuming a particular amount of power supplied by the PSE over the data connection, the particular amount of power comprising both an amount of power consumed by the ID to operate the ID and the amount of power consumed to power the PD; monitoring the amount of power consumed by or requested by or granted to the PD; and in response to the amount of power consumed by or requested by or granted to the PD exceeding a threshold: transmitting a notification message over the data connection via the PSE to a computing device on a network.

In another embodiment, an intermediary device (ID) configured to be connected between power sourcing equipment (PSE) and a powered device (PD), the ID comprising: a PSE interface to interface with the PSE over a first data connection; a PD interface to interface with the PD over a second data connection; a processor to: (i) cause the ID to consume a particular amount of power supplied by the PSE over the data connection, wherein the particular amount of power comprises both an amount of power consumed by the ID to operate the ID and the amount of power consumed to power the PD; (ii) monitor the amount of power consumed by or requested by or granted to the PD; (iii) and in response to the amount of power consumed by or requested by or granted to the PD exceeding a threshold: instruct the ID to transmit a notification message over the first data connection via the PSE to a computing device on a network.

In another broad aspect, the present disclosure relates to a method performed by an intermediary device (ID) connected to power sourcing equipment (PSE) over a data connection, the method comprising: determining an amount of power allocated to the ID by the PSE over the data connection; determining the amount of power consumed by or requested by or granted to a powered device (PD) connected to the ID; comparing the amount of power consumed by or requested by or granted to the PD to the amount of power allocated by the PSE, and operating in one of a plurality of modes of operation based on the comparison; wherein each one of the plurality of modes of operation corresponds to a respective different amount of power consumed by the ID for operation of the ID.

In another embodiment, an intermediary device (ID) configured to be connected between power sourcing equipment (PSE) and a powered device (PD), the ID comprising: a PSE interface to interface with the PSE over a first data connection; a PD interface to interface with the PD over a second data connection; a processor to: (i) determine an amount of power allocated to the ID by the PSE; (ii) determine the amount of power consumed by or requested by or granted to the PD; (iii) compare the amount of power consumed by or requested by or granted to the PD to the amount of power allocated by the PSE, and (iv) instruct the ID to operate in one of a plurality of modes of operation based on the comparison; wherein each one of the plurality of modes of operation corresponds to a respective different amount of power to be consumed by the ID for operation of the ID.

In another broad aspect, the present disclosure relates to a computer-implemented method comprising: receiving, over a network, a message from an intermediary device (ID), the message indicating that the ID is not able to operate in a first mode of operation using the power allocated to the ID by a power sourcing equipment (PSE) in view of the amount of power to be supplied by the ID to a powered device (PD); subsequent to receiving the message: transmitting, over the network, a reply to the ID that instructs the ID to instead operate in a second mode of operation, wherein the second mode of operation consumes less power than the first mode of operation.

In another broad aspect, the present disclosure relates to a computing device comprising: a processor; and a network interface; wherein the processor is to: (i) receive, from the network interface via a network, a message from an intermediary device (ID), the message indicating that the ID is not able to operate in a first mode of operation using the power allocated to the ID by a power sourcing equipment (PSE) in view of the amount of power to be supplied by the ID to a powered device (PD); (ii) subsequent to receiving the message: instruct the network interface to transmit, over the network, a reply to the ID that instructs the ID to instead operate in a second mode of operation, wherein the second mode of operation consumes less power than the first mode of operation.

In another broad aspect, the present disclosure relates to a method performed by a device connected to power sourcing equipment (PSE) over a data connection, the method comprising: registering a single-event classification in the physical layer; in response to the single-event classification in the physical layer: transmitting a power request to the PSE over the data connection; wherein the power request is transmitted in a Link Layer Discovery Protocol (LLDP) message, and the LLDP message is transmitted over the data connection to the PSE at a particular time within a preconfigured time window.

In another embodiment, a device is configured to be connected to power sourcing equipment (PSE) over a data connection, the device comprising: a PSE interface to interface with the PSE over the data connection; a processor to: (i) register a single-event classification in the physical layer; (ii) in response to the single-event classification in the physical layer: instruct transmission of a power request, in a Link Layer Discovery Protocol (LLDP) message, to the PSE over the data connection at a particular time within a preconfigured time window.

In another broad aspect, the present disclosure relates to a method performed by power sourcing equipment (PSE), the method comprising: for each device of a plurality of devices connected to the PSE: performing a single event classification in the physical layer; subsequently receiving a plurality of Link Layer Discovery Protocol (LLDP) messages, each one of the plurality of LLDP messages from a respective different one of the plurality of devices, and each one of the plurality of LLDP messages arriving at a different time distributed within a preconfigured time window.

In another broad aspect, the present disclosure relates to a power sourcing equipment (PSE) comprising: a plurality of ports, each port for connection to a respective different one of a plurality of devices; a power supply; and a processor to: (i) instruct the PSE to perform a single event classification in the physical layer for each device of the plurality of devices; (ii) subsequently receive a plurality of Link Layer Discovery Protocol (LLDP) messages, each one of the plurality of LLDP messages from a respective different one of the plurality of devices, and each one of the plurality of LLDP messages configured to arrive at a different time distributed within a preconfigured time window.

In another embodiment, an intermediary device (ID) configured to be connected between power sourcing equipment (PSE) and a powered device (PD), the ID comprising: a processor; a PSE interface adapted to interface with the PSE over a first connection, the first connection including data and input electrical power, the PSE interface including a buck-converter for reducing a voltage of the input electrical power from a rail level voltage to provide intermediary electrical power with a digital logic voltage level suitable for use by the processor; and a PD interface to interface with the PD over a second connection, the second connection including data and output electrical power.

In another embodiment, an intermediary device (ID) configured to be connected between power sourcing equipment (PSE) and a powered device (PD), the ID comprising: a PSE interface adapted to interface with the PSE over a first connection, the first connection including data and input electrical power, the PSE interface including PSE magnetics adapted to: (i) receive the data and input electrical power; (ii) decouple the data from the input electrical power; (iii) route the decoupled data; (iv) and a PD interface to interface with the PD over a second connection, the PD interface including PD magnetics adapted to: (i) receive the data routed from the PSE magnetics; and (ii) couple the received data with the output electrical to form the second connection with the PD.

In another embodiment, an intermediary device (ID) configured to be connected between power sourcing equipment (PSE) and a powered device (PD), the ID comprising: an input port; an output port; a processor interposing the input port and the output port, the processor including: a first physical layer electronic circuit (PHY) connected to the input port; and a second PHY connected to the output port, wherein the first PHY is adapted to operate independently of the second PHY in hardware and the first PHY is adapted to be linked, in software, to the second PHY via a network bridge.

In another broad aspect, the present disclosure relates to a system configured to be connected between power sourcing equipment (PSE) and a powered device (PD), the system comprising: an intermediary device (ID) including: an input port; an output port; a processor interposing the input port and the output port, the processor including a first physical layer electronic circuit (PHY) connected to the input port; an external network switch configured to: (i) form a power connection between the PSE and the ID; and (ii) form a data connection between the PSE and the PD.

BRIEF DESCRIPTION OF THE DRAWINGS

Embodiments will be described, by way of example only, with reference to the accompanying figures wherein.

DETAILED DESCRIPTION

There may be applications in which it is desired or necessary to insert a device on a data connection between the PSE and a PD. Such a device will be referred to as an intermediary device. The intermediary device needs to be powered, but powering the intermediary device using an auxiliary power supply may not be practical.

For illustrative purposes, specific embodiments and examples will be explained in greater detail below in conjunction with the figures.

Figure 1:
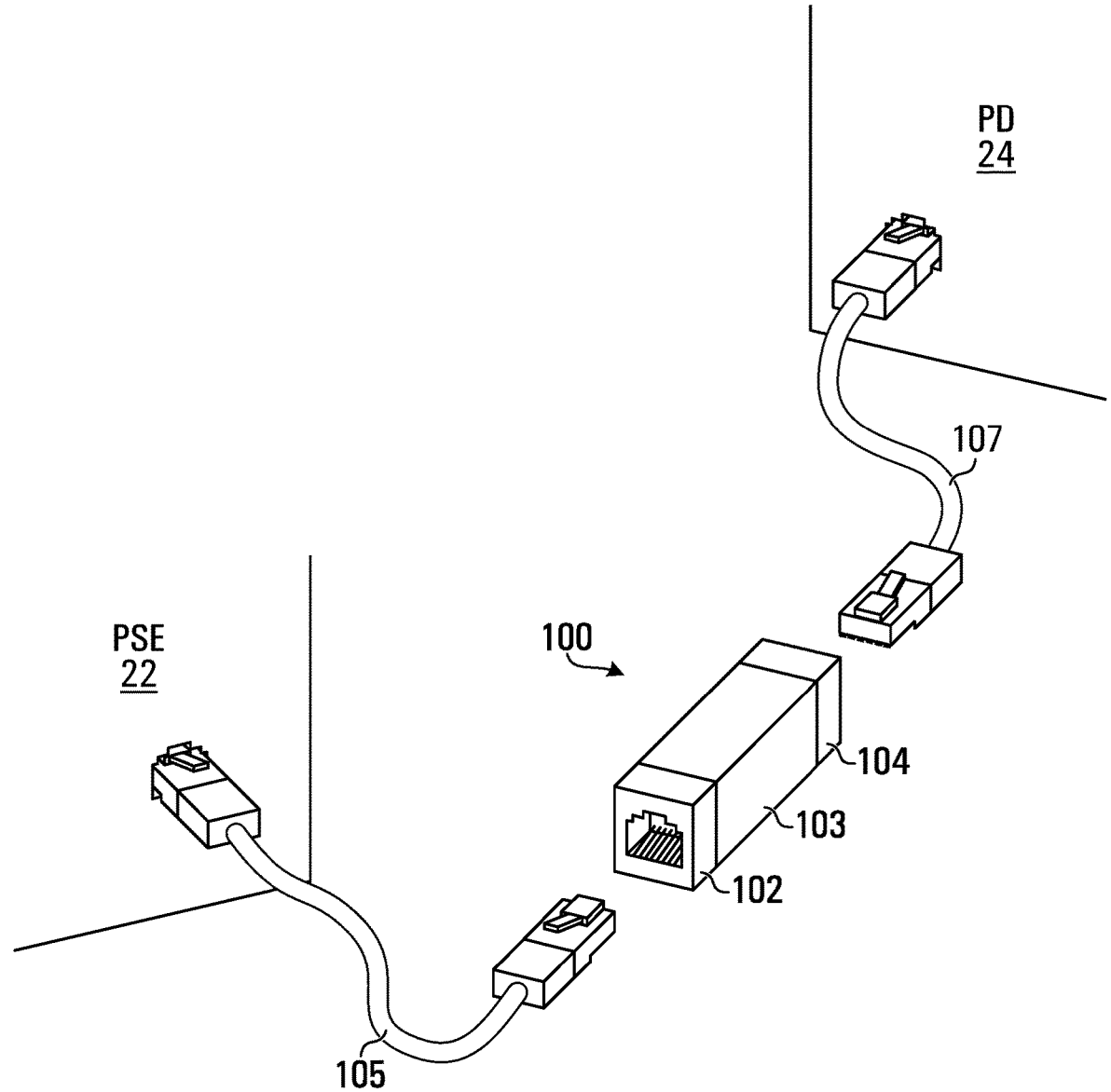
FIG. 1 illustrates an intermediary device, according to one embodiment.

FIG. 1 illustrates an intermediary device 100, according to one embodiment. The intermediary device 100 includes an input port 102, an output port 104, and a housing 103 in which the internal circuitry is stored.

In operation, the intermediary device 100 is inserted between power sourcing equipment (PSE) 22 and a powered device (PD) 24. Although the term "PSE" is often used in the context of a Power over Ethernet (PoE) standard, the term "PSE" as used herein is not limited to PoE. Instead, PSE may denote any device that supplies or injects power over a data connection. Similarly, although the term "PD" is also often used in the context of a PoE standard, the term "PD" as used herein is not limited to PoE. Instead, PD may denote a device that operates using the power supplied by a PSE over a data connection. Also, even though the term PD is used, the PD may not always be powered, e.g., when the PD is connected to the intermediary device 100 but no power is yet supplied from the intermediary device 100 to the PD.

The intermediary device 100 may be inserted into the data connection between the PSE 22 and the PD 24 by plugging a data connection cable 105 from the PSE 22 into the input port 102, and by plugging a data connection cable 107 from the PD 24 into the output port 104. The intermediary device 100 then operates according to the embodiments below to consume power supplied over the data connection, if enough extra power is available, and deliver remaining power to the PD 24. Because a given PD may or may not be configured to use the maximum amount of power the PSE 22 is configured to supply, a technical challenge exists for the intermediary device 100. Specifically, the intermediary device 100 cannot assume that there is necessarily enough power supplied by the PSE 22 for both the PD 24 and the intermediary device 100 because typically the power over a data connection is designed as point-to-point, i.e., one PD connected to a PSE port and acting as the power load, not both a PD and an intermediary device together acting as a power load. Therefore, the intermediary device 100 may need to determine if there is enough power for the intermediary device 100 to operate also, and possibly take different actions if there does not appear to be enough power for the intermediary device 100. Possible actions may include stop supplying power to the PD 24 or switching the intermediary device 100 to a lower power mode (or very low power mode) or monitoring how much power the PD 24 actually consumes to determine if the PD 24 actually consumes less power than the PD 24 requested, etc., as discussed in detail below.

The terms "input" and "output" with respect to the ports in this context pertains to expected direction of power supply and have no bearing on directionality of data flow. In certain instances, one or both of the data connection cable 105 and data connection cable 107 may be integrated with the intermediary device 100. For example, if the intermediary device 100 is intended to be installed near the PD 24, the physical connectivity of the output port 104 may be absent, with the data connection cable of a particular (e.g., short) length projecting directly from the intermediary device 100's body. Insofar as there is, within the intermediary device 100, a connection to provide data connectivity and power over the data connection cable 105, the output port 104 may still be present within the intermediary device 100, if not physically manipulatable from the outside.

Note that, in FIG. 1, cables 105 and 107 are illustrated as being Ethernet cables. This is because most of the embodiments below are explained in relation to a PoE standard. But PoE is only an example. The intermediary device 100 may operate in any application in which power is supplied over a data connection. As one example, the intermediary device 100 may be placed between a PSE and a PD operating according to the Power over Data Lines (PoDL) standard.

Most of the embodiments below are explained in relation to a PoE standard. A PoE standard may be any one of the different versions of PoE currently existing or in future use, e.g., 802.3at Type 1, 802.3at Type 2, 802.3bt Type 3, 802.3bt Type 4, etc.

Figure 2:
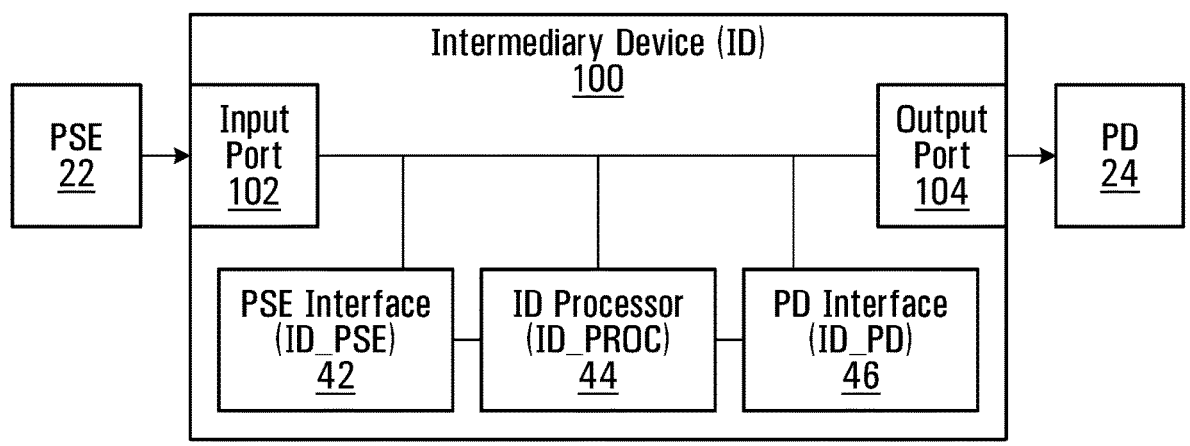
FIG. 2 is a block diagram illustrating components of the intermediary device for power extraction, according to one embodiment, the components including a PSE interface, an intermediary device processor and a PD interface.

FIG. 2 is a block diagram illustrating components of the intermediary device 100 for power extraction, according to one embodiment. The intermediary device 100 includes a PSE interface 42, an intermediary device (ID) processor 44, and a PD interface 46. The short-hand notation "ID_PSE" will be used to designate the PSE interface 42 later when describing FIG. 7, and so is also shown in FIG. 2. Similarly, the short-hand notations "ID_PROC" and "ID_PD" will be used to respectively designate the ID processor 44 and the PD interface 46 later when describing FIG. 7, and so these short-hand notations are also shown in FIG. 2.

The PSE interface 42 acts like a PD. It communicates with the PSE 22 via the input port 102, in order to request power from the PSE 22. An amount of power may be requested that is large enough to try to ensure that the intermediary device 100 can power both the intermediary device 100 and the actual PD 24. In some embodiments, the PSE interface 42 is implemented by a PD controller chip that is controlled by a processor. Also, the input port 102 is shown as separate from the PSE interface 42, but in some embodiments the input port 102 may be considered part of the PSE interface 42. The input port 102 may be implemented by an Ethernet port, e.g., a physical socket into which an Ethernet cable plugs so that the Ethernet cable is electrically connected to the intermediary device 100. Also, although not illustrated, the PSE 22 may include other components, such as a plurality of ports, with each port configured for connecting to a respective ID or PD over a data connection, a power supply for supplying power over the data connection, and a processor for controlling operation of the PSE.

The PD interface 46 acts like a PSE by supplying unused power to the actual PD 24 via the output port 104. In some embodiments, the PD interface 46 is implemented by a PSE controller chip that is controlled by a processor. Also, the output port 104 is shown as separate from the PD interface 46, but in some embodiments the output port 104 may be considered part of the PD interface 46. The output port 104 may be implemented by an Ethernet port, e.g., a physical socket into which an Ethernet cable plugs so that the Ethernet cable is electrically connected to the intermediary device 100.

The ID processor 44 manages operation of the intermediary device 100. For example, the ID processor 44 implements the power management described herein, e.g., determining whether the intermediary device 100 can operate in full power mode along with the PD 24 without exceeding the maximum amount of power configured to be supplied by the PSE 22, monitoring power consumption of the PD 24 as necessary, etc., as explained below in relation to FIG. 7. In some embodiments, the ID processor 44 is implemented by processing circuitry, which may include general purpose processor circuitry and/or more dedicated circuitry. For example, the ID processor 44 may be implemented as: a general purpose processor that executes instructions stored in memory; or a more specialized processor, such as a microcontroller; or dedicated circuitry, such as an application specific integrated circuit (ASIC), a graphics processing unit (GPU), or a programmed field programmable gate array (FPGA); or some combination of the foregoing list, e.g., a general purpose processor and some dedicated circuitry.

Before explaining the operation of the components of the intermediary device 100 in more detail, the general operation of PDs and PSEs in the context of PoE will be explained.

In some implementations in which power is supplied over a data connection, e.g., in PoE, a PD may indicate a "class" to a PSE. The class is typically signaled to the PSE at the physical layer, e.g., by using a resistor having a particular resistor value. The resistor value on the PD causes a particular level of current to be drawn from the PSE, which indicates the class to the PSE. The current drawn is considered classification current, versus operational current drawn during normal operation post-classification. The class indicates, to the PSE and at a coarse level, how much power the PD requests the PSE make available for operation of the PD. In the context of the PoE standard, there are different classes that may be signaled, e.g.:

Class 0: Default when the class is not explicitly signaled by the PD, e.g., if the PD does not include a class resistor. Available device power for the PD is up to 12.95 watts (W). The PSE actually supplies 15.4 W on the data connection to account for power loss on the cable between the PSE and PD.

Class 1: Available device power for the PD is up to 3.84 W. The PSE actually supplies 4 W on the data connection to account for power loss on the cable between the PSE and PD.

Class 2: Available device power for the PD is up to 6.49 W. The PSE actually supplies 7.0 W on the data connection to account for power loss on the cable between the PSE and PD.

Class 3: Available device power for the PD is up to 12.95 W. The PSE actually supplies 15.4 W on the data connection to account for power loss on the cable between the PSE and PD. Note that class 3 has the same maximum power as class 0.

Class 4: Available device power for the PD is up to 25.5 W. The PSE actually supplies 30 W on the data connection to account for power loss on the cable between the PSE and PD.

Other higher classes are also defined or are being defined as part of the evolution of the PoE standard, e.g., a class 5 in which the PSE supplies 45 W, a class 6 in which the PSE supplies 60 W, etc.

A PD also has a "type", which is based on the class indicated by the PD. A type 1 PD is a PD that indicates classes 1, 2, or 3, and a type 2 PD is a PD that indicates class 4. If a PD is classified as class 0, then the PD is treated as type 1. The type indicates the capability of the PD, e.g.:

Type 1: A type 1 PD must operate using no more than class 3 power (although the PD could operate using less power, e.g., class 1 or class 2 power). Also, it is not mandatory that the PD be able to perform power negotiation using the Link Layer Discovery Protocol (LLDP), and typically most type 1 PD's do not support power negotiation using LLDP. Type 1 refers to the IEEE 802.3af standard (original PoE).

Type 2: A type 2 the PD must operate using no more than class 4 power (although the PD could operate using less power, e.g., class 1, 2, or 3 power). Also, it is mandatory that the PD be able to perform power negotiation using LLDP. Type 2 refers to the IEEE 802.3at standard (PoE+).

Other higher types are also defined or being defined as part of the evolution of the PoE standard, e.g., a Type 3 corresponding to a PD indicating class 5 or class 6. In these higher types, the PD has the capability to perform power negotiation using LLDP.

When the PD has the capability to perform power negotiation using LLDP, then a more precise amount of power within a class may be requested by the PD and allocated by the PSE. For example, if the PD is type 2 and requires 18 W to operate, then the PD must indicate class 4 at the physical layer because class 3 does not result in enough power being supplied by the PSE. However, the full 25.5 W available for class 4 is not needed. Instead, only 18 W is needed. Therefore, the PD may use the LLDP to request only 18 W of power, and the PSE may therefore only allocate 18 W. If during operation the power requirements of the PD change, e.g., increase from 18 W to 22 W, then the PD may use the LLDP to request 22 W instead. But the maximum amount of power available for consumption by the PD is still limited by its class, which in this example is class 4 corresponding to 25.5 W maximum. The LLDP may allow for power within a class to be negotiated in 0.1 W increments.

A PSE also has a type, e.g., type 1 or type 2. A type 1 PSE can supply no more than class 3 power. Also, it is not mandatory that a type 1 PSE be able to perform power negotiation using LLDP, and typically most type 1 PSE's do not support power negotiation using LLDP. A type 2 PSE can supply no more than class 4 power. Also, it is not mandatory that a type 2 PSE be able to perform power negotiation using LLDP, e.g., if the PSE indicates it is type 2 at the physical layer (by a 2-event classification) and supplies class 4 power. If a PSE does not support power negotiation using LLDP, then the PSE will attempt to allocate at least the amount of power corresponding to the class indicated by the PD at the physical layer. For example, if the PD indicates class 4, then the PSE would supply 30 W to the data line (if possible) to ensure 25.5 W is available for the PD, even if the PD actually only needs 18 W. Any power request sent by the PD using LLDP would not result in a reply from the PSE. In some embodiments, a PSE can support LLDP communication for other purposes under that standard while not supporting LLDP for performing power negotiation.

A PSE may indicate its type to a PD using only the physical layer or using both the physical layer and LLDP, depending upon the capability and design of the PSE. For example, if upon connection of the PD the PSE performs a 2-event classification (consisting of two successive voltage drops in the physical layer), then the PD knows that the PSE is type 2. However, if the PSE performs only a single event classification (consisting of a single voltage drop in the physical layer), then the PD does not know whether the PSE is type 1 or type 2. In some implementations, the PSE may omit the second classification event (i.e., the second voltage drop) if the PSE determines from the first classification event that the PD is requesting class 0, 1, 2, or 3 (i.e., the PD is type 1). In any case, when the PSE only performs a single event classification, the PD may subsequently determine whether the PSE is type 1 or type 2 based on whether or not an LLDP message is received from the PSE with a granted power field. If no LLDP message is received from the PSE, or if the LLDP message received from the PSE does not include a granted power field, then the PD determines that the PSE is type 1. If an LLDP message is received from the PSE with a granted power field, then the PD determines that the PSE is type 2. An example of a granted power field is that found in a Power via medium dependent interface (MDI) type-length-value (TLV) as defined in the IEEE 802.3at standard. An LLDP message having a granted power field may be referred to as a PoE-specific LLDP message.

In general, a PSE may or may not have the capability to supply the amount of power requested by a PD. As one example, the PSE may have a total power budget shared by multiple ports. If other PDs are already connected to the PSE and collectively use up most or the entire power budget, then there may not be enough remaining power to meet the class request of a newly connected PD. In some embodiments, if the PSE cannot meet the class request of the PD, then the PSE may stop powering the port the PD is connected to such that no power is supplied to the PD. In other embodiments, if the PSE cannot meet the class request of the PD, then the PSE may allocate the maximum amount of power it is able to the port and the PD may need to operate in a reduced power mode or may itself have to shut down for lack of available power.

Figure 3:
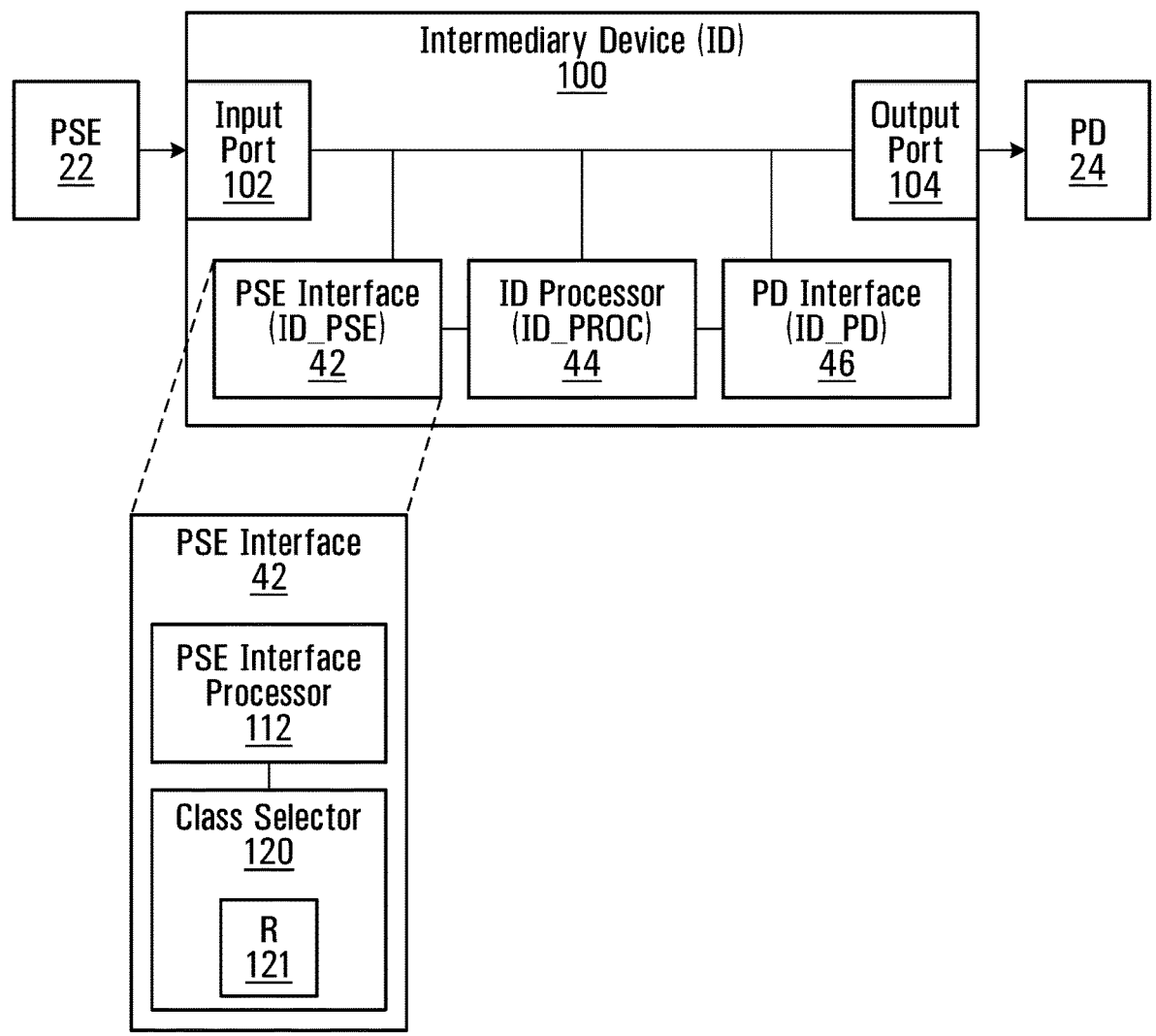
FIG. 3 illustrates the PSE interface of the intermediary device of FIG. 2 in more detail, according to one embodiment.

FIG. 3 illustrates the PSE interface 42 in more detail, according to one embodiment. The PSE interface 42 includes a PSE interface processor 112 and a class selector 120. The PSE interface 42 may include other components also that are not illustrated, e.g., accompanying circuitry, a detection resistor, etc. Also, in some embodiments, the PSE interface 42 may be implemented by a PD controller chip controlled by a processor, and the processor may be the PSE interface processor 112 or, alternatively, the ID processor 44.

The PSE interface processor 112 may be implemented as: a specialized processor, such as a microcontroller; or a general purpose processor that executes instructions stored in memory; or dedicated circuitry, such as an ASIC, GPU, or a programmed FPGA; or some combination of the foregoing, e.g., a general purpose processor and some dedicated circuitry. In some embodiments, the PSE interface processor 112 may actually be part of the ID processor 44, e.g., a single ID processor 44 may be used for all processing operations in the intermediary device 100. However, in the illustrated implementation, the PSE interface processor 112 is illustrated separate from the ID processor 44.

The class selector 120 may be implemented as a resistor 121 having a particular resistor value corresponding to a class. For example, the resistor 121 may be configured to request a high class or the highest class (e.g., class 4 for PoE+). In an alternative embodiment, the class selector 120 may instead be implemented by an array 121 of resistors, e.g., each resistor corresponding to a respective class, in which case the class selector 120 may also include a switch (not shown) to switch between the resistors depending upon what class is to be indicated to the PSE 22. In such embodiments, the PSE interface 42 may be configurable (e.g., through software) to configure or change which resistor is used, i.e., to configure or change which class is to be indicated to the PSE 22. For example, and as described in more detail later, a network operator or technician may use a laptop, mobile device, or desktop computer to configure the intermediary device 100 (either directly or via a server). One of the configurations that may be applied is which resistor value is used (i.e., which class is indicated) at the PSE interface 42.

In operation, when the intermediary device 100 is first connected to the PSE 22, the class selector 120 of the PSE interface 42 draws current from the PSE 22 in order to indicate the class of the intermediary device 100 to the PSE 22. The processor 112 of the PSE interface 42 also possibly performs power negotiation with the PSE 22 using LLDP, depending upon the capability of the PSE 22 and the class/type of the intermediary device 100 indicated by the class selector 120. Operations of the PSE interface 42 are controlled by the PSE interface processor 112. An example of specific operations that may be performed by the PSE interface 42 are described below in relation to FIG. 7.

Figure 4:
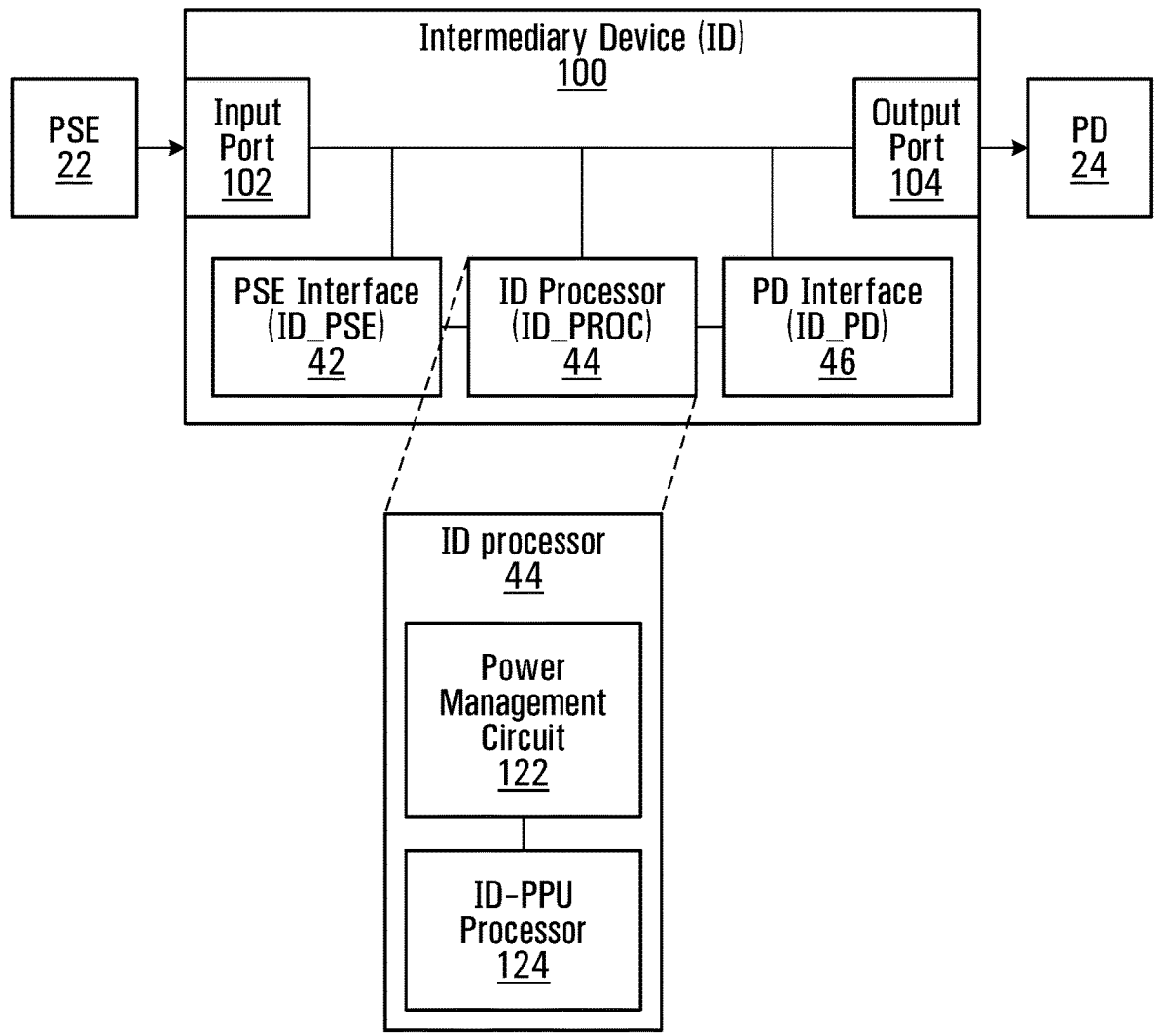
FIG. 4 illustrates the intermediary device processor of the intermediary device of FIG. 2 in more detail, according to one embodiment.

FIG. 4 illustrates the ID processor 44 in more detail, according to one embodiment. The ID processor 44 implements a power management circuit 122 and an ID-PPU processor 124. In some embodiments, the power management circuit 122 is implemented by dedicated circuitry, e.g., by one or more voltage converters. Alternatively, the power management circuit 122 may be implemented by more general circuitry, e.g., a general processor or controller executing instructions. The ID-PPU processor 124 is implemented as: a specialized processor, such as a microcontroller; or a general purpose processor that executes instructions stored in memory; or dedicated circuitry, such as an ASIC, GPU, or a programmed FPGA; or some combination of the foregoing list, e.g., a general purpose processor and some dedicated circuitry. In operation, the ID processor 44 receives power from the PSE interface 42. The power management circuit 122 may convert the received voltage into different values to power multiple components, such as the ID-PPU processor 124 and the PD interface 46. The ID-PPU processor 124 coordinates power management and possibly communicates with devices on the network through the input port 102.

Figure 5:
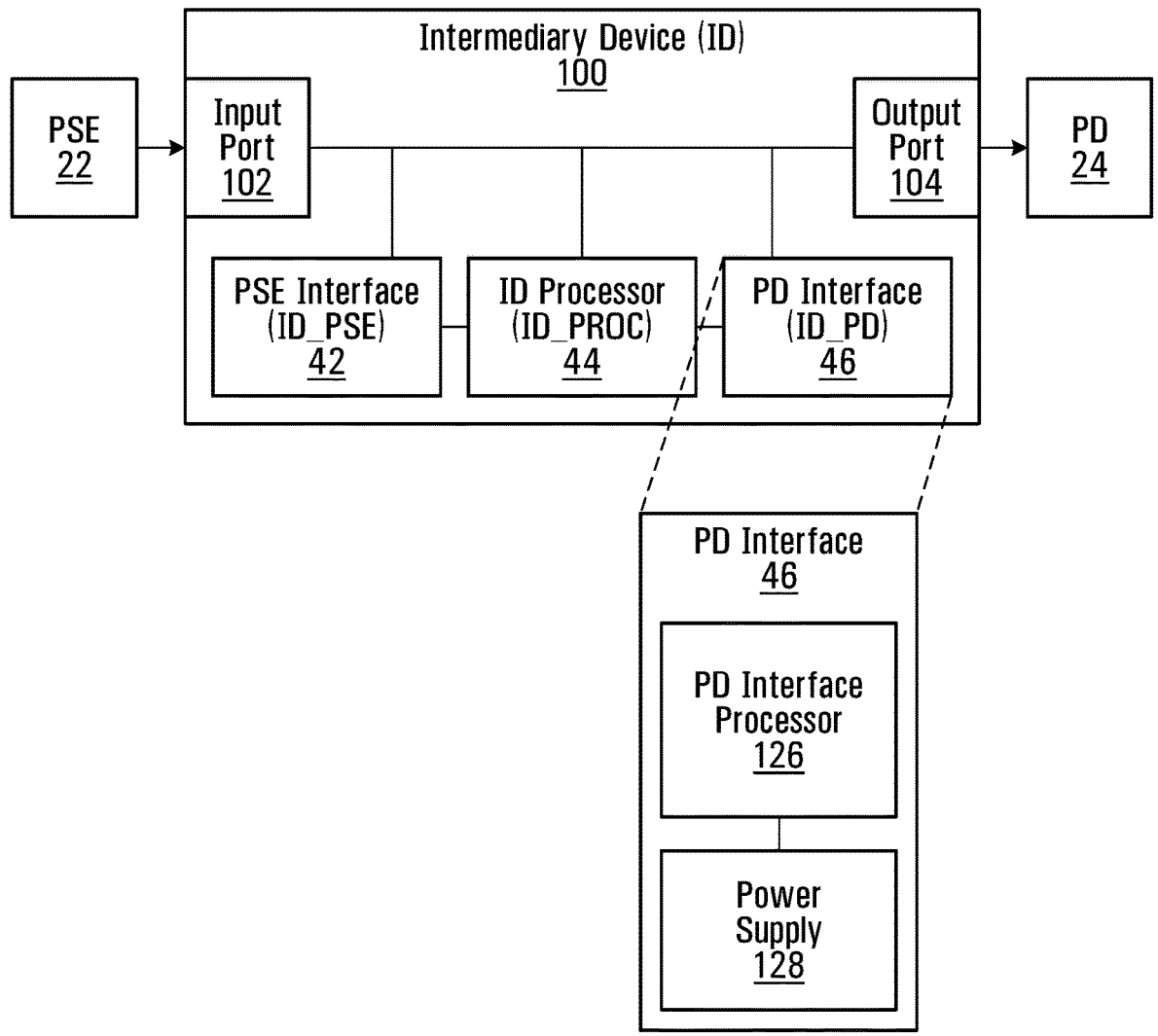
FIG. 5 illustrates the PD interface of the intermediary device of FIG. 2 in more detail, according to one embodiment.

FIG. 5 illustrates the PD interface 46 in more detail, according to one embodiment. The PD interface 46 includes a PD interface processor 126 and a power supply 128 (e.g., a variable voltage power supply). The PD interface 46 may include other components also that are not illustrated, e.g., accompanying circuitry. Also, in some embodiments, the PD interface 46 may be implemented by a PSE controller chip controlled by a processor, and the processor may be PD interface processor 126 or alternatively ID processor 44.

The PD interface processor 126 may be implemented as: a specialized processor, such as a microcontroller; or a general purpose processor that executes instructions stored in memory; or dedicated circuitry, such as an ASIC, GPU, or a programmed FPGA; or some combination of the foregoing list, e.g., a general purpose processor and some dedicated circuitry. In some embodiments, the PD interface processor 126 may actually be part of the ID processor 44, e.g., a single ID processor 44 is used for all processing operations in the intermediary device 100. However, in the illustrated implementation, the PD interface processor 126 is illustrated separate from the ID processor 44.

In operation, the PD interface 46 receives power, either directly from the PSE interface 42, or via the ID processor 44. PD interface processor 126 controls the power supply 128 to initiate a connection procedure through the output port 104 with the PD 24. One or more event classifications are performed using the power supply 128. The PD interface processor 126 also possibly performs power negotiation with the PD 24 using LLDP, depending upon the type indicated by the PD 24 and the capability of the PD interface 46. Operations of the PD interface 46 are controlled by the PD interface processor 126. An example of specific operations that may be performed by the PD interface 46 are described below in relation to FIG. 7.

Figure 6:
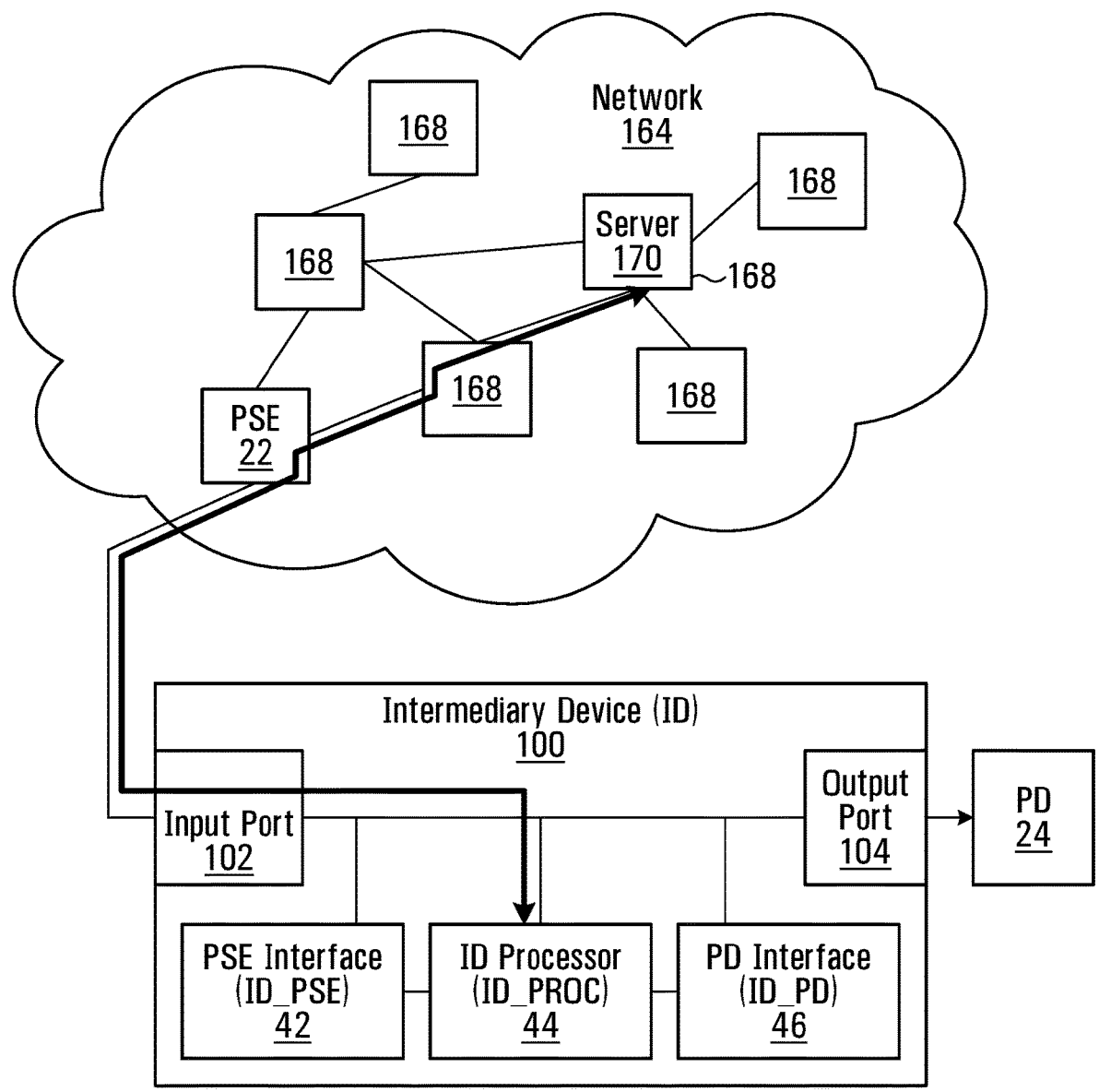
FIG. 6 illustrates an embodiment of a network having the PSE at a network edge.

In some embodiments, the PSE 22 is included as part of a network, and the intermediary device 100 may communicate with one or more nodes on the network. For example, FIG. 6 illustrates an embodiment of a network 164 having the PSE 22 at a network edge. The network 164 includes a plurality of network elements 168. Examples of network elements 168 include routers, workstations, servers, interfaces to other networks (e.g., a connection to the internet), etc. One of the network elements 168 is a server 170. In some embodiments, when the intermediary device 100 is connected to the PSE 22, the intermediary device 100 can communicate with the server 170 by transmitting and receiving messages over the data connection through input port 102. Examples of messages that may be transmitted to/received from the server 170 are described later. Even if the intermediary device 100 does not have enough power for full operation, in some embodiments, the intermediary device 100 still consumes just enough power to allow for the intermediary device 100 to have at least a rudimentary level of operation, e.g., the ability for the intermediary device 100 to communicate with the server 170.

In some embodiments, the server 170 may provide messages from the intermediary device 100 to a network operator, e.g., by forwarding the messages for display on a graphical user interface (e.g., display screen) of a computing device used by the network operator (not illustrated). In some embodiments, the server 170 may transmit instructions to the intermediary device 100, e.g., instructions such as "stop powering the PD", "continue powering the PD", etc. The instructions may originate from the network operator's user interface (not illustrated). The network operator's user interface may be a keyboard and/or display screen and/or touchscreen, etc. In some embodiments, the instructions from the server 170 may include one or more configuration messages to configure the intermediary device 100, e.g., as discussed later.

In some embodiments, the intermediary device 100 may perform monitoring, e.g., in the manner described herein, and report to the server 170 if anything relating to the power consumption of the PD 24 appears suspicious. For example, if the PSE 22 does not perform power monitoring, the intermediary device 100 may perform power monitoring on behalf of the PSE 22 and report to the server 170. As an example, if the PD 24 requests, is granted, or begins to draw an unusually large amount of power (e.g., a current draw above a predetermined threshold, such as above the maximum amount of power granted to the PD 24 or the maximum amount of power corresponding to the class of the PD 24 as indicated by the PD 24), then this may be reported to the server 170 by the intermediary device 100. In some embodiments, the information sent from the intermediary device 100 to the server 170 may be viewed by the network operator. In some embodiments, the server 170 may automatically perform certain actions based on the information from the intermediary device 100 (e.g., automatically send a message to the intermediary device 100 instructing the intermediary device 100 to stop powering the PD 24 if information from the intermediary device 100 indicates that the PD 24 is operating in a suspicious manner). In some embodiments, the server 170 sends instructions to the intermediary device 100 based on instructions from the network operator (e.g., the network operator indicates to the server 170 that the intermediary device 100 should stop powering the PD 24, and in response the server 170 transmits such an instruction to the intermediary device 100).

More generally, any messages generated by the intermediary device 100 do not necessarily have to be transmitted to a server 170 in the network 164 or even to the network 164. For example, the intermediary device 100 may instead have a display, and a message is displayed on the display of the intermediary device 100. As another example, a message may be wirelessly transmitted (e.g., via Bluetooth or Wi-Fi) to equipment possessed by the user installing the intermediary device 100. The equipment may or may not be part of the network 164. In some embodiments, the message may be transmitted to a user's mobile device, e.g., if the user's mobile device has a computer application ("app") installed on it that allows for communication with the intermediary device 100. In some embodiments, that same app may also be used by the user to configure the intermediary device 100.

In some embodiments the intermediary device 100 may be configured to receive and act upon messages, e.g., sent from the network 164 over the data connection. For example, the intermediary device 100 may send a message to the server 170 that invites a course of action to be instructed by the server 170. For example, the intermediary device 100 may send a message indicating that the PD 24 is consuming too much power. As another example, the intermediary device 100 may send a message indicating that the intermediary device 100 cannot fully operate without exceeding the maximum amount of power to be supplied by the PSE 22. The server 170 may send a response message to the intermediary device 100 (e.g., "stop powering the PD"), and the intermediary device 100 may be configured to act on that response message. Examples of response messages include messages to instruct the intermediary device 100 to: stop powering the PD 24, or reduce the amount of power granted to the PD 24, or deny the PD 24's power request, or change the mode of operation of the intermediary device 100 so that the intermediary device 100 consumes less power (e.g., enter a sleep mode in which the intermediary device 100 works in a pass-through mode powering only the PD 24 and not the intermediary device 100, except for a very basic level of functionality of the intermediary device 100), etc. In some embodiments, the messages received by the intermediary device 100 may be unprompted by the intermediary device 100, e.g., configuration messages may be received by the intermediary device 100, where the configuration messages provide settings to configure the intermediary device 100, such as the intermediary device configurations described later.

FIG. 7, consisting of FIGS. 7A-D, is a flowchart illustrating operation of an intermediary device, according to one embodiment. The operations described in relation to FIG. 7 are specific to an intermediary device operating under the PoE standard, and more specifically an intermediary device operating under the PoE and PoE+ versions of the standard in which types 1 and 2 and classes 0-4 are defined. The operations described in relation to FIG. 7 do not encompass the possibility of PoE type 3 devices and beyond (and hence classes 5 and up). However, the method of FIG. 7 may be modified to also encompass PoE type 3 devices and beyond (and hence classes 5 and up).

In FIG. 7 and its description, the following notation is used:

PSE: The power sourcing equipment, e.g., PSE 22 of FIG. 2.
PD: The powered device, e.g., PD 24 of FIG. 2.
ID: Intermediary device, e.g., intermediary device 100 of FIG. 2
ID_PSE: The PSE interface of the intermediary device, e.g., PSE interface 42 of FIG. 2.

ID_PROC: A processor in the intermediary device that performs processing, control, and management functions, e.g., ID processor 44 of FIG. 2.

ID_PD: The PD interface of the intermediary device, e.g., PD interface 46 of FIG. 2.

PSE_pwr: The power the PSE allocates to the ID.

ID_pwr: The power consumed by the ID, which is either a known constant or is monitored by the ID.

PD_pwr: The power requested by the PD.

PD_w: The power actually consumed by the PD.

Figure 7A:
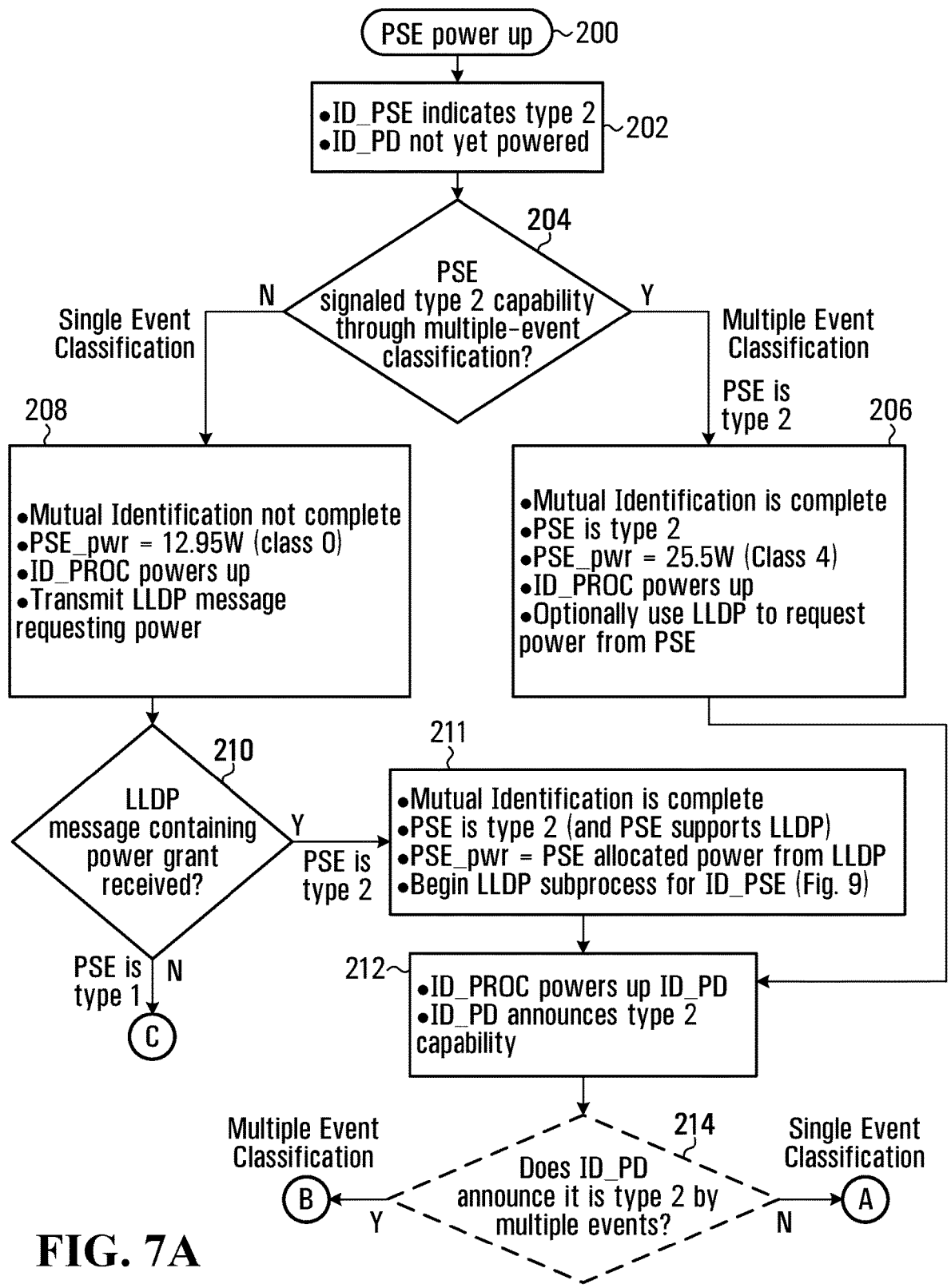
FIG. 7, consisting of FIGS. 7A-D, is a flowchart illustrating operation of the intermediary device, according to one embodiment.

Turning first to FIG. 7A, at step 200 the ID is connected between the PSE and the PD, and the PSE is powered up if not already powered.

At step 202, the ID_PSE indicates that the ID is type 2 using a resistor on the ID_PSE (e.g., resistor 121 of FIG. 3). The resistor has a preconfigured resistance value that causes a current draw of a particular magnitude that indicates to the PSE that the ID is class 4. Class 4 corresponds to type 2. The current draw occurs in a first classification event (i.e., a first voltage drop) at the physical layer. Classification at the physical layer is sometimes referred to as classification by hardware, hardware classification, or physical layer classification. Note that at step 202 the ID_PD is not yet powered.

At step 204, the ID_PSE determines if the PSE has signalled that the PSE is type 2 through multi-event classification. Depending upon how the PSE is implemented, the PSE may be configured to indicate, at the physical layer, that it is type 2 by performing two-event classification (two voltage drops). If the ID_PSE registers the two-event classification, then the ID_PSE determines that the PSE is type 2 and the method proceeds to step 206. If the ID_PSE only registers a single classification event (single voltage drop), then the ID_PSE does not know whether the PSE is type 1 or type 2, and the method proceeds to step 208.

If step 206 is reached, it means that mutual identification is complete: the PSE knows that the ID is type 2 (from step 202) and the ID knows that the PSE is type 2 (from the two-event classification in step 204). The PSE allocates class 4 power to the ID, i.e., PSE_pwr=25.5 W. At step 206, the ID_PROC is powered up.

Depending upon the implementation, at step 206 the ID_PSE may or may not begin an LLDP subprocess to request a power amount from the PSE. In some embodiments, the ID_PSE does not use LLDP to request a power amount because there was multi-event classification at the physical layer indicating class 4 power (25.5 W) is allocated for the ID_PSE. In other embodiments, the ID_PSE does use LLDP to request a power amount, which may be 25.5 W or may be a lower amount in some embodiments.

If there is multi-event classification at the physical layer indicating class 4 power (25.5 W) is allocated by the PSE for the ID_PSE, and if an amount of power that is less than 25.5 W is then requested by the ID_PSE using LLDP, and if that request is denied, then there is a conflict between the LLDP exchange and the physical layer classification because the physical layer classification indicated that 25.5 W is allocated from the PSE. This situation may arise, for example, when: (1) a POE injector is interposed between the ID and a type 2 PSE; and (2) the type 2 PSE is not able to supply class 4 power, e.g., it can only supply a lower amount of power due to a limit imposed by the total power budget of the PSE; and (3) the POE injector is able to supply the class 4 power to the ID but does not support LLDP power negotiation. In such a situation, 25.5 W is allocated to the ID by the POE injector, and the physical layer multi-event classification has indicated to the ID that the 25.5 W of power is allocated. However, the LLDP messages pass through the POE injector and LLDP negotiation is between the ID_PSE and the PSE. The PSE cannot supply 25.5 W on its output port and so may deny the power request from the ID_PSE, even though the power is actually available because of the presence of the POE injector. In some embodiments, whenever there is a conflict between the physical layer classification and the power negotiation at the LLDP level, the ID_PSE may be configured to ignore the power negotiation at the LLDP level and rely upon the indication of allocated power from the physical layer classification.

Note that in some embodiments the PSE may be designed such that the PSE does not support LLDP on top of physical layer classification, e.g., the PSE indicates it is type 2 via multi-event classification at the physical layer and hence allocates 25.5 W, and the PSE does not additionally support an LLDP negotiation to allocate less power.

Upon completion of step 206, the method proceeds to step 212, which is described later.

Returning to step 208, if this step is reached then it means that the ID_PSE only registered a single classification event (single voltage drop) at the physical layer, and so the ID_PSE does not know yet whether the PSE is type 1 or type 2. Mutual identification is therefore not yet complete: the PSE knows the ID is type 2 (from step 202), but the ID does not know whether the PSE is type 1 or type 2. At this point, because there has not been mutual identification, the ID is treated as class 0 and the power allocated by the PSE is of class 0, i.e., PSE_pwr=12.95 W. The ID operates on the assumption that 12.95 W is allocated, and the ID_PROC is powered up. The ID_PSE transmits an LLDP message to the PSE on the data link layer. The LLDP message requests a particular amount of power. In some embodiments, the amount of power requested in the LLDP message is 25.5 W, i.e., the maximum amount of power the PSE could possibly allocate if the PSE is type 2. Because the ID does not know yet the amount of power that will be requested by the PD, it is prudent for the ID to request the maximum amount of power from the PSE. On the other hand, the more power that is requested, the higher the chance that the PSE may deny the power request. For example, if the PSE had multiple ports, and connected to each port was a respective ID that on power-up requested 25.5 W via LLDP, then the PSE's total power budget may be exceeded and the PSE may deny one or multiple of the power requests. Therefore, in some embodiments, the ID may use LLDP to request an amount of power less than 25.5 W. In some embodiments, the amount of power initially requested by the ID using LLDP is configurable. As one example, just prior to installation, the ID may be configured by a technician to request less power than 25.5 W, e.g., if it is known by the technician that the ID will be used with a PD that has a lower power requirement (e.g., a type 1 PD that only requires a maximum of 12.95 W).

In some embodiments, at step 208, the amount of power initially requested by the ID_PSE using LLDP is fixed at 25.5 W and other means are used to try to avoid the problem of exceeding the PSE's total power budget when multiple IDs connected to the PSE all power up at the same time and all initially request 25.5 W. For example, each ID may be configured to send its LLDP message having the initial power request at some time within a preconfigured window during power-up. In some embodiments, each ID may be configured to send its LLDP message having the initial power request at a random time within the preconfigured window, which would randomly distribute the initial LLDP power requests from multiple IDs powering up at the same time. In other embodiments, each ID may be configured to send its LLDP message having the initial power request at a different time within the preconfigured window, e.g., based on the priority of the ID so that higher priority IDs make their request before lower priority IDs. In any case, an ID making an initial request earlier in time may, within the preconfigured window, follow up with a subsequent LLDP message requesting less power (when possible) based on the actual power requirements of the PD to which the ID is connected. If the ID learns the actual power requirement of the PD and sends the subsequent LLDP message requesting less power before another ID makes its initial LLDP power request, then the PSE may have more power budget to accommodate the other ID's initial LLDP power request. In other embodiments, an ID may first determine the amount of power requested by the PD (or monitor how much power is actually being consumed by the PD), and then base the ID's initial LLDP power request sent in step 208 on the actual power required, rather than necessarily requesting the maximum amount of 25.5 W.

In any case, upon sending the initial LLDP power request at step 208, the method proceeds to step 210 where it is determined whether or not a reply to the initial LLDP power request is received from the PSE over the data link. The transmission over the data link may be made via a medium dependent interface (MDI) type-length-value (TLV) information string. If no LLDP message is received by the ID over the data link, or if an LLDP message is received but has no power-grant field, then the ID determines that the PSE must be type 1, and the method proceeds to step 252 (start of FIG. 7D, described later). Otherwise, if a power grant is received in an LLDP message from the PSE over the data link, then the ID determines that the PSE must be type 2, and the method proceeds to step 211.

If step 211 is reached, it means that mutual identification is complete: the PSE knows that the ID is type 2 (from step 202) and the ID knows that the PSE is type 2 (due to receipt of a power grant in an LLDP message in step 210). The power allocated to the ID is that which was granted in the LLDP message from the PSE. For example, if the ID requested 25.5 W, then the power grant in the LLDP message may be for the 25.5 W requested. An LLDP subprocess begins for the ID_PSE, which is used for any future power renegotiation between the ID and the PSE. This LLDP subprocess is described later in relation to FIG. 9. The method proceeds to step 212.

Step 212 is reached either from step 206 or step 211. In either case, if step 212 is reached, it means that mutual identification is complete, and more specifically, the PSE knows that the ID is type 2 (from step 202) and the ID knows that the PSE is type 2 (from step 206 or 211). At step 212 the ID_PROC powers up the ID_PD so that the ID_PD can announce type 2 capability to the PD. Stippled diamond 214 indicates that the ID_PD can announce type 2 capability to the PD in two ways: (1) by performing a single event-classification in the physical layer (a single voltage drop) followed by the ID_PD indicating type 2 via LLDP, or (2) by performing a multi-event classification (two voltage drops) in the physical layer, which itself serves as an announcement of type 2. In some embodiments, the way in which the ID_PD announces type 2 capability may be configurable, e.g., which one of the two possible ways may be selected prior to installing the ID.

Figure 7B:
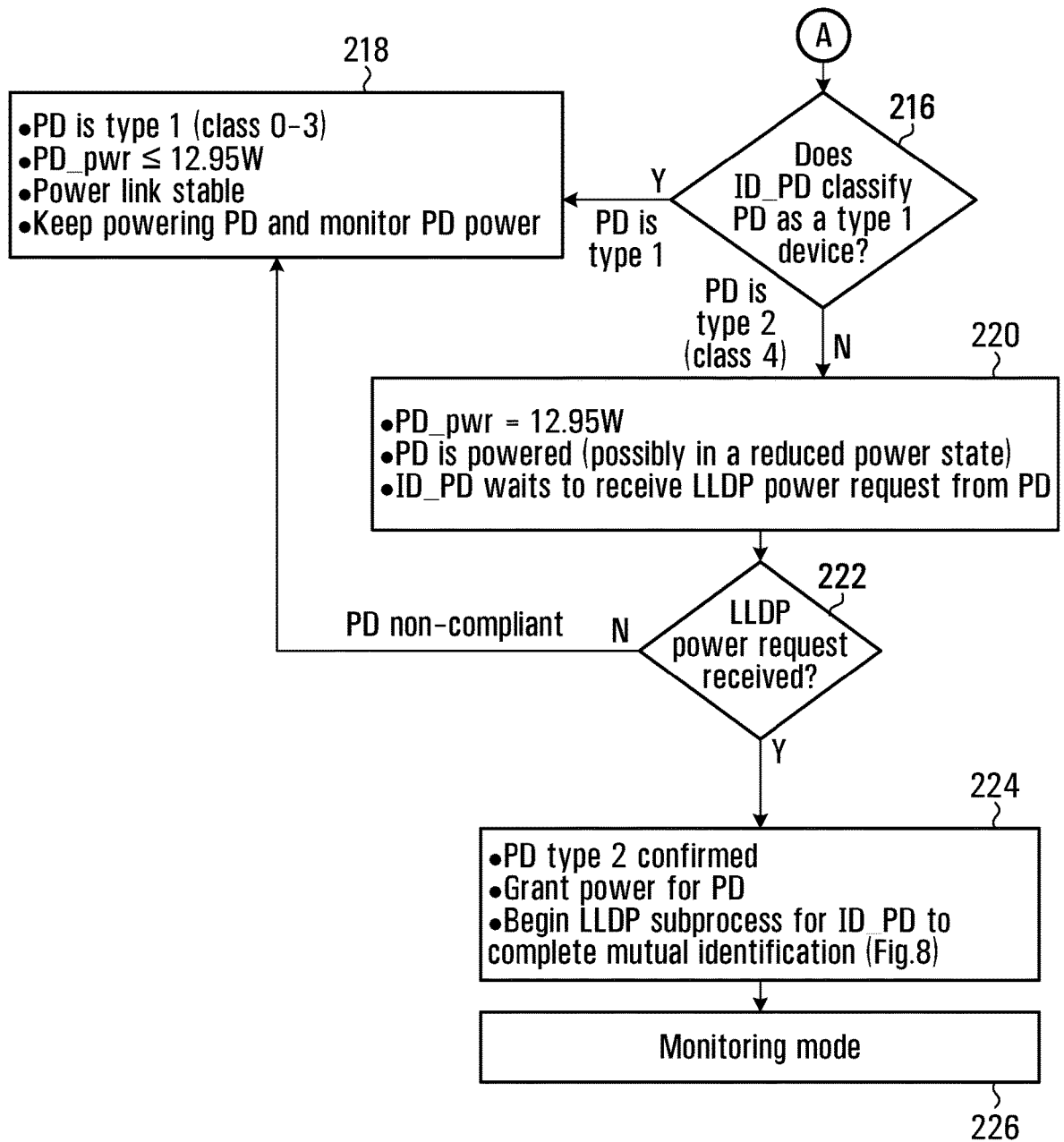

Turning to FIG. 7B, step 216 is reached when the ID_PD is configured to announce type 2 capability to the PD by performing a single-event classification in the physical layer followed by the ID_PD indicating type 2 via LLDP. At step 216, the ID_PD determines whether the PD is type 1 based on the current draw from the PD in the single-event classification. The current draw indicates the class of the PD, which is indicative of the PD type. If the class of the PD is 0, 1, 2, or 3, then the PD is type 1 and the method proceeds to step 218.

At step 218, the PD is type 1 (because it is class 0, 1, 2, or 3), and the PD is therefore not requesting more than class 0/3 power of 12.95 W, i.e., PD_pwr≤12.95 W. In this situation the ID should have no problem operating because the PSE has indicated to the ID that it is type 2 and can therefore provide the ID with up to 25.5 W of power, while the PD has requested no more than 12.95 W, which leaves a generous window of power for the ID to use for its operation. In some embodiments, in this situation the ID_PSE may use LLDP to request less than 25.5 W of power from the PSE. For example, if the ID only consumes maximum 2 W for its own operation, then only 2 W+maximum 15.4 W (to supply 12.95 W to the PD under the PoE standard)=17.4 W total should be needed by the ID. The ID_PSE may use LLDP to only request 17.4 W from the PSE instead of the full 25.5 W. In some embodiments, the ID may still monitor the power consumed by both it and the PD to ensure it does not exceed the maximum amount of power that is allocated from the PSE, which may be a concern if the ID is operating in a high-power mode (e.g., the ID uses 10 W of power for itself). Power may be monitored using a current sensor in the ID. The amount of current draw indicated by the current sensor is indicative of the amount of power consumption. If the total power consumed by the PD and ID exceeds a certain threshold, e.g., exceeds the total power allocated to the ID by the PSE, then the ID may perform any one of Actions 1 to 4 discussed in detail later, e.g., switch to a lower power mode or no longer power the PD.

Returning to step 216, the single-event classification may indicate to the ID_PD that the PD is class 4, i.e., type 2, in which case the method proceeds to step 220. At step 220, the power requested by the PD is defaulted to 12.95 W (i.e., PD_pwr=12.95 W) because mutual identification is not yet complete: the ID_PD knows that the PD is type 2, but the PD does not know yet that the ID_PD is type 2. The PD may need to operate in a reduced power state (no more than 12.95 W of power consumption). The ID_PD waits for a LLDP power request from the PD.

At step 222, if an LLDP power request is not received by the ID_PD from the PD, then the PD is non-compliant with the PoE standard, because a PD that indicates class 4 must be able to perform LLDP power negotiation. In this situation, the PD is treated as type 1, and the method proceeds to step 218 (or alternatively another action may be taken such as not powering the PD). Otherwise, if an LLDP power request is received by the ID_PD from the PD, as should be the case at step 222, then this acts as confirmation that the PD is indeed type 2, and the method proceeds to step 224.

If step 224 is reached, the ID_PD has confirmed that the PD is type 2 (class 4). The ID_PD grants the requested power to the PD via a reply LLDP message, which also acts as a confirmation for the PD that the ID_PD is also type 2. Mutual identification is therefore complete. An LLDP subprocess begins for the ID_PD, which is used for any future power renegotiation between the ID and the PD. This LLDP subprocess is described later in relation to FIG. 8.

If step 224 is reached, then both the PSE and the PD are type 2. This means that it could be the case that the PD consumes the maximum amount of power allocated by the PSE, leaving no power for the ID. The method therefore proceeds to step 226, at which time the operation of the ID enters a monitoring mode. Depending upon configuration or implementation of the ID, the ID may perform one or both of the following possible options in monitoring mode 226.

Option 1: The ID determines the amount of power it is to provide to the PD based on the power requested by the PD (PD_pwr). For example, if PD_pwr=25.5 W, then as per the PoE standard the ID should provide 30 W on the data connection to the PD. The ID also determines the amount of power to be consumed by the ID for its operation (ID_pwr). For example, if the ID is required to supply 30 W on the data line to the PD, and the ID consumes 2 W for its own operation, then the total amount of power needed by the ID to satisfy its own power requirements and to satisfy the power request from the PD is 32 W. The ID then compares this total power to the amount of power allocated by the PSE (PSE_pwr). If the total amount of power needed by the ID to satisfy its own power requirements and to satisfy the power request from the PD exceeds the total amount of power allocated by the PSE, then the ID performs one of the following possible actions:

- Action 1: The ID delivers all or substantially all of the power from the PSE to the PD, and otherwise the ID ceases operation. However, a drawback of the ID ceasing operation is that the ID is then not serving the function it was designed to fulfill. For example, the ID may serve an important role, e.g., operating as a firewall to filter messages from an untrusted PD. Ceasing operation of ID may not be desired or permitted. In one embodiment, if the ID ceases operation, then before doing so the ID transmits a message over the network to a server (e.g., server 170) indicating that the ID is ceasing operation. The message may be made available to be read by a network operator. The network operator may make a decision to take appropriate action based on the message.
- Action 2: Alternatively, the ID may stop supplying power to the PD. In some embodiments, and depending upon the purpose of the ID, this course of action could be premised on the assumption that if there is not enough power for the ID to fully operate, then the ID cannot serve the function it was designed to fulfill (e.g., protecting the network), and so the PD should not be permitted to be connected to the network. The ID may transmit a message over the network to a server (e.g., server 170) indicating that the PD cannot be connected and possibly explaining the reason why. Alternatively, if the ID is designed to perform a function independent of the PD, e.g., the ID is a light, then the ID may stop supplying power to the PD but still consume power for the ID's own use/functionality.
- Action 3: Alternatively, the ID operates in a reduced power mode, e.g., consumes only a very low amount of power for itself, e.g., a few milliwatts, to perform some basic functions such as monitoring power consumption of the PD and/or reporting to a server on the network (e.g., server 170) and/or connection tracking, etc. The ID may send a message to the server on the network indicating the mode in which the ID is operating. The message may be sent by the ID during the reduced power mode, if the reduced power mode allows it, or perhaps just before the ID enters the reduced power mode.
- Action 4: Alternatively, the ID continues operation, possibly in a lower power mode, but not necessarily. The ID consumes the power it needs and remaining power is passed to the PD. The total power drawn from the PSE may not actually exceed the total power allocated by the PSE. For example, the PD may actually consume less power than the PD requested. As another example, the power loss on the line between the PSE and the ID may be less than what is accounted for in the PoE standard, thereby allowing for more power to actually be consumed by the ID/PD than that indicated as being allocated by the PSE. For example, the PSE may allocate 25.5 W to the ID, but as per the PoE standard this means that the PSE actually supplies 30 W on the assumption that 4.5 W will be lost on the line between the PSE and ID. However, if only 1 W is lost on the line, then 29 W is actually available for use by the PD and ID. The PSE can stop powering the ID (and hence also the PD) if the total actual power draw is beyond what the PSE agreed to provide. The ID may send a message to the server indicating that there is a type conflict (i.e., both the PSE and PD are type 2), and that the ID is at risk of being no longer powered by the PSE if too much power is drawn.
- Action 5: The ID defaults to Option 2.

Option 2: The ID may implement Option 2 instead of Option 1. Alternatively, the ID may implement Option 2 if in Option 1 it is determined that the total amount of power needed by the ID to satisfy its own power requirements and to satisfy the power request from the PD exceeds the total amount of power allocated by the PSE. In Option 2, the ID consumes the power it needs for operation, and monitors to see if the power consumed by the ID (ID_pwr) plus the actual power (PD_w) consumed by the PD is greater than the power allocated by the PSE. The power consumed may be measured by measuring the current flow, e.g., using a current sensor. If the total power consumed is less than the power allocated by the PSE, then the ID continues in normal operation and continues to power the PD, but keeps checking (e.g., periodically) the total power consumption to ensure that the total power consumed remains less than the power allocated by the PSE. Note that the PSE may allow the power load to be exceeded for a brief amount of time before the PSE stops powering the ID, which may allow the ID enough time to take appropriate action if too much power is being consumed by the combined operation of the ID and the PD. If the ID determines that the power consumed by the ID (ID_pwr) plus the actual power (PD_w) consumed by the PD is greater than the power allocated by the PSE, then the ID may perform any one of Actions 1 to 4 discussed above in relation to Option 1. In particular, the ID may cease its own operation (Action 1) or stop powering the PD (Action 2) or operate in a reduced power mode (Action 3) or continue operation on the assumption that it may be possible to draw more power from the PSE than allocated by the PSE if the line between the PSE and the ID does not consume much power (Action 4).

The operations in monitoring mode 226 may be implemented and controlled by a processor in the ID, e.g., the ID_PROC. The amount of power actually consumed in Option 2 may be determined using a current sensor in the ID. The current draw measured by the current sensor may be read by the ID_PROC. The amount of current draw is proportional to the power draw, such that if the amount of current drawn exceeds a predetermined threshold, it is determined by the ID_PROC that the power consumed exceeds the amount allocated by the PSE.

In view of the different options and actions discussed above, and which may be taken in the monitoring mode 226, it will be appreciated that the ID may be configured with different modes of operation corresponding to different levels of functionality, depending upon the power available for consumption by the ID. For example, if the ID is a firewall, it may have a preferred full power mode in which the ID processor performs deep packet inspection and analytics, but if the amount of power consumed by the ID causes the power load on the PSE to exceed the amount of power allocated by the PSE, then the ID may switch to a medium power mode in which the ID performs less intensive operations, e.g., connection tracking. If the amount of power consumed by the ID still causes the power load on the PSE to exceed the amount of power allocated by the PSE, then the ID may switch to a low power mode in which the ID performs very low intensity operations, e.g., monitoring the available power to determine if/when it can move to a higher power mode. The status of operation of the ID may be reported to the network by sending a message to a server of the network (e.g., server 170 of network 164 of FIG. 6).

Figure 7C:
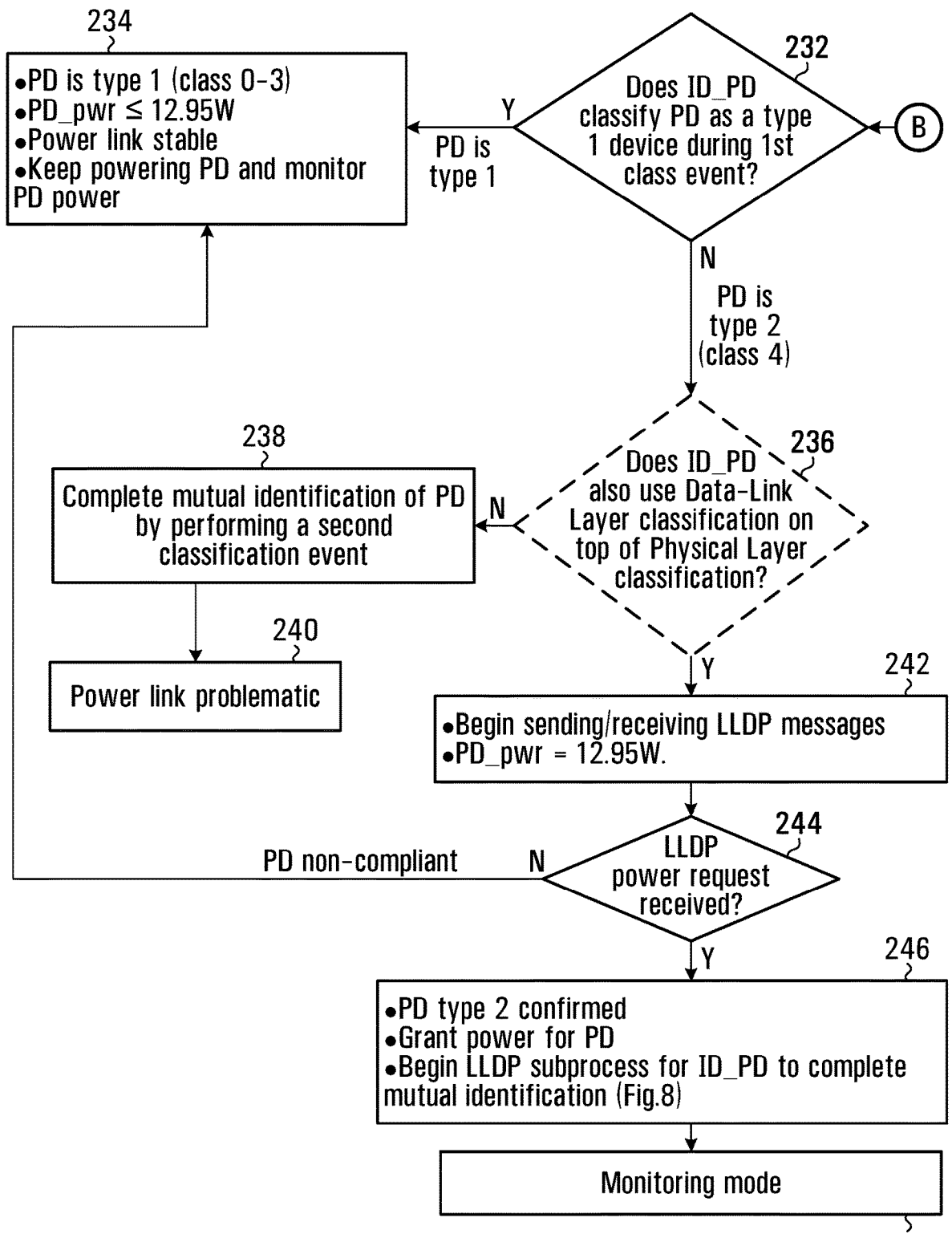
Figure 7D:
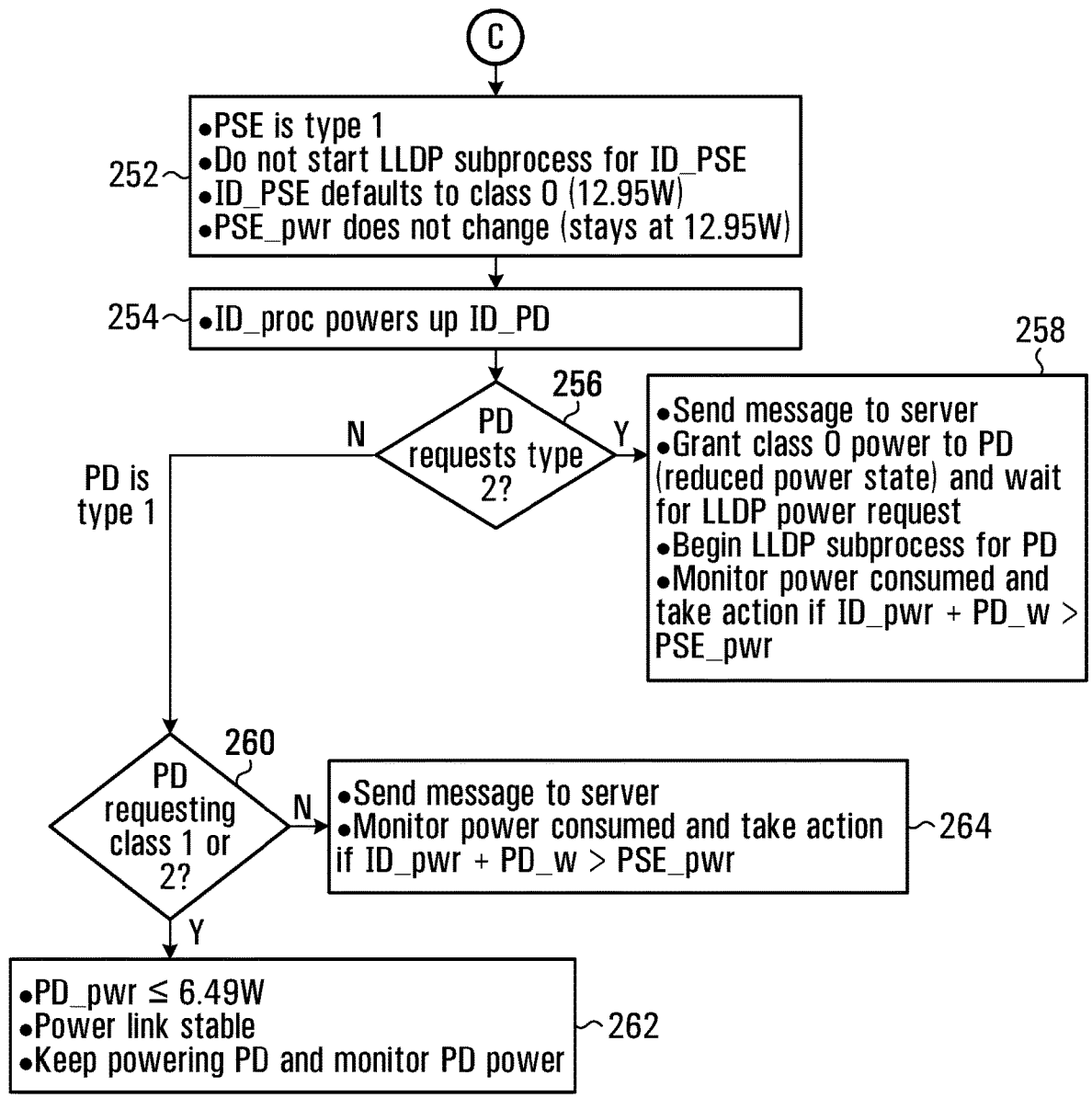

The description of FIG. 7 will continue, returning back up to stippled diamond 214 of FIG. 7A and following the left-hand branch down to step 232 of FIG. 7C. If step 232 is reached, then it has already been determined that the PSE is type 2, and the ID_PD is to announce type 2 capability to the PD in the physical layer by performing two-event classification. The first event of the two-event classification indicates the class of the PD (based on the current drawn by the PD). The first event classification may indicate that the PD is class 0, 1, 2, or 3, which means that the PD is type 1, and the method proceeds to step 234. Step 234 is the same as step 218 described earlier. At step 234, the PD is type 1 (because it is class 0, 1, 2, or 3), and the PD is therefore not requesting more than class 0/3 power of 12.95 W, i.e., $PD\_pwr \leq 12.95$ W. In this situation the ID should have no problem operating because the PSE has indicated to the ID that it is type 2 and can therefore provide the ID with up to 25.5 W of power, while the PD has requested no more than 12.95 W, which leaves a generous window of power for the ID to use for its operation. In some embodiments, in this situation the ID_PSE may use LLDP to request less than 25.5 W of power from the PSE. For example, if the ID only consumes maximum 2 W for its own operation, then only 2 W+maximum 15.4 W (to supply 12.95 W to the PD under the PoE standard)=17.4 W total should be needed by the ID. The ID_PSE may use LLDP to only request 17.4 W from the PSE instead of the full 25.5 W. In some embodiments, the ID may still monitor the power consumed by both it and the PD to ensure it does not exceed the maximum amount of power that is allocated from the PSE, which may be a concern if the ID is operating in a high-power mode (e.g., the ID uses 10 W of power for itself). Power may be monitored using a current sensor in the ID. The amount of current draw indicated by the current sensor is indicative of the amount of power consumption. If the total power consumed by the PD and ID exceeds a certain threshold, e.g., exceeds the total power allocated to the ID by the PSE, then the ID may perform any one of Actions 1 to 4 discussed above, e.g., switch to a lower power mode or no longer power the PD.

Returning to step 232, the first event classification may indicate to the ID_PD that the PD is class 4, i.e., type 2, in which case the method proceeds to stippled diamond 236. The way in which the method proceeds from stippled diamond 236 depends upon whether the ID_PD is configured to be able to perform data-link layer classification on top of physical layer classification.

If the ID_PD is not configured to be able to perform data-link layer classification on top of physical layer classification, then the method proceeds to step 238. At step 238, the ID_PD completes the mutual identification by performing the second event classification to indicate to the PD that the ID is also a type 2. The method then proceeds to step 240. If step 240 is reached, it means that both the PSE and the PD are type 2, and that LLDP power negotiation between the ID and PD is not possible (because the ID_PD is not configured to be able to perform data-link layer classification on top of physical layer classification and therefore cannot perform LLDP power negotiation). This means that the ID should supply full class 4 power to the PD, i.e., 30 W on the data connection to the PD so that the PD is ensured to have its requested PD_pwr of 25.5 W. If this point is reached, the ID may perform any one of Actions 1 to 4 discussed above. In particular, the ID may: deliver all or substantially all of the power from the PSE to the PD, and otherwise the ID ceases operation (Action 1); or stop powering the PD (Action 2); or try operating in a very reduced power mode (Action 3); or continue operation on the assumption that the PD may not consume as much power as it requested and/or that the ID may be able to draw more power from the PSE than allocated by the PSE if the line between the PSE and the ID does not consume much power (Action 4). If Actions 1, 3, or 4 are performed by the ID, then the ID would need to supply less than 30 W on the line to the PD and assume that the power loss on the line to the PD plus the actual power consumed by the PD is within the amount of power supplied by the ID_PD on the line to the PD. At step 240, the ID may send a message to a server on the network (e.g., server 170) indicating the mode in which the ID is operating.

Returning to stippled diamond 236, if the ID_PD is instead configured to be able to perform data-link layer classification on top of physical layer classification, then the method proceeds to step 242. When the ID_PD is configured to be able to perform data-link layer classification on top of physical layer classification (i.e., if the method proceeds to step 242), and if the result of the first event classification indicated that the PD is class 4, then in some embodiments the ID_PD may omit the second event classification, in which case class 0 power (12.95 W) may be provided to the PD until mutual identification is complete. Because mutual identification is not complete, the PD initially operates on class 0 power (12.95 W). Such is the situation at step 242, which is why PD_pwr is indicated as 12.95 W. At step 242 LLDP messages may be sent/received between the ID_PD and the PD. The ID_PD waits for a LLDP power request from the PD.

At step 244, if an LLDP power request is not received by the ID_PD from the PD, then the PD is non-compliant with the PoE standard, because a PD that indicates class 4 must be able to perform LLDP power negotiation. In this situation, the PD is treated as type 1, and the method proceeds to step 234 (or alternatively another action may be taken such as not powering the PD). Otherwise, if at step 244 an LLDP power request is received from the PD, then the method proceeds to step 246. At step 246, the ID_PD has confirmed that the PD is type 2 (class 4). The ID_PD grants the requested power to the PD via a reply LLDP message, which also acts as a confirmation for the PD that the ID is also type 2. Mutual identification is therefore complete. An LLDP subprocess begins for the ID_PD, which is used for any future power renegotiation between the ID and the PD. This LLDP subprocess is described later in relation to FIG. 8. Step 246 is the same as step 224 described earlier.

The method then proceeds from step 246 to step 226, i.e., the monitoring mode described earlier in which the ID can perform Option 1 and/or Option 2 described earlier.

The description of FIG. 7 will continue, returning back up to step 210 of FIG. 7A. Recall at step 210, it is not known yet whether the PSE is type 1 or type 2, and an initial LLDP power request has been sent from the ID to the PSE. At step 210, it is determined whether or not a reply to the initial LLDP power request is received from the PSE over the data link. If no LLDP message is received by the ID over the data link, or if an LLDP message is received but has no power-grant field, then the ID determines that the PSE must be type 1, and the method proceeds to step 252 (start of FIG. 7D).

When step 252 is reached, it means that the ID_PSE has indicated to the PSE that the ID is type 2 (as per step 202), but the PSE has indicated to the ID_PSE that the PSE is type 1. An LLDP subprocess for the ID_PSE does not start because the PSE does not support LLDP power negotiation. The ID_PSE defaults to operating on class 0 power (12.95 W), which is the amount of power allocated by the PSE (i.e., PSE_pwr=12.95 W). The method proceeds to step 254. At step 254, the ID_proc powers up the ID_PD.

Upon powering up the ID_PD, the ID_PD indicates, to the PD, that the ID_PD is type 1 because the PSE is type 1. However, in an alternative embodiment the ID_PD could instead indicate, to the PD, that the ID_PD is type 2. If the PD is also type 2, then the PD could theoretically use LLDP to ask for less than 12.95 W. In other words, it is not necessary in all embodiments that the ID_PD be subject to the limitations of the PSE.

At step 256, the ID_PD determines if the PD is type 1 or type 2, which is known from the class indicated by the PD via the PD's current draw. If the PD is type 2, then the method proceeds to step 258. If the PD is instead type 1, then the method proceeds to step 260.

If step 258 is reached, it means that there is a mismatch: the PSE is type 1, but the PD is requesting type 2. The PD may request more power than the PSE can provide. In one embodiment, the ID may therefore stop powering the PD and possibly send a message to a server on the network indicating the situation. Alternatively, upon reaching step 258 the following actions may instead be performed by the ID, as actually illustrated in step 258 of FIG. 7D: (1) The ID optionally sends a message to the server on the network indicating the situation. (2) The ID_PD grants class 0 power to the PD, such that the PD operates in a reduced power state. (3) The ID_PD then waits for an LLDP power request from the PD. (4) The LLDP subprocess for the ID_PD begins, and the ID_PD grants the maximum amount of power it can give to the PD, e.g., 12.95 W, unless the LLDP message from the PD requests a lower amount of power. (5) The ID monitors the actual amount of power consumed (e.g., by measuring the current drawn using a current sensor). (6) The ID defaults to one of Actions 1 to 4 described earlier if the power consumed by the ID (ID_pwr) plus the actual power (PD_w) consumed by the PD is greater than the power allocated by the PSE. That is, if the power consumed by the ID (ID_pwr) plus the actual power (PD_w) consumed by the PD is greater than the power allocated by the PSE, then the ID may: deliver all or substantially all of the power from the PSE to the PD, and otherwise the ID ceases operation (Action 1); or stop powering the PD (Action 2); or try operating in a very reduced power mode (Action 3); or continue operation on the assumption that it may be possible to draw more power from the PSE than allocated by the PSE if the line between the PSE and the ID does not consume much power (Action 4).

Returning back up to step 256, if the ID_PD instead determines that the PD is type 1, then the method proceeds to step 260. If step 260 is reached, it means that the PSE and the PD are both type 1. Therefore, at step 260, the class of the PD is determined, which is known from the current draw from the PD. If the PD is class 1 or class 2, then the method proceeds to step 262. If the PD is instead class 0 or 3, then the method proceeds to step 264.

If step 262 is reached, it means that the PD is requesting less power (class 1 or class 2) compared to the maximum amount the PSE can provide. In this situation the ID should have no problem operating because the PSE has indicated to the ID that it is type 1 and can therefore provide the ID with up to 12.95 W of power, while the PD has requested no more than 6.49 W (max class 2 power), which leaves a generous window of power for the ID to use for its operation. In some embodiments, the ID may still monitor the power consumed by both it and the PD to ensure it does not exceed the maximum amount of power that is allocated from the PSE, which may be a concern if the ID is operating in a high-power mode. Power may be monitored using a current sensor in the ID. The amount of current draw indicated by the current sensor is indicative of the amount of power consumption. If the total power consumed by the PD and ID exceeds a certain threshold, e.g., exceeds the total power allocated to the ID by the PSE, then the ID may perform any one of Actions 1 to 4 discussed in detail earlier, e.g., switch to a lower power mode or no longer power the PD. In some embodiments, if the ID_PD is configured to communicate with the PD using LLDP (e.g., the PD is type 2 but is using LLDP to request class 1 or class 2 level power), then the ID_PD may grant the power request sent by the PD in an LLDP message.

Returning back to step 260, if the ID_PD instead determines that the PD is class 0 or 3, then the method proceeds to step 264. If step 264 is reached, it means that the PD is requesting an amount of power (class 0 or class 3) equal to the maximum amount of power the PSE can provide. In one embodiment, the ID may therefore stop powering the PD and possibly send a message to a server on the network indicating the situation. Alternatively, upon reaching step 264 the following actions may instead be performed by the ID, as actually illustrated in step 264 of FIG. 7D: (1) The ID optionally sends a message to the server on the network indicating the situation. (2) The ID monitors the actual amount of power consumed (e.g., by measuring the current drawn using a current sensor). (3) The ID defaults to one of Actions 1 to 4 described earlier if the power consumed by the ID (ID_pwr) plus the actual power (PD_w) consumed by the PD is greater than the power allocated by the PSE. That is, if the power consumed by the ID (ID_pwr) plus the actual power (PD_w) consumed by the PD is greater than the power allocated by the PSE, then the ID may: deliver all or substantially all of the power from the PSE to the PD, and otherwise the ID ceases operation (Action 1); or stop powering the PD (Action 2); or try operating in a very reduced power mode (Action 3); or continue operation on the assumption that it may be possible to draw more power from the PSE than allocated by the PSE if the line between the PSE and the ID does not consume much power (Action 4).

Figure 8:
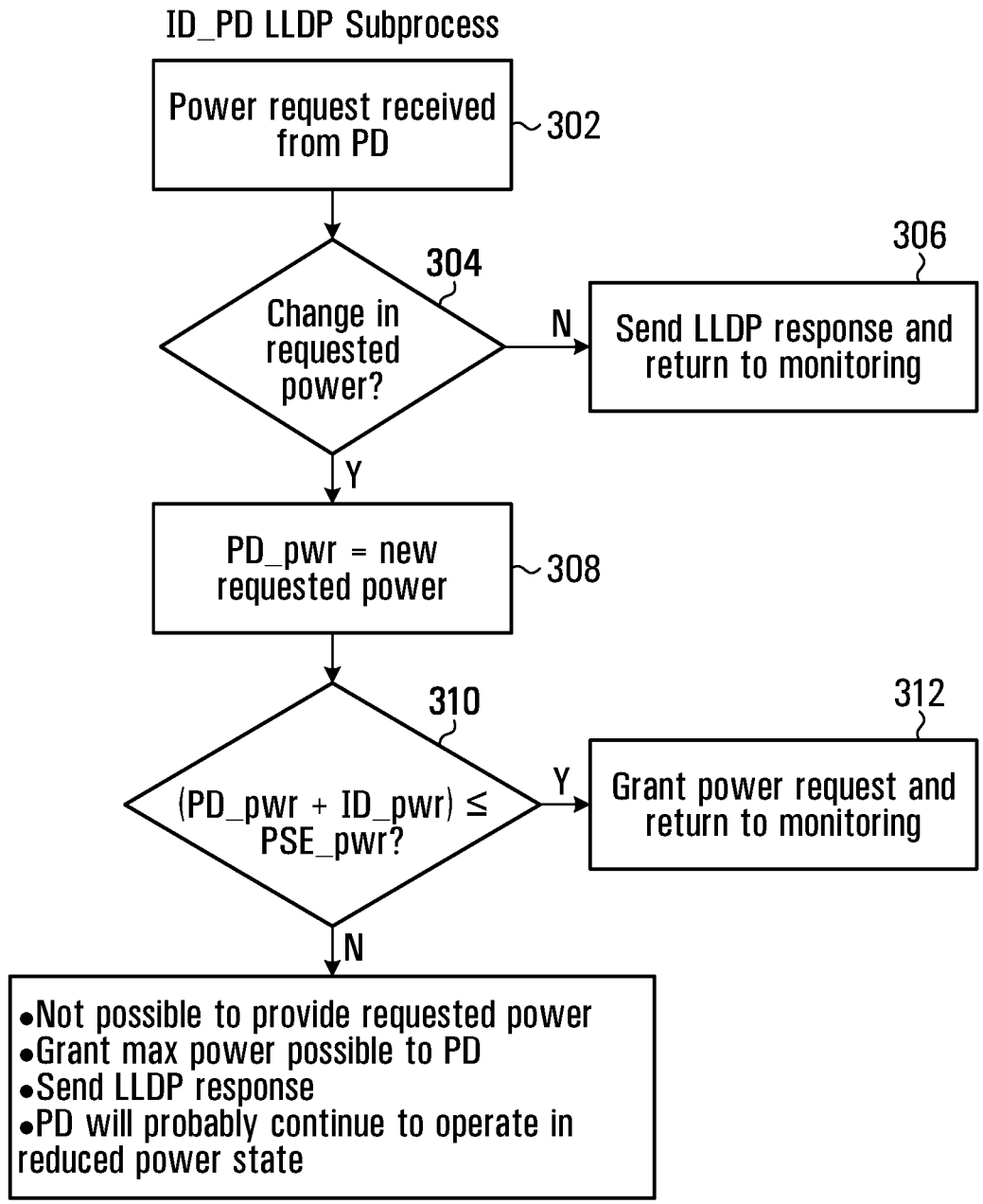
FIG. 8 illustrates a flowchart illustrating an LLDP subprocess according to one embodiment.

FIG. 8 illustrates an LLDP subprocess for the ID_PD, according to one embodiment. The LLDP subprocess of FIG. 8 is one method to implement power management/negotiation between the ID and the PD after an LLDP connection has been established between the ID and the PD. In some embodiments, the LLDP subprocess of FIG. 8 may begin at step 224 of FIG. 7B.

In the LLDP subprocess of FIG. 8, the ID_PD monitors the data link to the PD for an LLDP message from the PD. At step 302, an LLDP power request is received from the PD over the data link. The transmission over the data link may be made using Power via MDI. At step 304, the ID_PD interprets the message and compares the current power request to the previous power request. If the amount of power requested by the PD has not changed, the subprocess continues to step 306. At step 306, the ID_PD sends an LLDP response to the PD and continues monitoring the data link for a new LLDP message from the PD (e.g., the method returns to the beginning just above step 302). If at the step 304 it is instead determined that the amount of power requested by the PD has changed, then the subprocess proceeds to step 308.

At step 308, the ID changes the power requested variable (PD_pwr) to reflect the requested change in power. At step 310, the ID compares the total power allocated by the PSE (PSE_pwr) to the summation of the power required by the ID (ID_pwr) and the new power requested by the PD (PD_pwr). If ID_pwr+PD_pwr is less than or equal to PSE_pwr, then the subprocess proceeds to step 312. At step 312, the ID_PD sends an LLDP response to the PD granting the power request, and the ID_PD allocates the required power to the PD. The ID_PD then continues monitoring the data link for a new LLDP message from the PD (e.g., the method returns to the beginning just above step 302). However, if instead ID_pwr+PD_pwr is greater than PSE_pwr, then the subprocess continues to step 314. If step 314 is reached, it means that the amount of power requested by the PD plus the amount of power consumed by the ID exceeds the amount of power allocated by the PSE. In this situation, the ID may perform different operations, depending upon the implementation. For example, the ID_PD may grant the maximum amount of power to the PD it can based on the amount of power allocated by the PSE and the amount of power consumed by the ID (e.g., the power granted to the PD by the ID_PD may be PSE_pwr-ID_pwr). An LLDP response with the power grant may be sent from the ID_PD to the PD. The PD may continue to operate, but in a reduce power state because the amount of power requested by the PD is more than the amount of power provided by the ID_PD. This situation is what is illustrated in step 314 of FIG. 8. However, in other embodiments the ID may take alternative actions, depending upon the implementation. For example, the ID may instead perform any one of Actions 1 to 4 described earlier. For example, the ID may pass through substantially all power from the PSE and otherwise cease its own operation (Action 1) or stop powering the PD (Action 2) or operate in a reduced power mode (Action 3) or continue operation on the assumption that the PD may not actually consume the amount of power it requested, or that it may be possible to draw more power from the PSE than allocated by the PSE if the line between the PSE and the ID does not consume much power (Action 4).

Figure 9:
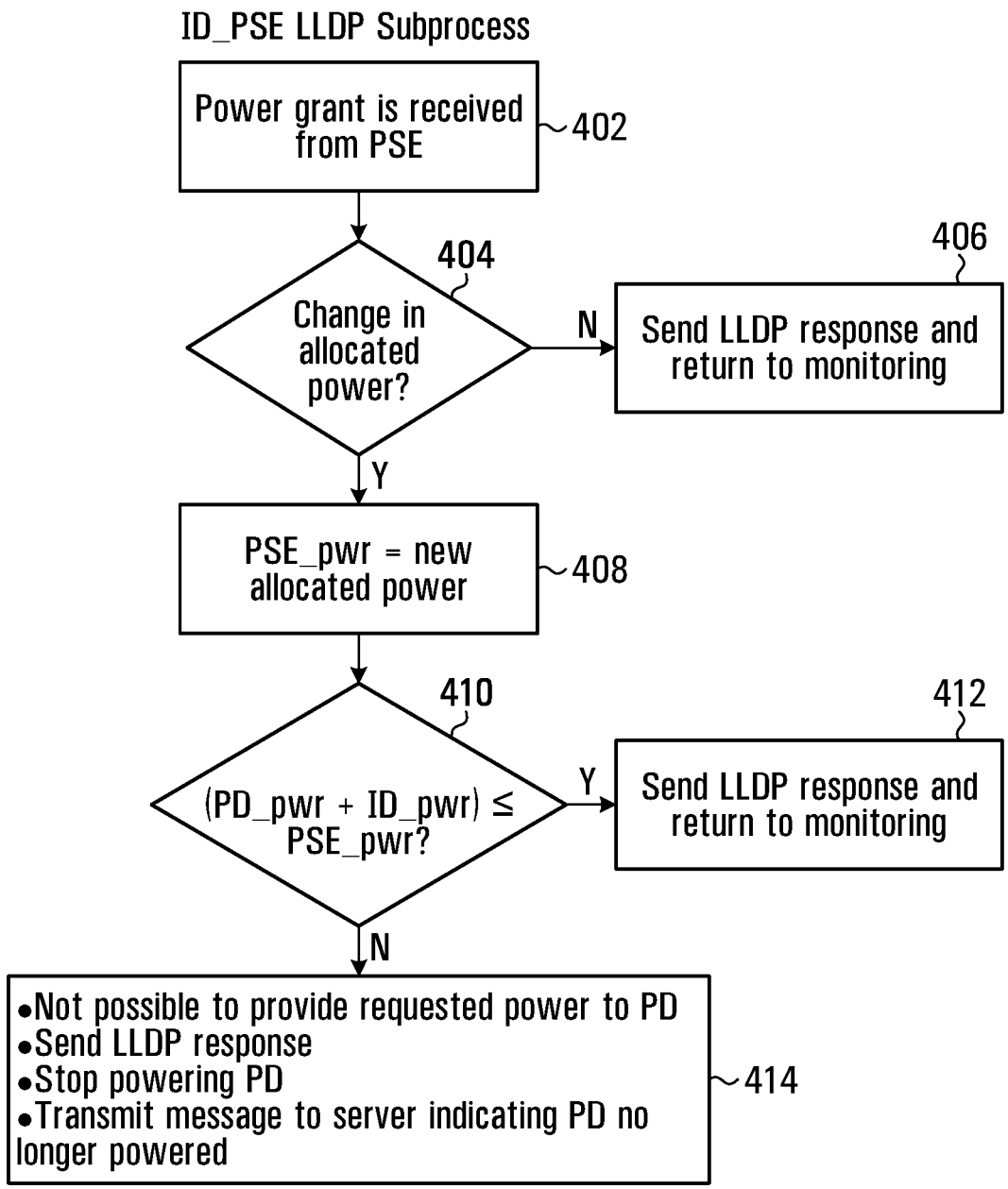
FIG. 9 illustrates a flowchart illustrating another LLDP subprocess according to one embodiment.

FIG. 9 illustrates an LLDP subprocess for the ID_PSE, according to one embodiment. The LLDP subprocess of FIG. 9 is one method to implement power management/negotiation between the ID and the PSE after an LLDP connection has been established between the ID and the PSE. In some embodiments, the LLDP subprocess of FIG. 9 may begin at step 211 of FIG. 7A.

In the LLDP subprocess of FIG. 9, the ID_PSE monitors the data link to the PSE for an LLDP message from the PSE. At step 402, an LLDP power grant is received from the PSE over the data link. The transmission over the data link may be made via an MDI TLV information string. At step 404, the ID_PSE interprets the message and compares the new power grant to the previous power grant. If the amount of power granted by the PSE has not changed, the subprocess continues to step 406. At step 406, the ID_PSE sends an LLDP response to the PSE and continues monitoring the data link for a new LLDP message from the PSE (e.g., the method returns to the beginning just above step 402). If at the step 404 it is instead determined that the amount of power granted by the PSE has changed, then the subprocess proceeds to step 408.

At step 408, the ID changes the variable indicating the power allocated by the PSE (PSE_pwr) to reflect the new granted power from the PSE. At step 410, the ID compares the new power allocated by the PSE (PSE_pwr) to the summation of the power required by the ID (ID_pwr) and the power requested by the PD (PD_pwr). If ID_pwr+PD_pwr is less than or equal to PSE_pwr, then the subprocess proceeds to step 412. At step 412, the ID_PSE sends an LLDP response to the PSE, and the ID_PD continues to allocate the required power to the PD. The ID_PSE then continues monitoring the data link for a new LLDP message from the PSE (e.g., the method returns to the beginning just above step 402). However, if instead ID_pwr+PD_pwr is greater than PSE_pwr, then the subprocess continues to step 414. If step 414 is reached, it means that the amount of power requested by the PD plus the amount of power consumed by the ID exceeds the amount of power now allocated by the PSE. In this situation, the ID may perform different operations, depending upon the implementation. For example, the ID_PD may grant the maximum amount of power to the PD it can based on the new amount of power allocated by the PSE and the amount of power consumed by the ID (e.g., the power granted to the PD by the ID_PD may be PSE_pwr-ID_pwr). An LLDP response with a new power grant may be sent from the ID_PD to the PD. The PD may continue to operate, but in a reduce power state because the amount of power requested by the PD is more than the amount of power provided by the ID_PD. In another embodiment, if step 414 is reached, then the ID may stop providing power to the PD, send an LLDP response to the PSE, and send a message to a server on the network indicating that the PD is no longer powered. This situation is what is illustrated in step 414 of FIG. 9. However, in other embodiments the ID may take alternative actions, depending upon the implementation. For example, the ID may instead perform any one of Actions 1 to 4 described earlier. For example, the ID may pass through substantially all power from the PSE and otherwise cease its own operation (Action 1) or stop powering the PD (Action 2) or operate in a reduced power mode (Action 3) or continue operation on the assumption that the PD may not actually consume the amount of power it requested, or that it may be possible to draw more power from the PSE than allocated by the PSE if the line between the PSE and the ID does not consume much power (Action 4).

FIGS. 7 to 9 are specific to an intermediary device operating under the PoE and PoE+ versions of the PoE standard in which only types 1 and 2 and classes 0-4 are defined. However, these figures may be modified, using the same tiered structure, in order to accommodate other systems that supply power over a data line.

For example, FIG. 7 may be extended to accommodate higher versions of the PoE standard, which introduce higher type devices and additional valid power classes. In one embodiment, step 202 could be changed to the ID_PSE indicating that it has type 4 capability, and step 204 could be changed to determine if the PSE has type 4 capability through the event classification provided by the PSE. The ID_PD may be able to identify itself as any of types 1-4 and provide the necessary power to the PD, depending upon the PSE type. As another example, FIG. 7 may be modified to instead accommodate PSEs and PDs operating according to the IEEE 802.3bu standard, which is known as Power over Data Line (PoDL). PoDL is similar to PoE, but there are some differences. For example, PoDL uses the serial communication classification protocol (SCCP) instead of LLDP. In one embodiment for the PoDL standard, steps such as step 202 may need to be eliminated or modified because PoDL does not have types, but class is still identified.

In some embodiments, the ID may be configurable prior to installation and/or once installed. Examples of ID configurations are described earlier in relation to FIG. 7. For example, the following may be configured:

How much power the ID_PSE initially requests from the PSE using LLDP in step 208 of FIG. 7.

In step 208 of FIG. 7, the time within the preconfigured window at which the ID_PSE is to send its LLDP message to the PSE making the initial power request.

Whether the ID_PD announces type 2 capability to the PD using single event classification (with LLDP) or instead by performing multi-event classification at the physical layer (e.g., step 214 of FIG. 7).

The action performed by the ID upon the ID determining that the PSE and PD are both type 2 devices (e.g., the possible different options described in relation to step 226 of FIG. 7).

Whether the ID_PD performs data-link layer classification on top of physical layer classification (e.g., stippled diamond 236 of FIG. 7).

Which actions are performed by the ID in steps 240, 258, and 264 of FIG. 7.

In some embodiments, the ID is configured by a server on the network (e.g., server 170). For example, the server may transmit an instruction to the ID that, when executed by the ID_PROC, configures the ID. The instruction may originate from a network operator or a technician that communicates with the server using a computing device. For example, a network operator or technician may use a laptop, mobile device, or desktop computer to communicate with the server and instruct the server to configure the ID. In other embodiments, the ID may be configured directly by a user or technician by connecting the ID directly to a computing device (e.g., laptop, mobile device, or desktop computer) that is operated by the user or technician. In some embodiments, an app installed on a user's mobile device or computer may be used to configure the ID.

Further methods will now be described.

Figure 10:
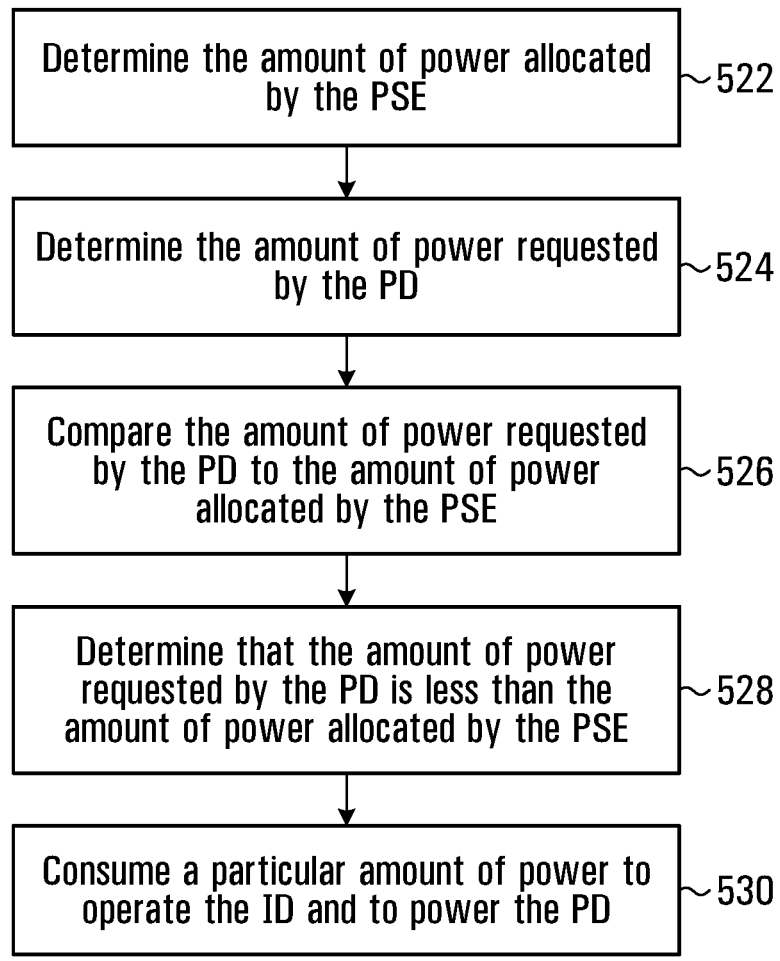
FIG. 10 illustrates a flowchart illustrating a power consumption method according to an embodiment.

FIG. 10 is a flowchart illustrating steps of a method performed by an ID, according to one embodiment. The ID is connected to a PSE over a data connection. For example, the ID may be ID 100 connected to PSE 22 via Ethernet cable 105, where the Ethernet cable is an example of a data connection because it allows for data communication between the PSE 22 and ID 100.

In step 522, the ID determines the amount of power allocated to the ID by the PSE over the data connection. In some embodiments, the amount of power allocated to the ID by the PSE is determined by the ID based on classification in the physical layer, e.g., based on an occurrence of multi-event classification in the physical layer, like in step 206 of FIG. 7A in which the PSE indicates that it is type 2 and allocates Class 4 power (under a PoE standard) via two classification events. A processor in the ID may register the multi-event classification and store in memory an indication of the amount of power allocated by the PSE. When the term 'memory' is used herein, it is meant to include memory in the computing context. Examples of such memory include semi-conductor memory, random access memory, read-only memory, etc. In some embodiments, the amount of power allocated to the ID by the PSE is determined by the ID based on a power grant received in an LLDP message from the PSE, e.g., like in step 211 of FIG. 7A. A processor in the ID may read the power grant in the received LLDP message and store in memory the power granted as the amount of power allocated by the PSE.

In step 524, the ID determines the amount of power requested by a PD connected to the ID. The PD is connected to the ID over a data connection. For example, the ID may be connected to PD 24 via Ethernet cable 107. In some embodiments, the amount of power requested by the PD is determined by the ID based on the amount of classification current drawn by the PD. For example, a current sensor in the ID senses how much current is drawn by the PD during classification when the PD is first connected to the ID, and a processor in the ID reads the current value from the current sensor and maps the current value (e.g., using a look-up-table) to a particular class of power being requested by the PD. For example, the amount of classification current drawn by the PD may indicate that the PD requests Class 3 power under a PoE standard.

In step 526, the ID compares the amount of power requested by the PD to the amount of power allocated by the PSE. For example, the comparison may be performed by a processor in the ID comparing the stored value representing the amount of power requested by the PD to the stored value representing the amount of power allocated by the PSE.

In step 528, the ID determines that the amount of power requested by the PD is less than the amount of power allocated by the PSE.

In step 530, the ID consumes a particular amount of power supplied by the PSE over the data connection. The particular amount of power includes both the amount of power consumed by the ID to operate the ID and the amount of power consumed to power the PD. For example, a processor of the ID may instruct the ID to operate in a particular mode of operation (which results in the ID consuming a particular amount of power) based on the fact that there is more power allocated by the PSE than requested by the PD. An example is step 218 of FIG. 7B in which the amount of power allocated by the PSE is Class 4 power under a PoE standard, and the amount of power requested by the PD is Class 0, 1, 2, or 3 power under the PoE standard. The particular amount of power (to power both the ID and the PD) should remain less than the maximum Class 4 power supplied by the PSE, assuming the ID only requires a few watts to perform its functions. Another example is step 262 of FIG. 7D in which the amount of power allocated by the PSE is Class 3, and the amount of power requested by the PD is Class 1 or Class 2. Note that depending upon the implementation of the ID, the ID may use the power supplied by the PSE to operate a power supply and/or convertor to power the PD, and/or the ID may directly transfer power through the ID to the PD. Therefore, when the ID is said to "consume" power supplied by the PSE for operating the ID and powering the PD (like in step 530 of FIG. 10), the consuming may encompass transferring power from the PSE through the ID to the PD, in order to power the PD.

In some embodiments, when the particular amount of power is less than the amount of power allocated by the PSE (like the examples in step 218 of FIG. 7B and step 262 of FIG. 7D), then the method of FIG. 10 may further include the ID transmitting a LLDP message to the PSE, where the LLDP message includes a power request that requests less power than the amount of power currently allocated by the PSE. In some embodiments, the amount of power requested in the power request is equal to or larger than the particular amount of power to ensure that the PSE can supply enough power to allow for the ID to draw the particular amount of power from the PSE.

In some embodiments in FIG. 10, the ID is configured to operate in a first mode of operation or a second mode of operation (or possibly also in additional modes of operation). The first mode of operation consumes more power than the second mode of operation. For example, the first mode of operation may be a regular mode of operation in which the ID performs the functions it was intended to perform (e.g., act as a firewall to filter messages from an untrusted PD), and the second mode of operation may be a low-power mode (e.g., a sleep mode) in which the ID performs fewer or minimal operations. In some embodiments, the method of FIG. 10 may include the processor of the ID: computing a value representing the amount by which the power allocated by the PSE is above the power requested by the PD; determining that the value is above a threshold; and in response operating in the first mode of operation. In some embodiments, the method may include transmitting a message over the data connection via the PSE to a computing device on a network. The computing device may be a server or a laptop, mobile device, or desktop computer on the network. The message may include information indicating that the ID is operating in the first mode of operation. The message may be presented to a user (e.g., a network operator or technician) on a user interface.

More generally, in some embodiments, the ID may be able to communicate, over the data connection via the PSE, with a computing device on the network. The computing device may be a server or a laptop, mobile device, or desktop computer on the network. The communication may occur by the processor of the ID instructing transmission of data messages through the PSE interface over the data connection, and the processor of the ID receiving data messages from the network over the data connection via the PSE interface. In some embodiments, the processor of the ID may (by performing a comparison) determine that the amount of power consumed by the PD or requested by the PD or granted to the PD exceeds a threshold, and in response send a message to the computing device.

In FIG. 10, when the ID is connected between the PSE and PD and operational, the ID may pass through at least some data communication between the PSE and the PD.

In a variation of FIG. 10, the ID determines the amount of power granted to the PD (instead of the amount of power requested by the PD) in step 524, and the amount of power granted to the PD is compared to the amount of power allocated by the PSE in steps 526 and 528.

In some embodiments, an ID is provided that is configured to be connected between a PSE and a PD. The ID includes: a PSE interface to interface with the PSE over a first data connection; a PD interface to interface with the PD over a second data connection; and a processor to directly perform (or cause the ID to perform) operations described above in relation to FIG. 10.

Figure 11:
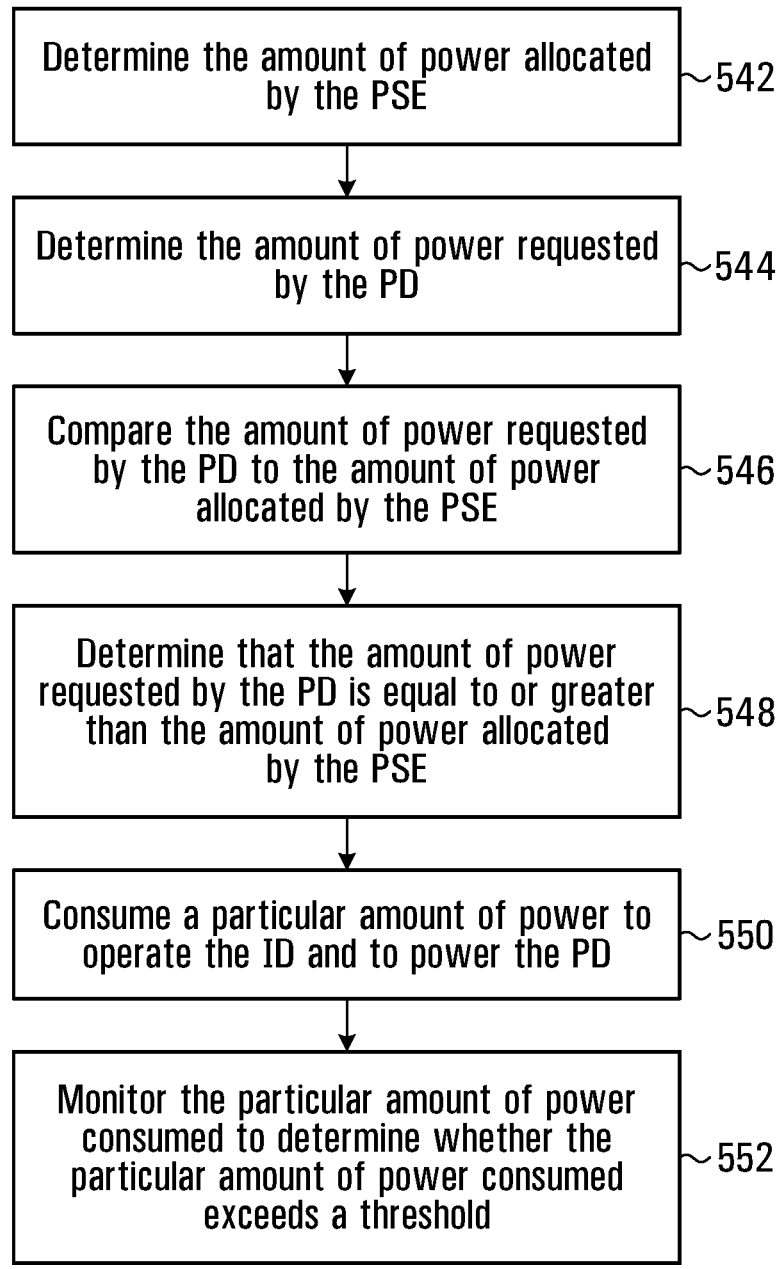
FIG. 11 illustrates a flowchart illustrating a power consumption monitoring method according to an embodiment.

FIG. 11 is a flowchart illustrating steps of a method performed by an ID, according to another embodiment. The ID is connected to a PSE over a data connection. For example, the ID may be ID 100 connected to PSE 22 via Ethernet cable 105, where the Ethernet cable is an example of a data connection because it allows for data communication between the PSE 22 and ID 100.

In step 542, the ID determines the amount of power allocated to the ID by the PSE over the data connection. In some embodiments, the amount of power allocated to the ID by the PSE is determined by the ID based on classification in the physical layer, e.g., based on an occurrence of multi-event classification in the physical layer, like in step 206 of FIG. 7A in which the PSE indicates that it is type 2 and allocates Class 4 power (under a PoE standard) via two classification events. A processor in the ID may register the multi-event classification and store in memory an indication of the amount of power allocated by the PSE. In some embodiments, the amount of power allocated to the ID by the PSE is determined by the ID based on a power grant received in a LLDP message from the PSE, e.g., like in step 211 of FIG. 7A. A processor in the ID may read the power grant in the received LLDP message and store in memory the power granted as the amount of power allocated by the PSE.

In step 544, the ID determines the amount of power requested by a PD connected to the ID. The PD is connected to the ID over a data connection. For example, the ID may be connected to PD 24 via Ethernet cable 107. In some embodiments, the amount of power requested by the PD is determined by the ID based on the amount of classification current drawn by the PD. For example, a current sensor in the ID senses how much current is drawn by the PD during classification when the PD is first connected to the ID, and a processor in the ID reads the current value from the current sensor and maps the current value (e.g., using a look-up-table) to a particular class of power being requested by the PD. For example, the amount of classification current drawn by the PD may indicate that the PD requests Class 3 power under a PoE standard. In some embodiments, the amount of power requested by the PD is determined by the ID based on a power request received in a LLDP message from the PD.

In step 546, the ID compares the amount of power requested by the PD to the amount of power allocated by the PSE. For example, the comparison may be performed by a processor in the ID comparing the stored value representing the amount of power requested by the PD to the stored value representing the amount of power allocated by the PSE.

In step 548, the ID determines that the amount of power requested by the PD is equal to or greater than the amount of power allocated by the PSE.

In step 550, the ID consumes a particular amount of power supplied by the PSE over the data connection. The particular amount of power includes both the amount of power consumed by the ID to operate the ID and the amount of power consumed to power the PD. Note that depending upon the implementation of the ID, the ID may use the power supplied by the PSE to operate a power supply and/or convertor to power the PD, and/or the ID may directly transfer power through the ID to the PD. Therefore, when the ID is said to "consume" power supplied by the PSE for operating the ID and powering the PD (like in step 550 of FIG. 11), the consuming may encompass transferring power from the PSE through the ID to the PD, in order to power the PD.

In step 552, the ID monitors the particular amount of power consumed to determine whether the particular amount of power consumed exceeds a threshold. For example, a current sensor in the ID senses how much current is drawn from the PSE during operation (which is indicative of power drawn), and a processor in the ID reads the current value from the current sensor and compares the current value (or a power value proportional to the current value) to the threshold. An example is described in relation to the "monitoring mode" in step 226 of FIGS. 7B and 7C and in step 264 of FIG. 7D, which occurs when the amount of power allocated by the PSE equals the amount of power requested by the PD. The monitoring in "Option 2" described above in relation to FIG. 7 may be performed. In some embodiments, monitoring the particular amount of power consumed may be implemented by measuring both the power consumed by the ID to operate the ID and the power consumed to power the PD, either together or separately. In some embodiments, the monitoring may be implemented by measuring the amount of power consumed to power the PD and adding it to a known amount of power used by the ID to operate the ID (e.g., the maximum power that can be or will be consumed by the ID to operate the ID).

In some embodiments, the threshold is based on the amount of power allocated to the ID by the PSE, e.g., the threshold is equal to the amount of power allocated to the ID by the PSE, or the threshold is equal to the amount of power allocated by the PSE adjusted up or down by a buffer/margin.

In some embodiments, in response to the particular amount of power consumed exceeding the threshold: the ID modifies its operation to reduce the amount of power consumed by the ID to operate the ID. For example, the processor of the ID may instruct the ID to enter a lower power mode in which fewer operations (or lower power operations) are performed by the ID, e.g., a sleep mode. In some embodiments, a message may be transmitted from the ID over the data connection via the PSE to a computing device on a network. The message may include information indicating that the ID has modified its operation. The computing device may be a server or a laptop, mobile device, or desktop computer on the network. The information may be for presentation on a user interface (e.g., for a user such as a network operator or technician to read). The communication may occur by the processor of the ID instructing transmission of the message over a data channel through the PSE interface over the data connection.

In some embodiments, in response to the particular amount of power consumed exceeding the threshold: the ID discontinues powering the PD or grants less power to the PD than the amount of power requested by the PD, or just starts supplying less power to the PD. The ID may transmit a message over the data connection via the PSE to the computing device on the network, the message including information indicating that the ID has discontinued powering the PD or that the ID has granted less power to the PD than the amount of power requested by the PD or that the ID has supplied less power to the PD.

In some embodiments, in response to the particular amount of power consumed exceeding the threshold, the ID: transmits a message to the computing device over the data connection via the PSE, the message including information indicating that the particular amount of power consumed has exceeded the threshold. A reply may subsequently be received from the computing device over the data connection via the PSE. The reply may instruct the ID to perform at least one of the following actions: modify the operation of the ID to reduce the amount of power consumed by the ID to operate the ID; discontinue powering the PD; grant less power to the PD than the amount of power requested by the PD; supply less power to the PD than the amount of power currently being used to power the PD.

In some embodiments, in the method of FIG. 11 the amount of power allocated to the ID by the PSE may be determined to be Class 4 power under a PoE standard, and the amount of power requested by the PD may also be determined to be Class 4 power under the PoE standard. The current monitoring discussed earlier in relation to FIG. 7 as "Option 2" may be performed.

In FIG. 11, when the ID is connected between the PSE and PD and operational, the ID may pass through at least some data communication between the PSE and the PD.

In a variation of FIG. 11, the ID determines the amount of power granted to the PD (instead of the amount of power requested by the PD) in step 544, and the amount of power granted to the PD is compared to the amount of power allocated by the PSE in steps 546 and 548.

In some embodiments, an ID is provided that is configured to be connected between a PSE and a PD. The ID includes: a PSE interface to interface with the PSE over a first data connection; a PD interface to interface with the PD over a second data connection; and a processor to directly perform (or cause the ID to perform) operations described above in relation to FIG. 11.

Figure 12:
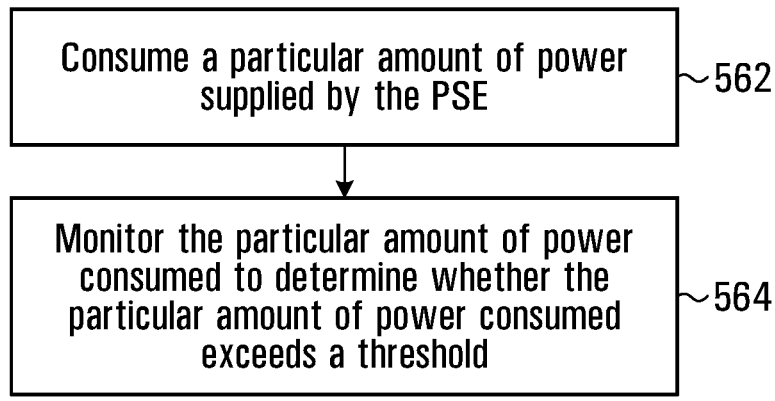
FIG. 12 illustrates a flowchart illustrating a further power consumption monitoring method according to an embodiment.

FIG. 12 is a flowchart illustrating steps of a method performed by an ID, according to another embodiment. The ID is connected to a PSE over a data connection. For example, the ID may be ID 100 connected to PSE 22 via Ethernet cable 105, where the Ethernet cable is an example of a data connection because it allows for data communication between the PSE 22 and ID 100.

In step 562, the ID consumes a particular amount of power supplied by the PSE over the data connection. The particular amount of power includes both an amount of power consumed by the ID to operate the ID and the amount of power consumed to power a PD connected to the ID. The PD is connected to the ID over a data connection. For example, the ID may be connected to PD 24 via Ethernet cable 107. Note that depending upon the implementation of the ID, the ID may use the power supplied by the PSE to operate a power supply and/or convertor to power the PD, and/or the ID may directly transfer power through the ID to the PD. Therefore, when the ID is said to "consume" power supplied by the PSE for operating the ID and powering the PD (like in step 562 of FIG. 12), the consuming may encompass transferring power from the PSE through the ID to the PD, in order to power the PD.

In step 564, the ID monitors the particular amount of power consumed to determine whether the particular amount of power consumed exceeds a threshold. For example, a current sensor in the ID senses how much current is drawn from the PSE during operation (which is indicative of power drawn), and a processor in the ID reads the current value from the current sensor and compares the current value (or a power value proportional to the current value) to the threshold. An example is described in relation to the "monitoring mode" in step 226 of FIGS. 7B and 7C and in step 264 of FIG. 7D. The monitoring in "Option 2" described above in relation to FIG. 7 may be performed. In some embodiments, monitoring the particular amount of power consumed may be implemented by measuring both the power consumed by the ID to operate the ID and the power consumed to power the PD, either together or separately. In some embodiments, the monitoring may be implemented by measuring the amount of power consumed to power the PD and adding it to a known amount of power used by the ID to operate the ID (e.g., the maximum power that can be or will be consumed by the ID to operate the ID).

In some embodiments, the threshold is based on the amount of power allocated to the ID by the PSE, e.g., the threshold is equal to the amount of power allocated to the ID by the PSE, or the threshold is equal to the amount of power allocated by the PSE adjusted up or down by a buffer/margin. For example, the threshold may be equal to a value that is greater than the amount of power allocated to the ID by the PSE by a preconfigured margin. In some embodiments, the preconfigured margin may have a magnitude that is less than or equal to the amount of power designated in a PoE standard as being provided by the PSE for possible power loss on the data connection between the PSE and the ID. For example, if maximum Class 4 power is allocated by the PSE, then the margin have a magnitude less than or equal to 4.5 W, which is equal to the amount of power assumed to be lost on the data connection between the PSE and the ID (because the PSE provides 30 W on the data connection). The threshold may be between 25.5 W and 30 W.

In some embodiments, in response to the particular amount of power consumed exceeding the threshold: the ID modifies its operation to reduce the amount of power consumed by the ID to operate the ID. For example, the processor of the ID may instruct the ID to enter a lower power mode in which fewer operations (or lower power operations) are performed by the ID, e.g., a sleep mode. In some embodiments, a message may be transmitted from the ID over the data connection via the PSE to a computing device on a network. The message may include information indicating that the ID has modified its operation. The computing device may be a server or a laptop, mobile device, or desktop computer on the network. The information may be for presentation on a user interface (e.g., for a user such as a network operator or technician to read). The communication may occur by the processor of the ID instructing transmission of the message over a data channel through the PSE interface over the data connection.

In some embodiments, in response to the particular amount of power consumed exceeding the threshold: the ID discontinues powering the PD or grants less power to the PD than the amount of power requested by the PD, or the ID just starts supplying less power to the PD. The ID may transmit a message over the data connection via the PSE to the computing device on the network, the message including information indicating that the ID has discontinued powering the PD or that the ID has granted less power to the PD than the amount of power requested by the PD, or that the ID is supplying less power to the PD.

In some embodiments, in response to the particular amount of power consumed exceeding the threshold, the ID: transmits a message to the computing device over the data connection via the PSE, the message including information indicating that the particular amount of power consumed has exceeded the threshold. A reply may subsequently be received from the computing device over the data connection via the PSE. The reply may instruct the ID to perform at least one of the following actions: modify the operation of the ID to reduce the amount of power consumed by the ID to operate the ID; discontinue powering the PD; grant less power to the PD than the amount of power requested by the PD; supply less power to the PD than the amount of power currently being used to power the PD.

In some embodiments, the amount of power allocated to the ID by the PSE is determined by the ID based on classification in the physical layer, e.g., based on an occurrence of multi-event classification in the physical layer, like in step 206 of FIG. 7A in which the PSE indicates that it is type 2 and allocates Class 4 power (under a PoE standard) via two classification events. A processor in the ID may register the multi-event classification and store in memory an indication of the amount of power allocated by the PSE. In some embodiments, the amount of power allocated to the ID by the PSE is determined by the ID based on a power grant received in a LLDP message from the PSE, e.g., like in step 211 of FIG. 7A. A processor in the ID may read the power grant in the received LLDP message and store in memory the power granted as the amount of power allocated by the PSE.

In FIG. 12, when the ID is connected between the PSE and PD and operational, the ID may pass through at least some data communication between the PSE and the PD.

In some embodiments, an ID is provided that is configured to be connected between a PSE and a PD. The ID includes: a PSE interface to interface with the PSE over a first data connection; a PD interface to interface with the PD over a second data connection; and a processor to directly perform (or cause the ID to perform) operations described above in relation to FIG. 12.

Figure 13:
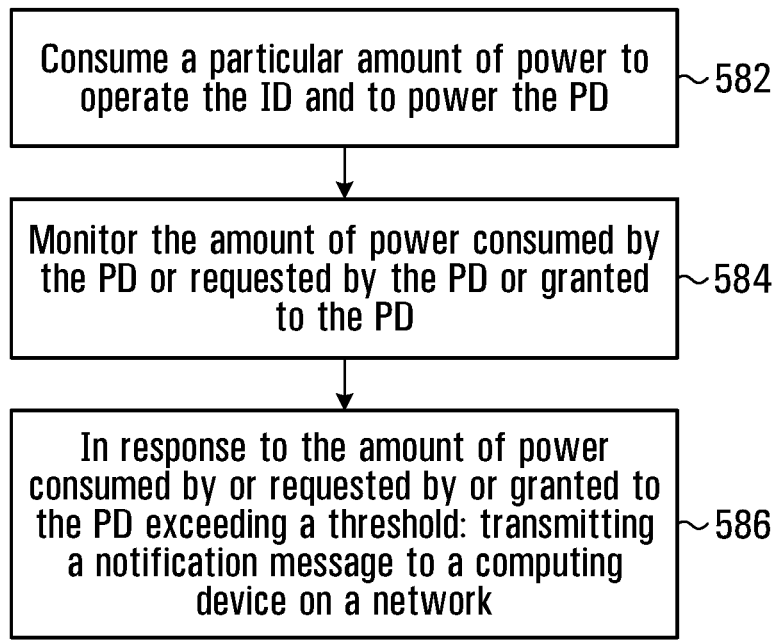
FIG. 13 illustrates a flowchart illustrating an excess power consumption notification method according to an embodiment.

FIG. 13 is a flowchart illustrating steps of a method performed by an ID, according to another embodiment. The ID is connected between a PSE and a PD over a data connection. For example, the ID may be ID 100 connected to PSE 22 via Ethernet cable 105, and connected to PD 24 via Ethernet cable 107. The Ethernet cables provide the data connection because they allow for data communication between the PSE 22 and PD 24 through the ID 100.

In step 582, in operation the ID consumes a particular amount of power supplied by the PSE over the data connection. The particular amount of power includes both an amount of power consumed by the ID to operate the ID and the amount of power consumed to power the PD. Note that depending upon the implementation of the ID, the ID may use the power supplied by the PSE to operate a power supply and/or convertor to power the PD, and/or the ID may directly transfer power through the ID to the PD. Therefore, when the ID is said to "consume" power supplied by the PSE for operating the ID and powering the PD (like in step 582 of FIG. 13), the consuming may encompass transferring power from the PSE through the ID to the PD, in order to power the PD.

In step 584, the ID monitors the amount of power consumed by the PD or requested by the PD or granted to the PD. Monitoring the amount of power consumed by the PD may be performed using a current sensor that senses the amount of current being drawn by the PD, which is indicative of amount of power being consumed by the PD. In some embodiments, monitoring the amount of power consumed by the PD may be performed by monitoring the total power consumed to both operate the ID and power the PD, and subtracting off an amount of power that is known to be used by the ID to operate the ID (e.g., the maximum amount of power the ID can or would consume to operate the ID). Monitoring the power requested by the PD may be performed by the processor in the ID recording how much power is requested by the PD in an LLDP message received from the PD. Monitoring the power granted to the PD may be performed by the processor in the ID recording how much power has been granted to the PD in a LLDP power grant sent from the ID to the PD and/or by the processor recording how much power has been granted to the PD in physical layer classification.

In step 586, in response to the amount of power consumed by or requested by or granted to the PD exceeding a threshold: transmitting a notification message over the data connection via the PSE to a computing device on a network. The computing device may be a server or a laptop, mobile device, or desktop computer on the network. The information in the notification message may be for presentation on a user interface (e.g., for a user such as a network operator or technician to read). The communication may occur by the processor of the ID instructing transmission of the message over a data channel through the PSE interface over the data connection.

In some embodiments, in response to the amount of power consumed by or requested by or granted to the PD exceeding the threshold, the ID further performs at least one of the following actions: modify the operation of the ID to reduce the amount of power consumed by the ID to operate the ID (e.g., enter a sleep mode); discontinue powering the PD; grant less power to the PD than the amount of power requested by the PD; supply less power to the PD than the amount of power currently being used to power the PD.

In some embodiments, the ID may receive, from the computing device over the data connection via the PSE, a reply to the notification message, and the reply may instruct the ID to perform at least one of the following actions: modify the operation of the ID to reduce the amount of power consumed by the ID to operate the ID (e.g., enter a sleep mode); discontinue powering the PD; grant less power to the PD than the amount of power requested by the PD; supply less power to the PD than the amount of power currently being used to power the PD.

In some embodiments, the threshold is equal to the maximum amount of power permitted to be supplied to the PD based on a power class indicated by the PD in the physical layer. The power class may be indicated in the physical layer from the amount of classification current drawn by the PD. For example, a current sensor in the ID may sense how much current is drawn by the PD during classification when the PD is first connected to the ID, and a processor in the ID may read the current value from the current sensor and map the current value (e.g., using a look-up-table) to a particular class of power being requested/indicated by the PD. For example, the amount of classification current drawn by the PD may indicate that the PD indicates Class 3 power under a PoE standard. The threshold may then be set as equal to 15.4 W, which is the maximum amount of Class 3 power permitted to be supplied by the ID on the data connection to the PD.

In some embodiments, the notification message is transmitted in response to the amount of power consumed by the PD exceeding the threshold. In such embodiments, the threshold may be based on the amount of power requested by and/or granted to the PD. For example, if the PD requests Class 3 maximum power and/or Class 3 maximum power is granted to the PD, then the threshold may be set as equal to Class 3 maximum power (or equal to Class 3 maximum power adjusted up or down by a margin/buffer). Therefore, in some embodiments the threshold may be equal to the amount of power requested by or granted to the PD, and in some embodiments the threshold may instead be equal to the amount of power requested by or granted to the PD adjusted by a margin.

In some embodiments, the amount of power requested by the PD is determined by the ID based on the amount of classification current drawn by the PD. For example, a current sensor in the ID senses how much current is drawn by the PD during classification when the PD is first connected to the ID, and a processor in the ID reads the current value from the current sensor and maps the current value (e.g., using a look-up-table) to a particular class of power being requested by the PD. For example, the amount of classification current drawn by the PD may indicate that the PD requests Class 3 power under a PoE standard. In some embodiments, the amount of power requested by the PD is determined by the ID from a power request received from the PD in a LLDP message.

In some embodiments, an ID is provided that is configured to be connected between a PSE and a PD. The ID includes: a PSE interface to interface with the PSE over a first data connection; a PD interface to interface with the PD over a second data connection; and a processor to directly perform (or cause the ID to perform) operations described above in relation to FIG. 13.

In a variation of FIG. 13, in step 586 the ID may also or instead transmit a notification message to the network if the amount of power consumed by the PD is below a particular threshold, e.g., if the PD is consuming too low power it may be malfunctioning, and the ID can bring this to the attention of the network.

Figure 14:
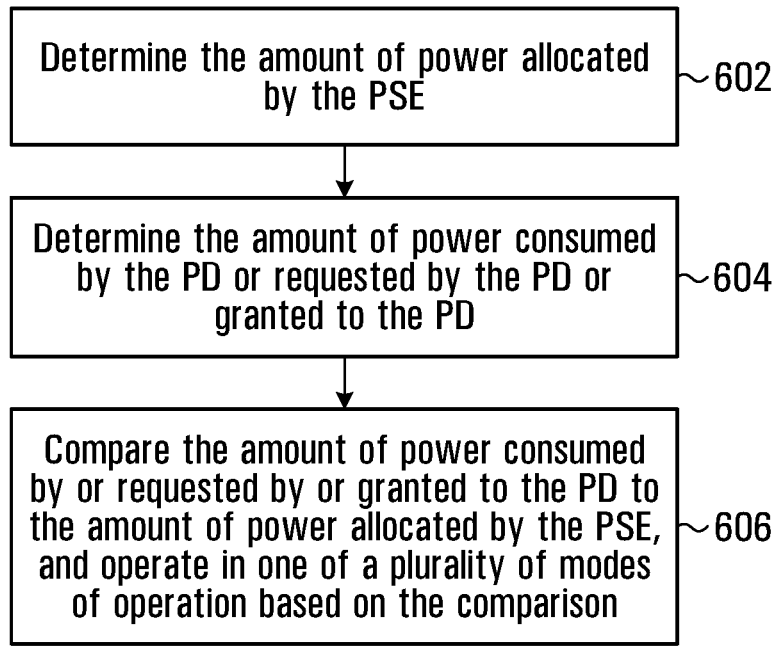
FIG. 14 illustrates a flowchart illustrating a mode selection method according to an embodiment.

FIG. 14 is a flowchart illustrating steps of a method performed by an ID, according to another embodiment. The ID is connected to a PSE over a data connection. For example, the ID may be ID 100 connected to PSE 22 via Ethernet cable 105, where the Ethernet cable is an example of a data connection because it allows for data communication between the PSE 22 and ID 100.

In step 602, the ID determines the amount of power allocated to the ID by the PSE over the data connection. In some embodiments, the amount of power allocated to the ID by the PSE is determined by the ID based on classification in the physical layer, e.g., based on an occurrence of multi-event classification in the physical layer, like in step 206 of FIG. 7A in which the PSE indicates that it is type 2 and allocates Class 4 power (under a PoE standard) via two classification events. A processor in the ID may register the multi-event classification and store in memory an indication of the amount of power allocated by the PSE. In some embodiments, the amount of power allocated to the ID by the PSE is determined by the ID based on a power grant received from the PSE in a LLDP message, e.g., like in step 211 of FIG. 7A. A processor in the ID may read the power grant in the received LLDP message and store in memory the power granted as the amount of power allocated by the PSE.

In step 604, the ID determines the amount of power consumed by the PD or requested by the PD or granted to the PD. The PD is connected to the ID over a data connection, e.g., PD 24 connected to ID 100 via Ethernet cable 107. Determining the amount of power consumed by the PD may be performed using a current sensor that senses the amount of current being drawn by the PD, which is indicative of amount of power being consumed by the PD. In some embodiments, determining the amount of power consumed by the PD may be performed by monitoring the total power consumed to both operate the ID and power the PD, and subtracting off an amount of power that is known to be used by the ID to operate the ID (e.g., the maximum amount of power the ID can or would consume to operate the ID). Determining the amount of power requested by the PD may be performed by the processor in the ID recording how much power is requested by the PD in an LLDP message received from the PD. Determining the amount of power granted to the PD may be performed by the processor in the ID recording how much power has been granted to the PD in a LLDP power grant sent from the ID to the PD and/or by the processor recording how much power has been granted to the PD in physical layer classification.

In step 606, the ID compares the amount of power consumed by the PD or requested by the PD or granted to the PD to the amount of power allocated by the PSE, and operates in one of a plurality of modes of operation based on the comparison. The comparison may be performed by a processor in the ID comparing a value representing the amount of power consumed by or requested by or granted to the PD to another value representing the amount of power allocated to the ID by the PSE.

Each one of the plurality of modes of operation corresponds to a respective different amount of power consumed by the ID for operation of the ID. The different modes of operation may be preconfigured in the ID and selected by the processor of the ID, e.g., by the processor setting a particular value in memory corresponding to the selected mode.

In some embodiments, the ID determines, based on the comparison, that the amount of power allocated by the PSE is greater than the amount of power consumed by or requested by or granted to the PD by a particular margin (e.g., if the PSE allocates Class 4 power and the PD requests, is granted, or consumes Class 3 power, then the particular margin may be the difference between the Class 3 and Class 4 power, e.g., 25.5 W minus 15.4 W). The ID may determine which range of a plurality of ranges the particular margin falls within. Each range corresponds to a respective different one of the plurality of modes of operation. Based on the range the particular margin falls within, the ID operates in a corresponding mode of operation. In some embodiments, the particular margin may fall within the range corresponding to a first mode of operation in which the ID consumes more power for operation of the ID compared to a second mode of operation. For example, if the particular margin equals the difference between Class 3 and Class 4 power, then the ID may operate in a mode of operation that causes the ID to perform advanced functions that consume more power because there is a relatively large amount of power available for the ID to perform its functions. In other embodiments, the particular margin may fall within the range corresponding to a second mode of operation in which the ID consumes less power for operation of the ID compared to a first mode of operation. For example, if the amount of power allocated by the PSE is only slightly greater than the amount of power requested by or consumed by or granted to the PD, then the ID may operate in a mode of operation that causes the ID to perform limited functions that consume only limited power because there is not much power available for the ID (e.g., the ID may enter a sleep mode).

In some embodiments, the method of FIG. 14 may include repeating the comparing step 606 subsequent to one or more of the following occurring: the amount of power consumed by the PD changes; and/or the amount of power requested by the PD changes; and/or the amount of power granted to the PD changes; and/or the amount of power allocated to the ID by the PSE changes. The ID may operate in a different one of the plurality of modes of operation subsequent to repeating the comparing.

In some embodiments, different actions are performed by the ID in different modes of the plurality of modes of operation. For example, one mode of operation may be a sleep mode (low power), and another mode of operation may consist of deep packet inspection and analytics (higher power).

In some embodiments, a message may be transmitted over the data connection via the PSE to a computing device on a network. The computing device may be a server or a laptop, mobile device, or desktop computer on the network. The message may include information indicating the mode in which the ID is operating. The information may be for presentation on a user interface (e.g., for a user such as a network operator or technician to read). The communication may occur by the processor of the ID instructing transmission of the message over a data channel through the PSE interface over the data connection.

In FIG. 14, when the ID is connected between the PSE and PD and operational, the ID may pass through at least some data communication between the PSE and the PD.

In some embodiments, an ID is provided that is configured to be connected between a PSE and a PD. The ID includes: a PSE interface to interface with the PSE over a first data connection; a PD interface to interface with the PD over a second data connection; and a processor to directly perform (or cause the ID to perform) operations described above in relation to FIG. 14.

Figure 15:
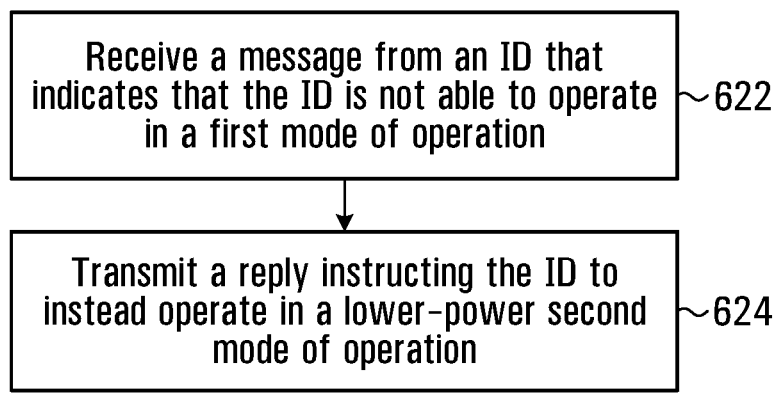
FIG. 15 illustrates a flowchart illustrating a device instructing method according to an embodiment.

FIG. 15 illustrates a computer-implemented method, according to another embodiment. The computer-implemented method may be performed by a server on a network, or by a mobile device or a personal computing device (e.g., desktop computer).

In step 622, a message is received over a network. The message is from an ID. The message indicates that the ID is not able to operate in a first mode of operation using the power allocated to the ID by a PSE in view of the amount of power to be supplied by the ID to a PD.

In step 624, subsequent to receiving the message, a reply is transmitted back to the ID over the network. The reply instructs the ID to instead operate in a second mode of operation, where the second mode of operation consumes less power than the first mode of operation.

In some embodiments, in response to receiving the message in step 622: information is transmitted for presentation on a user interface. The information indicates that the ID is not able to operate in the first mode of operation. The user interface may be viewed by a network operator or a technician. In some embodiments, subsequent to transmitting the information for presentation on the user interface, an instruction is received that originates from user input through the user interface. The instruction indicates that the ID is to instead operate in the second mode of operation. The user input may be from a technician or network operator. The reply sent in step 624 may be transmitted to the ID in response to receiving the instruction.

In some embodiments, after steps 622 and 624, a subsequent message is received over the network. The subsequent message is from the ID, and the subsequent message indicates that the ID is now able to operate in the first mode of operation. In some embodiments, after receiving the subsequent message a subsequent reply is transmitted over the network to the ID. The subsequent reply instructs the ID to operate in the first mode of operation.

In some embodiments, in the second mode of operation the ID is to perform fewer or lower-power tasks compared to the first mode of operation. For example, the second mode of operation may be a sleep mode. In the second mode of operation, the ID may still be configured to send and receive messages over the network, e.g., so that the ID can report to the network and/or be instructed through the network to switch modes of operation.

In some embodiments, in the second mode of operation the ID is to perform at least one of the following actions: modify the operation of the ID to reduce the amount of power consumed by the ID to operate the ID; discontinue powering the PD; grant less power to the PD than the amount of power requested by the PD; supply less power to the PD than the amount of power being used to power the PD.

In some embodiments, a computing device is provided. The computing device may be a server on a network, a mobile device on the network, a computer connected to the network, or another computing device on the network. The computing device includes a processor and a network interface. The processor may be: a specialized processor, such as a microcontroller; or a general purpose processor that executes instructions stored in memory; or dedicated circuitry, such as an ASIC, GPU, or a programmed FPGA; or some combination of the foregoing, e.g., a general purpose processor and some dedicated circuitry. The network interface facilitates communication over a network. The network interface may be implemented as a network interface card (NIC), and/or a computer port (e.g., a physical outlet to which a plug or cable connects), and/or a network socket, etc. In some embodiments, the processor is to directly perform (or cause the computing device to perform) operations described above in relation to FIG. 15, e.g., receiving and transmitting the messages over the network via the network interface.

Figure 16:
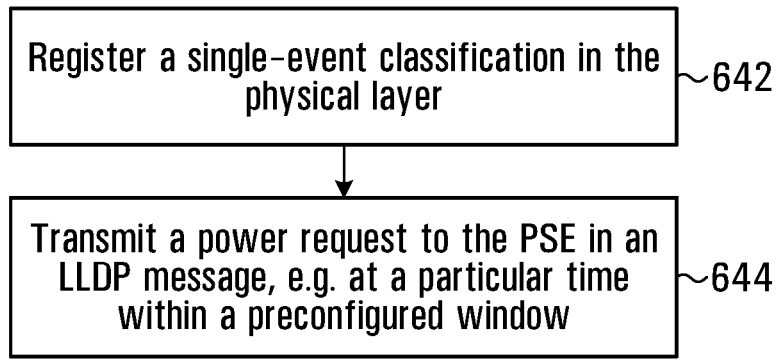
FIG. 16 illustrates a flowchart illustrating a power requesting method according to an embodiment.

FIG. 16 is a flowchart illustrating steps of a method performed by a device according to one embodiment. The device is connected to a PSE over a data connection. For example, the device may be an ID or a PD that is connected to the PSE via an Ethernet cable, where the Ethernet cable is an example of a data connection because it allows for data communication between the PSE and the device. If the device is an ID, then the ID may be connected between the PSE and the PD, e.g., to pass data communication between the PSE and the PD when in operation.

In step 642, the device registers a single-event classification in the physical layer. An example is step 208 of FIG. 7A. The single-event classification may be registered by a single voltage drop in the physical layer, and a processor of the device may record in a memory that the single-event classification occurred.

In step 644, in response to the single-event classification in the physical layer: the device transmits a power request to the PSE over the data connection. The power request is transmitted in a LLDP message. The power request may be an initial power request. An example is step 208 of FIG. 7A in which the ID transmits an LLDP message to the PSE requesting power. The LLDP message may be generated by the processor in the device and the processor instructs the LLDP message to be transmitted on the data channel over the data connection from the device to the PSE.

In some embodiments, in step 644 the LLDP message is transmitted over the data connection to the PSE at a particular time within a preconfigured time window. In some embodiments, the particular time may be a random time selected by the device. In some embodiments, the particular time may be preconfigured. In some embodiments, the particular time may be preconfigured based on a priority of the device compared to other devices connected to the PSE. In some embodiments, the particular time is earlier within the preconfigured time window compared to another time within the preconfigured time window at which another lower-priority device (ID or PD) transmits their power request to the PSE in response to the single-event classification in the physical layer.

In some embodiments, the particular time is preconfigured based on a message received over the data connection from the PSE. The message is received from the PSE, but the message may ultimately originate from a computing device on a network (e.g., a server on the network or a mobile device, laptop, or other user device on the network). Alternatively, the message may originate from the PSE.

In some embodiments, the preconfigured time window is preconfigured based on a message received over the data connection via the PSE. The message is received from the PSE, but the message optionally could have ultimately originated from another computing device on the network.

In some embodiments, the particular time within the preconfigured time window is different from another time within the preconfigured time window at which another device (ID or PD) transmits their power request to the PSE in response to the single-event classification in the physical layer.

In some embodiments, the power request is a first power request (e.g., an initial power request), and subsequent to transmitting the first power request, the device transmits a second power request to the PSE. The second power request requests less power than the first power request. The second power request may also be transmitted within the preconfigured time window. An example is described earlier in relation to step 208 of FIG. 7A in which an ID operates in a manner to try to avoid the problem of exceeding the PSE's total power budget when multiple IDs connected to the PSE all power up at the same time. The device may initially request (in the first power request) Class 4 maximum power, but then follow-up with a subsequent LLDP message requesting less power (when possible) based on the actual power requirements of the PD to which the ID is connected.

In some embodiments, a device (ID or PD) is provided that is configured to be connected to a PSE over a data connection. The device includes a PSE interface to interface with the PSE over the data connection. The device further includes a processor to directly perform (or cause the device to perform) operations described above in relation to FIG. 16.

FIG. 16 illustrates a method from the perspective of a device (e.g., PD or ID). The perspective of the PSE will now be discussed.

Figure 17:
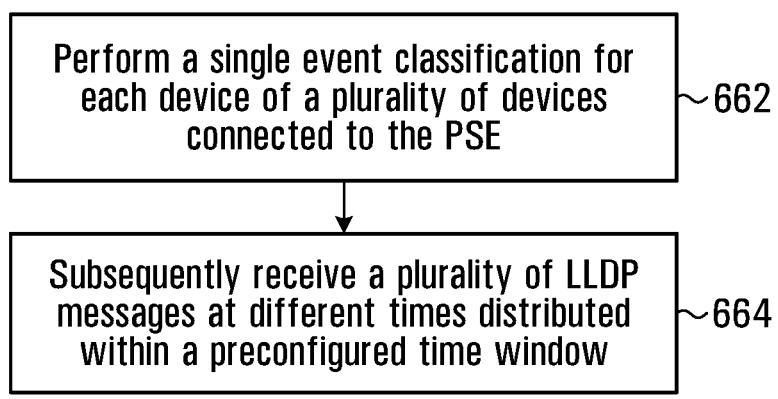
FIG. 17 illustrates a flowchart illustrating an event classification method according to an embodiment.

FIG. 17 is a flowchart illustrating steps of a method performed by a PSE according to one embodiment.

In step 662, for each device of a plurality of devices connected to the PSE: performing a single event classification in the physical layer. Each device may be connected to the PSE via a respective port of the PSE. Each device may be a PD, or an ID that is connected between the PSE and a PD. An ID may pass data communication between the PSE and a PD during operation. In some embodiments, one or more of the devices could each be a PD, and the others could each be an ID, or vice versa. The single-event classification may be performed by a single voltage drop in the physical layer.

In step 664, the PSE subsequently receives a plurality of LLDP messages. Each one of the plurality of LLDP messages is from a respective different one of the plurality of devices, and each one of the plurality of LLDP messages arrives at a different time distributed within a preconfigured time window. Each one of the plurality of LLDP messages may include a power request (e.g., an initial power request) from a respective different one of the plurality of devices.

In some embodiments, each one of the plurality of LLDP messages arrives at a different time randomly distributed within the preconfigured time window.

In some embodiments, the time at which each one of the plurality of LLDP messages arrives may be preconfigured by either: (i) the PSE; or (ii) a computing device on a network that communicates with each one of the plurality of devices via the PSE. The computing device may be a server on a network or another computing device that perhaps interfaces with a user (e.g., a mobile device, laptop, or personal computer having a user interface to interface with a network operator or technician).

In some embodiments, a first device of the plurality of devices is higher priority than a second device of the plurality of devices, and the first device is preconfigured to have its LLDP message arrive earlier in the preconfigured time window than the LLDP message from the second device.

In some embodiments, each LLDP message of the plurality of LLDP messages contains a power request. The power request in each LLDP message may be an initial power request from the respective device that transmitted that LLDP message, but not necessarily.

In some embodiments, the method of FIG. 17 may include: (1) receiving, from a first device of the plurality of devices, a first LLDP message within the preconfigured time window, the first LLDP message including a first power request (e.g., an initial power request after physical layer classification); and (2) subsequently receiving, from the first device, a second LLDP message including a second power request, the second power request requesting less power than the first power request. The first power request may be an initial power request after physical-layer classification, and the second power request may be a follow-up power request. In some embodiments, the method may further include receiving, from a second device of the plurality of devices, a third LLDP message within the preconfigured time window. The third LLDP message includes a third power request, which may be an initial power request sent after physical-layer classification. The second LLDP message may be received within the preconfigured time window before the third LLDP message.

An example is described earlier in relation to step 208 of FIG. 7A in which a plurality of IDs operate in a manner to try to avoid the problem of exceeding the PSE's total power budget when multiple IDs connected to the PSE all power up at the same time. An ID may initially request (in the first LLDP message) Class 4 maximum power, but then follow-up with a subsequent LLDP message requesting less power (when possible) based on the actual power requirements of the PD to which the ID is connected. The subsequent LLDP message requesting less power may be received within the preconfigured time window before an initial power request (third LLDP message) from another ID.

In some embodiments, a PSE is provided that includes a plurality of ports. Each port is for connection to a respective different one of a plurality of devices (e.g., a plurality of IDs or PDs) over a data connection. The PSE further includes a power supply to provide power to each ID or PD connected to each one of the plurality of ports, e.g., according to a PoE standard. The PSE further includes a processor. The processor may be: a specialized processor, such as a microcontroller; or a general purpose processor that executes instructions stored in memory; or dedicated circuitry, such as an ASIC, GPU, or a programmed FPGA; or some combination of the foregoing, e.g., a general purpose processor and some dedicated circuitry. The processor directly performs (or causes the PSE to perform) operations described above in relation to FIG. 17. For example, the processor may instruct the power supply of the PSE to perform the voltage drop to perform the single event classification in the physical layer for each device of the plurality of devices. As another example, the processor may receive and read the LLDP messages from the plurality of devices.

In view of and in addition to the above, some additional examples will now be described.

In one example there is provided a method performed by an ID connected to PSE over a data connection. The method may include requesting a first amount of power to be supplied by the PSE over the data connection. In some implementations the request from the ID may be an LLDP message. In some implementations request may be a current draw corresponding to a power class. In some implementations the request may be sent before connecting to a PD, in which case the request may be for a maximum amount of power that can be supplied by PSE. In some implementations, the request may be sent after the PD is connected to the ID, e.g., an LLDP message sent to PSE once the ID knows the PD power requirements.

The method may further include storing an indication of a second amount of power requested from a PD connected to the intermediary device. In some implementations, if the PD indicates its power class by drawing a certain amount of current, then ID may need to store somewhere the amount of power being requested by the PD based on the current draw. In some implementations, if the PD indicates a more specific level of power by sending an LLDP message, then the ID may still need to store somewhere the amount of power being requested by the PD in the LLDP message.

In some implementations, when the second amount of power is less than the first amount of power, the method may include consuming some power supplied by the PSE to operate the intermediary device, delivering other power supplied by the PSE to the PD, and passing through at least some data communication between the PD and the PSE. In some implementations, the delivering of power supplied by the PSE to the PD may occur as follows: the ID draws all power, some of which is used for a power supply in the ID that powers the PD; this may have the advantage of possibly isolating the PSE power supply from the PD and may also allow the ID to be connected to the PSE and be operational before the PD is connected to the ID. In some implementations, the delivering of power supplied by the PSE to the PD may occur as follows: the ID delivers the power by passing the conductor having the power through the ID to the PD; the ID and PD then act as parallel loads on the PSE power supply.

In some implementations the second amount of power is equal to the first amount of power, and the method further includes: automatically disconnecting the PD.

In some implementations, the second amount of power is equal to the first amount of power, and the method further includes: consuming some power supplied by the PSE to operate the intermediary device, delivering other power supplied by the PSE to the PD, and monitoring whether total power consumed by both the intermediary device and the PD exceeds a threshold. The threshold may be equal to the first amount of power.

In some implementations, the first amount of power is equal to the maximum amount of power the PSE is configured to supply over the data connection.

In some implementations, the method may further include: the intermediary device disconnecting the PD when the total power consumed by both the intermediary device and the PD exceeds the maximum amount of power the PSE is configured to supply over the data connection.

In some implementations, the intermediary device may operate in a first power mode when the second amount of power is less than the first amount of power, and the intermediary device may operate in a second lower power mode when the second amount of power is equal to the first amount of power. In some implementations, in the lower power mode the intermediary device may perform operations that consume less power than the amount of power consumed by the intermediary device when the intermediary device operates in the first power mode.

In some implementations, the intermediary device communicates with the PD using a LLDP, and the method further includes receiving, from the PD, an LLDP message requesting the second amount of power.

In some implementations, the intermediary device communicates with the PSE using the LLDP, and wherein: the first amount of power is requested in an LLDP message sent from the intermediary device to the PSE; the first amount of power is set to be both (i) greater than the second amount of power and (ii) not exceeding the maximum amount of power the PSE is configured to supply over the data connection.

In some implementations, the first amount of power is equal to the maximum amount of power the PSE is configured to supply over the data connection.

In another example a method is performed by an intermediary device (ID) connected between PSE and a PD over a data connection. The method may include consuming some power supplied by the PSE over the data connection to operate the intermediary device, delivering other power supplied by the PSE over the data connection to the PD, and passing through at least some data communication between the PD and the PSE. The method may further include monitoring the amount of power consumed by the PD.

The method may further include: in response to the amount of power consumed by the PD exceeding a threshold, transmitting a notification message over the data connection via the PSE to a server on a network.

In some implementations, in response to the amount of power consumed by the PD exceeding the threshold: the intermediary device disconnects the PD.

In some implementations, monitoring the power consumed by the PD includes measuring the amount of electric current flowing into the PD.

The intermediary device 100 specified in the preceding description allows the external PD 24 to be powered via the same PoE link as the intermediary device 100 itself. This poses challenges that are to be addressed to ensure proper operation of both the intermediary device 100 and the PD 24. One of the challenges involves "bridging" of the power lines between the intermediary device 100 and the external PD 24 that will connect to the intermediary device 100. The power lines implemented as Power over Ethernet rails typically provide between 48V and 60V. Another of the challenges involves "bridging" of the data lines between the intermediary device 100 and the external PD 24 that will connect to the intermediary device 100. The data lines in a typical PoE implementation carry Ethernet data at voltage values less than 12V.

One issue with bridging the power lines is that the intermediary device 100 will often be configured to operate using what may be called "digital logic" voltage levels, which are typically under 12V. However, the external PD 24 connected to the intermediary device 100 will be configured to operate using the PoE voltage levels. The PD interface 46 (see FIG. 2) will, accordingly, typically require a voltage supply between 48V and 60V. The PD interface 46 is typically implemented using a PSE controller integrated circuit.

In a PoE implementation without the intermediary device 100, the PD controller integrated circuit will ensure the proper detection and classification of the device and a voltage converter (most typically an isolated buck-converter) topology will be used to reduce voltage provided on the PoE voltage rail (a "rail voltage level") to these digital logic voltage levels.

Two approaches are considered for bridging the power lines between the intermediate device 100 and the external PD 24.

Figure 18:
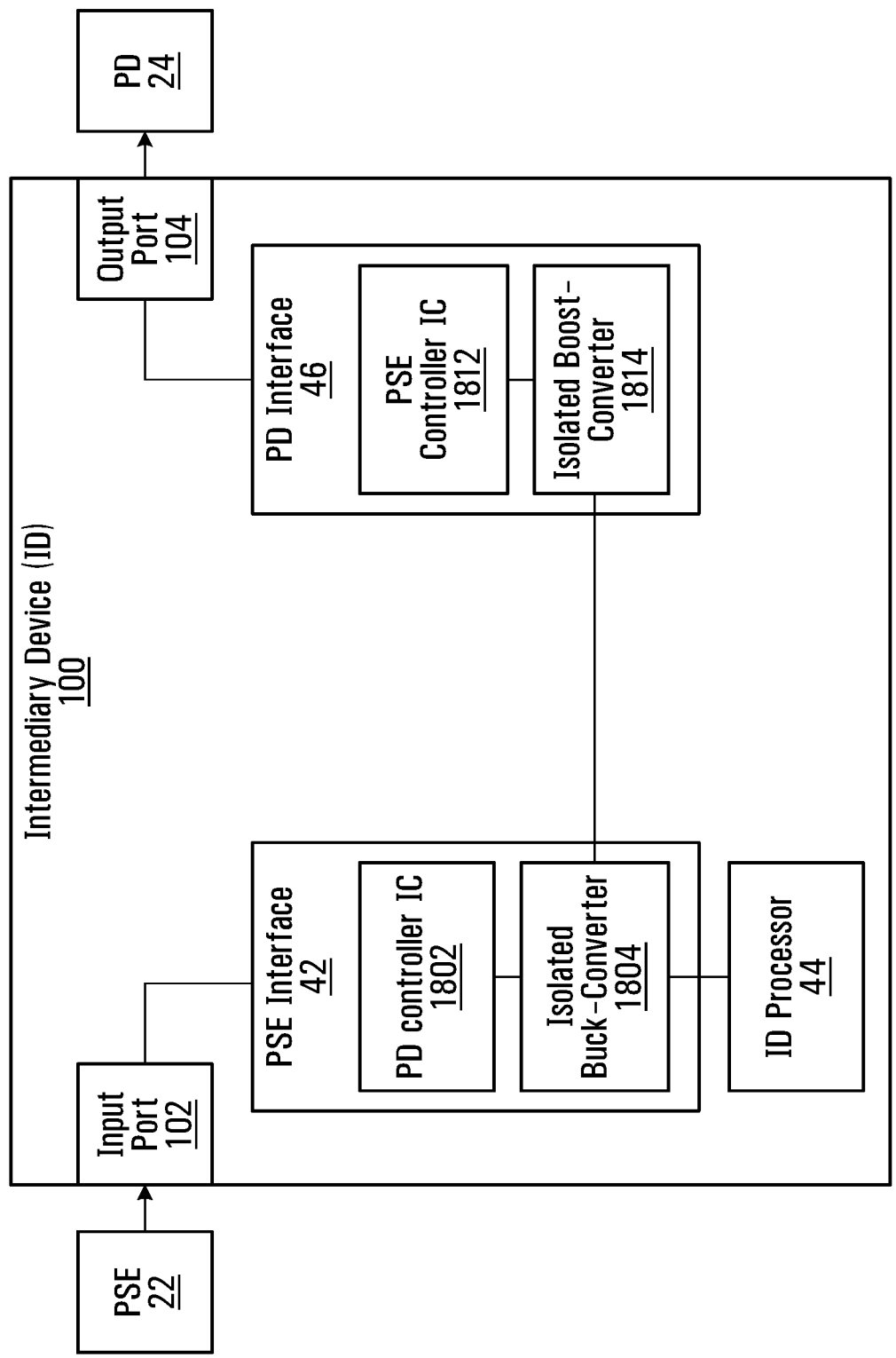
FIG. 18 illustrates, as a block diagram, components of the intermediary device of FIG. 1 for power bridging, according to an embodiment.

In a first approach, illustrated in FIG. 18, the PSE interface 42 includes a PD controller integrated circuit (IC) 1802 connected to an isolated buck-converter 1804. In operation, the PD controller IC 1802 allows the intermediary device 100 to appear, to the PSE 22, as a PD. The PSE 22 provides a voltage on the PoE voltage rail and this rail voltage level is provided, by the PD controller IC 1802, to the isolated buck-converter 1804. The isolated buck-converter 1804 may be used to reduce the rail voltage level down to digital logic voltage levels (3.3V/5V/12V). The ID processor 44 may use the digital logic voltage levels at the output of the PSE interface 42.

The PD interface 46 of FIG. 18 includes a PSE controller integrated circuit (IC) 1812 connected to an isolated boost-converter 1814. In operation, the PSE controller IC 1812 allows the intermediary device 100 to appear, to the PD 24, as a PSE.

The isolated boost-converter 1814 receives digital logic voltage levels from the isolated buck-converter 1804 and boosts the digital logic voltage levels back to the rail voltage level.

Figure 19:
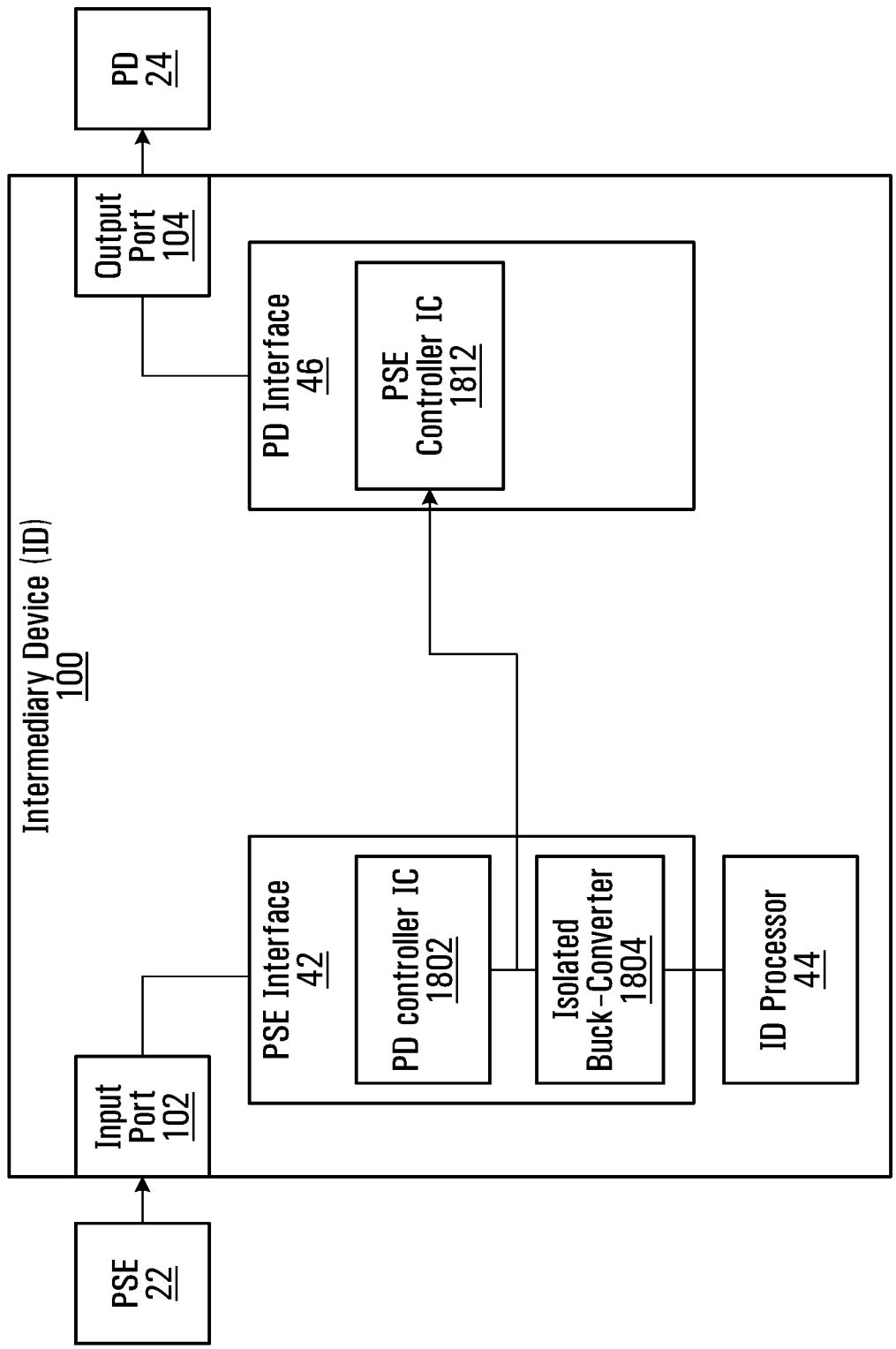
FIG. 19 illustrates, as a block diagram, components of the intermediary device of FIG. 1 for power bridging, according to an embodiment.

In a second approach, illustrated in FIG. 19, the PSE interface 42 includes the PD controller IC 1802 connected to the isolated buck-converter 1804. The PSE 22 provides a voltage on the PoE voltage rail and this rail voltage level is provided, by the PD controller IC 1802, to the isolated buck-converter 1804 and to the PSE controller IC 1812. In common with FIG. 18, the isolated buck-converter 1804 may be used to reduce the rail voltage level down to digital logic voltage levels (3.3V/5V/12V) and the ID processor 44 may use the digital logic voltages at the output of the PSE interface 42.

Instead of using the separate boost-converter 1814 (see FIG. 18) to re-create the PoE voltage rail, the rail voltage level input to the PSE controller IC 1812 of the PD interface 46 may be received directly from the output of the PD controller IC 1802 of the PSE interface 42. Note that, in this method, even if the PoE voltage rail is bridged directly, as illustrated in FIG. 19, there are challenges in that the PD interface 46 may only provide power to the external PD device 24 if the PD interface 46 successfully passes detection and classification as per the PoE standard. These challenges may be resolved using electronic circuits. The electronic circuits may, in some instances, be external circuits. These challenges may also be resolved by using functionalities that may be provided by the PD controller IC 1802 and/or through control of the PSE controller IC 1812 by the ID processor 44.

A further consideration relates to whether the ID 100 has determined that the external PD device 24 should be switched on. The second approach, illustrated in FIG. 19, maintains the rail voltage level and digital voltage level isolated from each other and avoids the use of a second voltage converter (the isolated boost-converter 1814 of FIG. 18) and efficiency losses associated with the use of a second voltage converter.

While the approaches of FIG. 18 and FIG. 19 address the issue of bridging power, a similar issue exists regarding bridging data. Data comes into the Intermediary Device 100 in the form of Ethernet packets in an IP network. In a regular PoE implementation, RJ45 magnetics act to decouple data lines from power lines. The RJ45 magnetics route the data lines towards an Ethernet port (a so-called "PHY"), which is a physical layer electronic circuit. The RJ45 magnetics route the power lines towards power circuitry. In the case of the Intermediate Device 100 in the middle of an Ethernet link, the data coming into the Intermediate Device 100 can be destined either to the Intermediate Device 100 or to the external PD 24 connected to the Intermediate Device 100.

Figure 20:
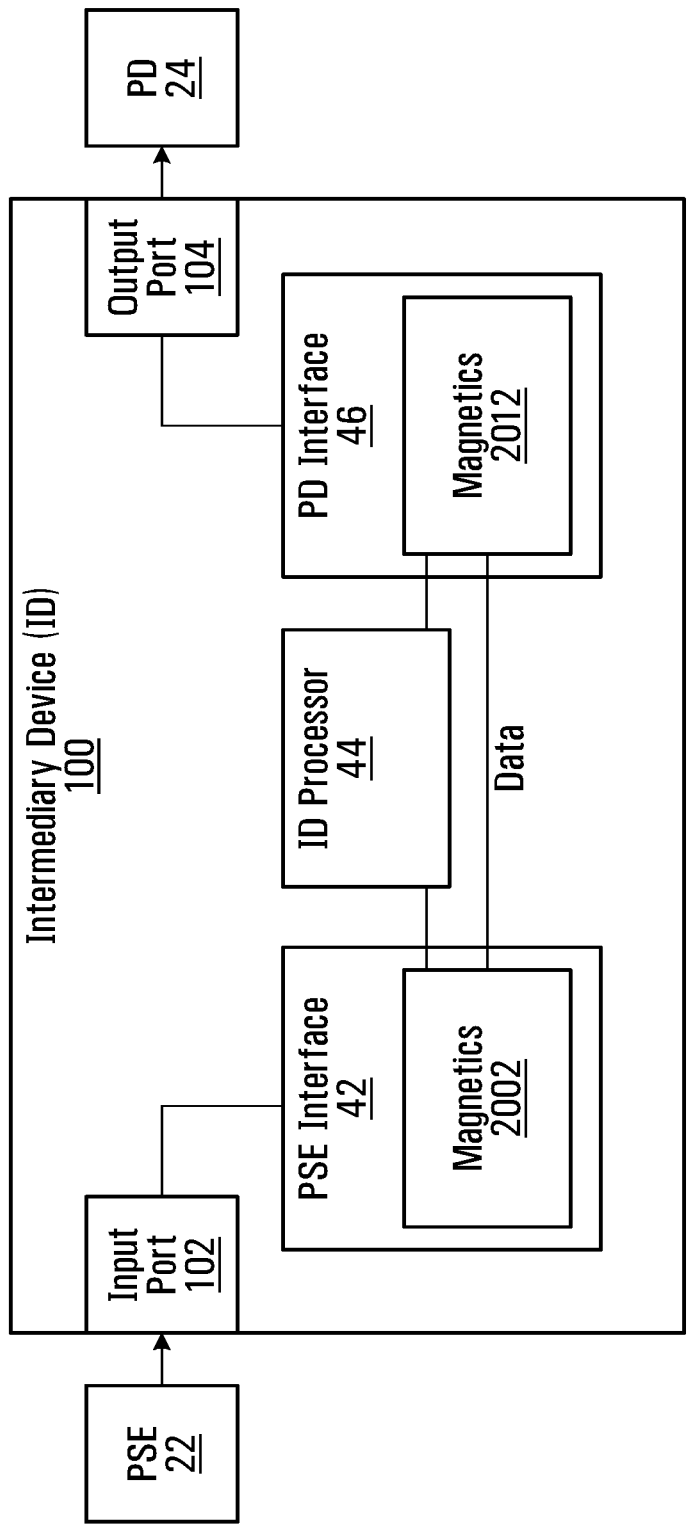
FIG. 20 illustrates, as a block diagram, components of the intermediary device of FIG. 1 for data bridging, according to an embodiment.

A first approach to bridging the data between the PSE 22 and the PD 24 is illustrated in FIG. 20, wherein the PSE interface 42 is illustrated as including PSE RJ45 magnetics 2002 and the PD interface 46 is illustrated as including PD RJ45 magnetics 2012. In operation, the PSE RJ45 magnetics 2002 may route received and decoupled data directly to the PD RJ45 magnetics 2012.

In the approach that involves direct routing of data from the PSE RJ45 magnetics 2002 to the PD RJ45 magnetics 2012, however, LLDP may not be possible. Consequently, the ID 100 may not be able to intervene in the data communication between the external PD 24 and the PSE 22. The only PoE support for the ID 100 may be through hardware negotiation. The ID 100 may still be able to measure power consumption and enable or disable the external PD 24, but the ID 100 may not be externally controllable. The approach that involves direct routing of data from the PSE RJ45 magnetics 2002 to the PD RJ45 magnetics 2012 may be shown to add "smart" power measuring/decision-making to a PoE link through the ID 100. Power metrics may be stored in the ID processor 44. Notably, in this approach, PHYs may not be required on the ID processor 44.

The approach illustrated in FIG. 20 may be modified to include two PHYs on the ID processor 44. The PHYs may be wired in cross-over mode (Rx-side to Tx-Side over both PHYs) with no Tx-lines going to the magnetics and no termination resistors. This may allow data to be communicated between the external PSE 22 and the external PD 24 and may allow for the data to be monitored (and copied) by the ID processor 44. However, the ID processor 44 may not be able to communicate to the external PSE 22 and, accordingly, LLDP may still not be possible.

Figure 21:
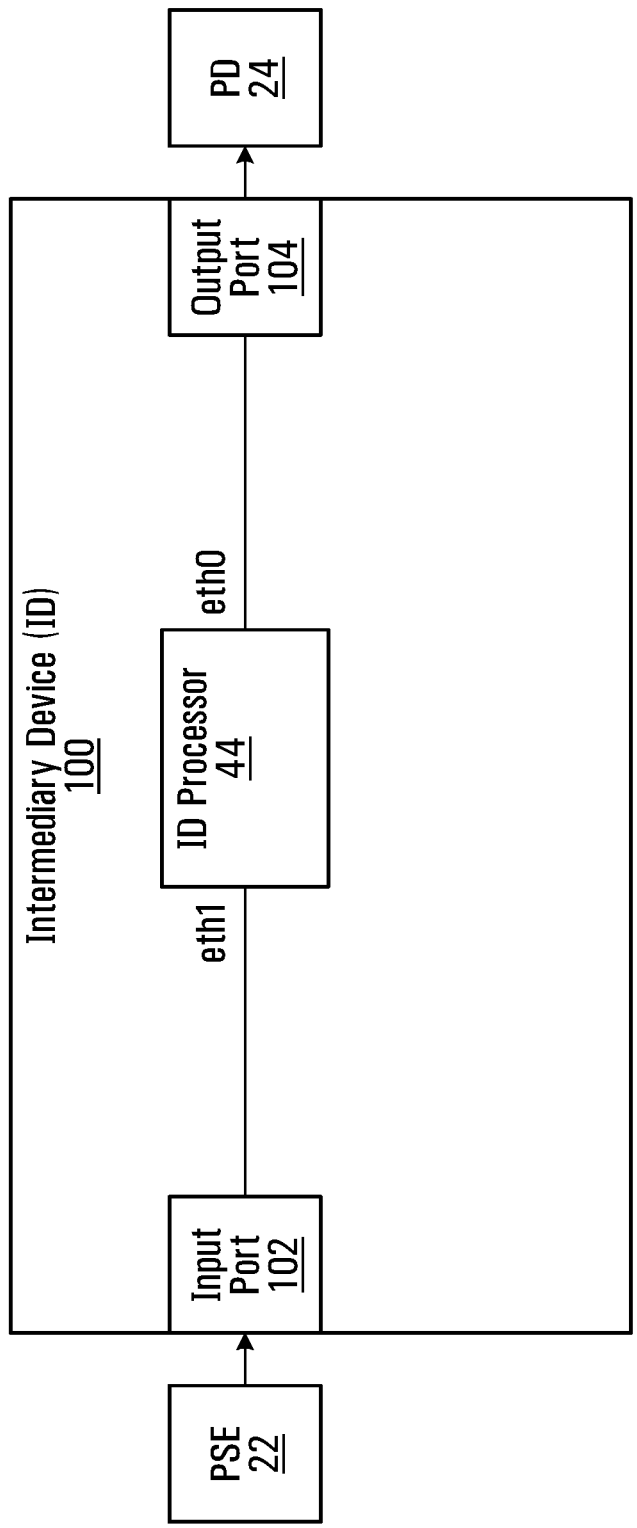
FIG. 21 illustrates, as a block diagram, components of the intermediary device of FIG. 1 for data bridging, according to an embodiment.

In a second approach, illustrated in FIG. 21, the ID processor 44 includes two PHYs: one PHY (labelled "eth1" but not otherwise shown in FIG. 21) on the input side of the ID processor 44; and one PHY (labelled "eth0" but not otherwise shown in FIG. 21) on the output side of the ID processor 44. These PHYs operate independently of each other in hardware but, in software, the two PHYs are linked together via a network bridge (not shown). In operation, packets coming into the PHY on the input side are treated by the network bridge.

Rather than treating packets by the network bridge, one or more IP routes can be set up from the PHY on the input side to the PHY on the output side.

In this approach, upon receiving a packet destined to the external PD 24, the intermediary device 100 may store a copy of the packet. The intermediary device 100 may then forward the packet to the external PD 24. Alternatively, subsequent to storing a copy of the packet and before forwarding the packet to the external PD 24, the intermediary device 100 may treat and/or modify the packet.

One disadvantage of implementing the approach illustrated in FIG. 21 is that the ID 100 is tapping "in-line." A consequence of the ID 100 losing power is that the network traffic to the external PD 24 may be interrupted. This can be a perfectly acceptable "limitation" in certain applications.

Note that, if transparent operation is desired, the ID 100 may be configured to have the input port 102 "spoof" the Media Access Control (MAC) address of the PD 24 to, thereby, make the PSE 22 "think" it is talking directly to the PD 24. Similarly, the ID 100 may be configured to have the output port 104 "spoof" the MAC address of the PSE 22 to, thereby, make the PD 24 "think" it is talking directly to the PSE 22.

Figure 22:
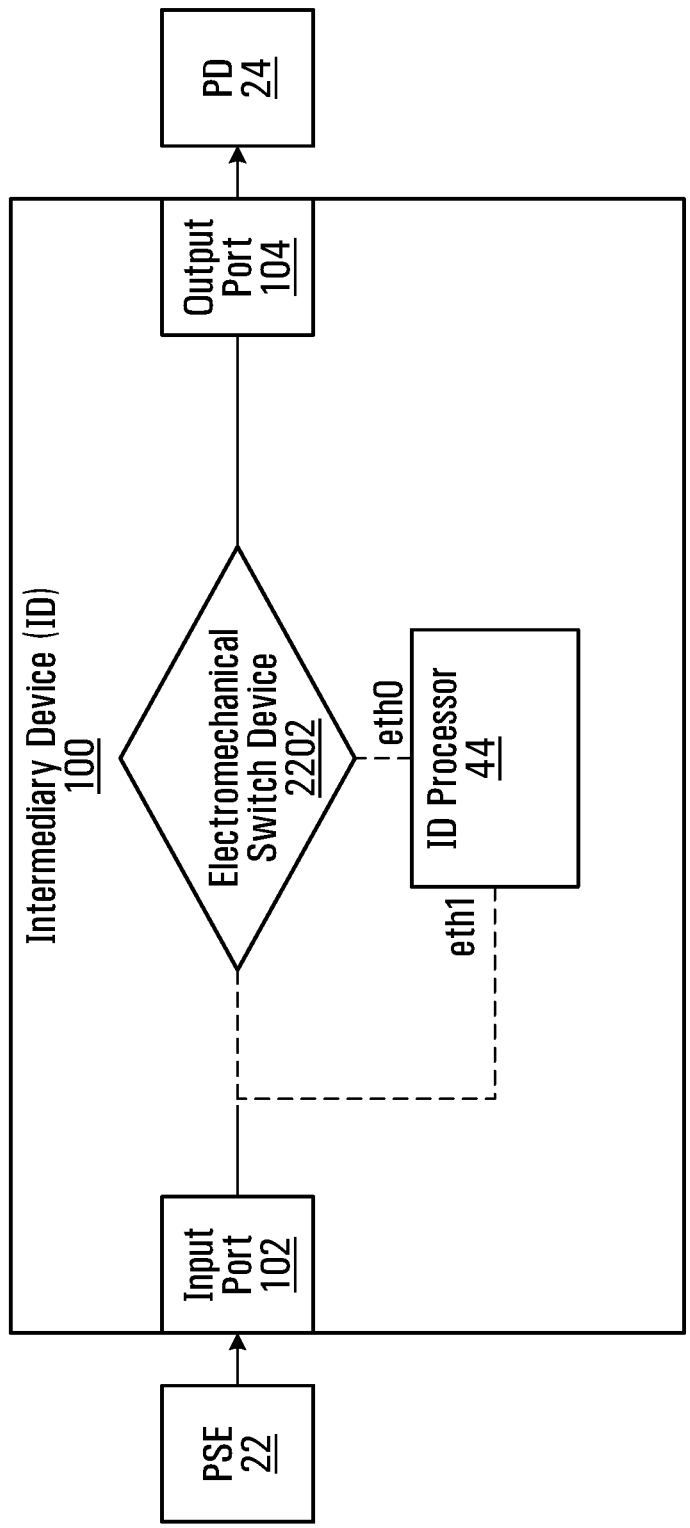
FIG. 22 illustrates, as a block diagram, components of the intermediary device of FIG. 1 for data bridging, according to an embodiment.

The intermediary device 100 of FIG. 22 is equipped with a switch device 2202. The switch device 2202 may be implemented as an electro-mechanical relay or an electronic switch. The switch device 2202 may be seen to allow for the intermediary device 100 to act as a network tap. In common with the approach illustrated in FIG. 21, in the approach illustrated in FIG. 22, the ID processor 44 includes two PHYs: one PHY (not shown in FIG. 22) on the input side of the ID processor 44; and one PHY (not shown in FIG. 22) on the output side of the ID processor 44.

In operation, when the ID processor 44 is active, the switching device 2202 can also be active, thereby allowing the signals coming into the input port 102 of the ID 100 to be received at the PHY on the input side of the ID processor 44. The ID processor 44 treats the received signals and sends treated signals out through the PHY on the output side of the ID processor 44 so that the treated signals can reach the external PD device 24.

The approach illustrated in FIG. 22 has a feature of being "out-of-line." That is, if the intermediary device 100 is inactive or shutdown, then the switching device 2202 can be set to transfer signals received on the input port 102 directly to the external PD 24 via the output port 104. Thus, the external PD 24 may receive signals seamlessly when the intermediary device 100 is active and when the intermediary device 100 is inactive.

Note that MAC "spoofing" may be used to enable transparent operation, as described in the approach of FIG. 21.

Figure 23:
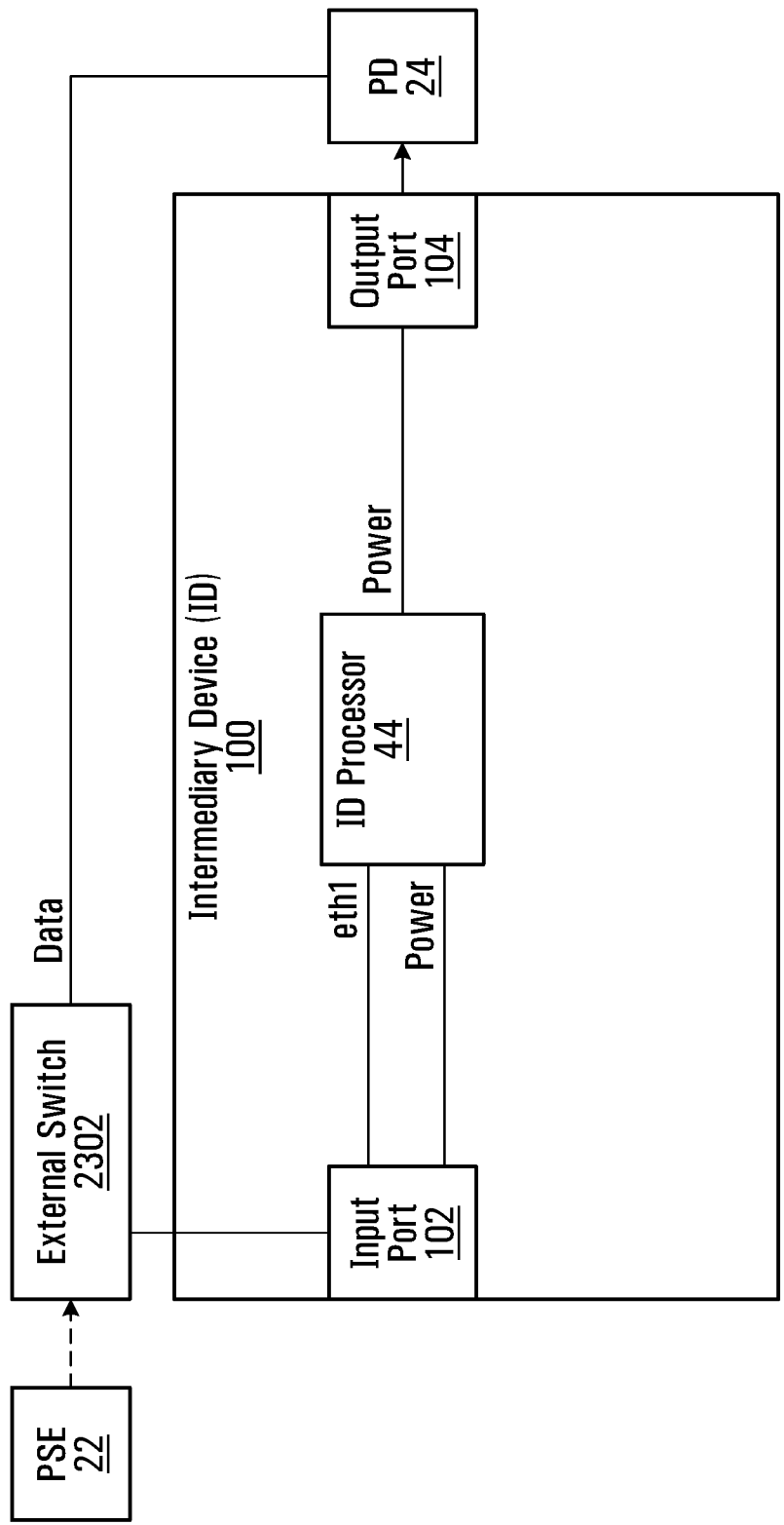
FIG. 23 illustrates, as a block diagram, components of the intermediary device of FIG. 1 for data bridging, according to an embodiment.

The ID 100 and the external PD 24 can be connected, as illustrated in FIG. 23, to two different ports on an external network switch 2302 connected to the PSE 22. The network switch 2302 can be part of the PSE 22 that is behaving as power source for the ID 100. Alternatively, the network switch 2302 may interpose the PSE 22 and the ID 100.

In one aspect of the present application, for the PoE power negotiation and monitoring, there may be one connection (e.g., Ethernet cabling) between the network switch 2302 and the ID 100 and a further connection (e.g., Ethernet cabling) between the ID 100 and the external PD 24. In the same scenario, for data communication, there may be one direct connection (e.g., Ethernet cabling) between the network switch 2302 and the ID 100 and another direct connection (e.g., Ethernet cabling) between the network switch 2302 and the external PD 24.

Depending on the configuration of the network switch 2302, the ID 100 and the external PD 24 may be assigned to the same Virtual Local Area Network (VLAN). Alternatively, the ID 100 and the external PD 24 may be assigned to distinct VLANs. Each of these options provide different connectivity.

The packets directed, by the network switch 2302, to the external PD 24 may also be mirrored, by the network switch 2302, to the intermediary device 100 through a mirrored port setup on the network switch 2302. Upon receipt of the packets from the network switch 2302, the packets may be inspected by the ID 100. In this approach, the ID 100 may be configured in such a way that the ID 100 sends alerts to another host (not shown) and/or to back-end software (not shown) on the network, with the alerts being generated based on the inspected packets. Conveniently, this approach uses only one PHY on the Intermediate Device 100.

Figure 24:
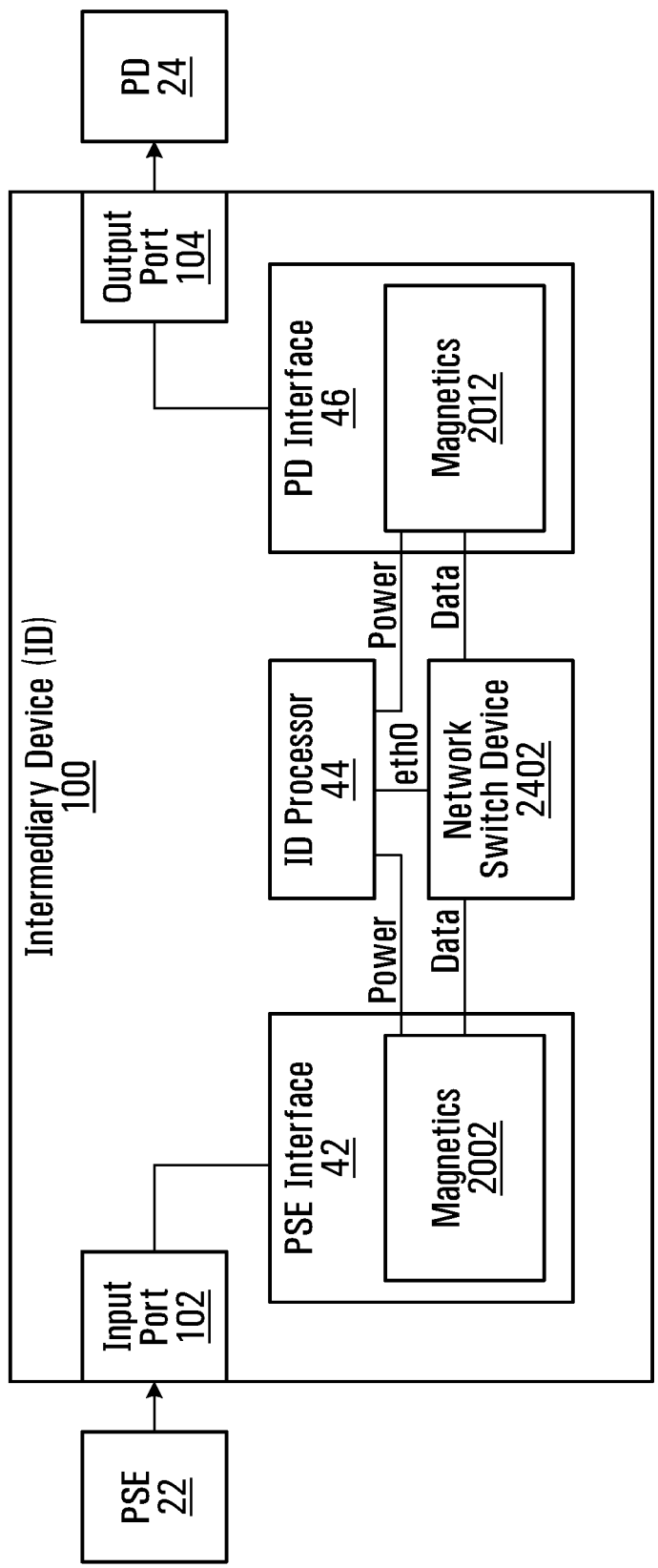
FIG. 24 illustrates, as a block diagram, components of the intermediary device of FIG. 1 for data bridging, according to an embodiment.

A further approach is illustrated in FIG. 24, wherein the ID 100 includes an internal network switch device 2402. The Intermediate device 100 incorporates the RJ45 magnetics 2002, 2012 (see FIG. 20) for separating the power and data on a received Power over Ethernet link. In operation, the PSE RJ45 magnetics 2002 act to split the power from the data and the PD RJ45 magnetics 2012 act to re-insert the power on the PoE link.

In the approach illustrated in FIG. 24, data coming into the ID 100 from the external PSE 22 is passed, by the PSE RJ45 magnetics 2002, to one port of the network switch device 2402. Additionally, power coming into the ID 100 from the external PSE 22 is passed, by the PSE RJ45 magnetics 2002, to the ID processor 44. The ID processor 44 of the ID 100 maintains a connection to a port of the network switch device 2402. A third port on the network switch device 2402 connects to the PD RJ45 magnetics 2012 so that the data may be re-inserted (along with the power) for output by the PD interface 42.

The network switch 2402 may be configured in such a way (through VLANs, MAC forwarding tables, port mirroring or other methods) that packets flowing through the ID 100 (from the external PSE 22 to the external PD 24 or vice-versa) may be forwarded to the ID processor 44 before being sent out of the ID 100. The ID processor 44 may then store, sniff, analyze or transform packets before sending packets out to their proper destination (through the network switch device 2402).

Conveniently, this approach uses only one PHY on the ID processor 44, instead of two PHYs. This approach may be considered to be transparent in the sense that, if the ID processor 44 fails for any reason, packets may still flow between the external PSE 22 and the external PD 24.

For LLDP to be fully functional in the approach illustrated in FIG. 24, the network switch device 2402 is provided with a capability to forward LLDP messages from the external PD device 24 to the ID processor 44, thereby allowing the ID processor 44 to properly respond. The network switch device 2402 is provided with a capability to forward LLDP messages from the ID processor 44 to the external PD device 24. Similarly, the network switch device 2402 is provided with a capability to forward LLDP messages between the ID processor 44 and the external PSE 22 device for LLDP negotiations on the link between the PSE 22 and the ID 100. This capability may be achieved through different switch configurations, such as VLANs, MAC forwarding tables, etc.

Conclusion

Although the figures sometimes indicate modules working with individual processors operating independently and possibly in parallel, all embodiments may, instead, be performed by a single processor in the intermediary device. For example, all of the different processors illustrated in the intermediary device may, instead, be a single processor.

Although the foregoing has been described with reference to certain specific embodiments, various modifications thereof will be apparent to those skilled in the art without departing from the scope of the claims appended hereto.

The invention claimed is:

1. A method performed by an intermediary device (ID) connected to power sourcing equipment (PSE) over a data connection, the method comprising:
   determining an amount of power allocated to the ID by the PSE over the data connection;
   determining the amount of power requested by a powered device (PD) connected to the ID;
   comparing the amount of power requested by the PD to the amount of power allocated by the PSE, and determining that the amount of power requested by the PD is less than the amount of power allocated by the PSE;
   consuming a particular amount of power supplied by the PSE over the data connection, the particular amount of power comprising both the amount of power consumed by the ID to operate the ID and the amount of power consumed to power the PD;
wherein the ID is configured to operate selectively in a first mode of operation or a second mode of operation based on the power allocated by the PSE, wherein in the first mode of operation the ID consumes more power to operate the ID than in the second mode of operation, and wherein the method further comprises:
   computing a value representing the amount by which the power allocated by the PSE is above the power requested by the PD;
   determining that the value is above a threshold, and in response operating in the first mode of operation.

2. The method of claim 1, wherein the amount of power allocated to the ID by the PSE is determined by the ID based on an occurrence of multi-event classification in the physical layer.

3. The method of claim 1, wherein the amount of power allocated to the ID by the PSE is determined by the ID based on a power grant received in a Link Layer Discovery Protocol (LLDP) message.

4. The method of claim 1, wherein the amount of power requested by the PD is determined by the ID based on the amount of classification current drawn by the PD.

5. The method of claim 1, wherein the particular amount of power is less than the amount of power allocated by the PSE, and wherein the method further comprises:
   transmitting a Link Layer Discovery Protocol (LLDP) message to the PSE, the LLDP message including a power request that requests less power than the amount of power allocated by the PSE.

6. The method of claim 5, wherein the amount of power requested in the power request is equal to or larger than the particular amount of power.

7. The method of claim 1, further comprising: subsequently determining that the value is no longer above the threshold, and in response operating in the second mode of operation instead of the first mode of operation.

8. The method of claim 1, further comprising transmitting a message over the data connection via the PSE to a computing device on a network, the message comprising information indicating that the ID is operating in the first mode of operation.

9. The method of claim 1, further comprising communicating, over the data connection via the PSE, with a computing device on the network.

10. The method of claim 9, further comprising determining that the amount of power consumed by the PD or requested by the PD or granted to the PD exceeds a threshold, and in response sending a message to the computing device.

11. The method of claim 2, wherein the multi-event classification in the physical layer indicates that the PSE allocates Class 4 power under a Power over Ethernet (PoE) standard.

12. The method of claim 4, wherein the amount of classification current drawn by the PD indicates that the PD requests Class 3 power under a Power over Ethernet (PoE) standard.

13. The method of claim 1, wherein the amount of power allocated to the ID by the PSE is determined to be Class 4 power under a Power over Ethernet (PoE) standard, and wherein the amount of power requested by the PD is determined to be Class 0, 1, 2, or 3 power under the PoE standard.

14. An intermediary device (ID) configured to be connected between power sourcing equipment (PSE) and a powered device (PD), the ID comprising:
   a PSE interface to interface with the PSE over a first data connection;
   a PD interface to interface with the PD over a second data connection;
   a processor to:
      determine an amount of power allocated to the ID by the PSE over the first data connection;
      determine the amount of power requested by the PD over the second data connection;
      compare the amount of power requested by the PD to the amount of power allocated by the PSE; and
      upon determining that the amount of power requested by the PD is less than the amount of power allocated by the PSE, cause the ID to consume a particular amount of power supplied by the PSE over the first data connection, wherein the particular amount of power comprises both the amount of power consumed by the ID to operate the ID and the amount of power consumed to power the PD;
   wherein the ID is configured to operate selectively in a first mode of operation or a second mode of operation based on the power allocated by the PSE, wherein in the first mode of operation the ID consumes more power to operate the ID than in the second mode of operation, and wherein the processor is further to:
      compute a value representing the amount by which the power allocated by the PSE is above the power requested by the PD;
      determine that the value is above a threshold, and in response instruct the ID to operate in the first mode of operation.

15. The ID of claim 14, wherein the processor is to determine the amount of power allocated to the ID by the PSE based on an occurrence of multi-event classification in the physical layer.

16. The ID of claim 14, wherein the processor is to determine the amount of power allocated to the ID by the PSE based on a power grant received in a Link Layer Discovery Protocol (LLDP) message.

17. The ID of claim 14, wherein the processor is to determine the amount of power requested by the PD based on the amount of classification current drawn by the PD.

18. The ID of claim 14, wherein in response to the particular amount of power being less than the amount of power allocated by the PSE, the processor is further to cause transmission of a Link Layer Discovery Protocol (LLDP) message to the PSE, the LLDP message including a power request that requests less power than the amount of power allocated by the PSE.

19. The ID of claim 18, wherein the amount of power requested in the power request is equal to or larger than the particular amount of power.

20. The ID of claim 14, wherein the processor is further to: subsequently determine that the value is no longer above the threshold, and in response instruct the ID to operate in the second mode of operation instead of the first mode of operation.

21. The ID of claim 14, wherein the processor is to cause the ID to transmit a message over the first data connection via the PSE to a computing device on a network, the message comprising information indicating that the ID is operating in the first mode of operation.

22. The ID of claim 14, wherein the processor is to communicate, over the first data connection via the PSE, with a computing device on the network.

23. The ID of claim 22, wherein the processor is further to: determine that the amount of power consumed by the PD or requested by the PD or granted to the PD exceeds a threshold, and in response cause the ID to send a message to the computing device.

24. The ID of claim 15, wherein the multi-event classification in the physical layer can indicate that the PSE allocates Class 4 power under a Power over Ethernet (PoE) standard.

25. The ID of claim 17, wherein the amount of classification current drawn by the PD can indicate that the PD requests Class 3 power under a Power over Ethernet (PoE) standard.

26. The ID of claim 14, wherein the amount of power allocated to the ID by the PSE can be determined to be Class 4 power under a Power over Ethernet (PoE) standard, and wherein the amount of power requested by the PD can be determined to be Class 0, 1, 2, or 3 power under the PoE standard.

* * * * *